US00RE38600E1

(19) United States
(12) Reissued Patent
Mankovitz

(10) Patent Number: US RE38,600 E
(45) Date of Reissued Patent: Sep. 28, 2004

(54) APPARATUS AND METHODS FOR ACCESSING INFORMATION RELATING TO RADIO TELEVISION PROGRAMS

(76) Inventor: Roy J. Mankovitz, 24236 Park Granada, Calabasas, CA (US) 91302

(21) Appl. No.: 09/479,767

(22) PCT Filed: Nov. 22, 1995

(86) PCT No.: PCT/US95/15343

§ 371 (c)(1),
(2), (4) Date: May 22, 1997

(87) PCT Pub. No.: WO96/16491

PCT Pub. Date: May 30, 1996

Related U.S. Patent Documents

Reissue of:
(64) Patent No.: 5,949,492
Issued: Sep. 7, 1999
Appl. No.: 08/849,354
Filed: May 22, 1997

(63) Continuation-in-part of application No. 08/486,769, filed on Jun. 7, 1995, now Pat. No. 5,703,795, which is a continuation-in-part of application No. 08/344,333, filed on Nov. 22, 1994, now abandoned, which is a continuation-in-part of application No. 08/322,824, filed on Oct. 13, 1994, now abandoned, which is a continuation-in-part of application No. 08/227,079, filed on Apr. 13, 1994, now abandoned, which is a continuation-in-part of application No. 07/901,735, filed on Jun. 22, 1992, now abandoned.

(51) Int. Cl.[7] ..... H04H 1/00
(52) U.S. Cl. ..... 348/473; 455/154.1; 455/158.2
(58) Field of Search ..... 348/473; 455/154.1, 455/158.2, 158.5; 369/30

(56) References Cited

U.S. PATENT DOCUMENTS

| | | | | |
|---|---|---|---|---|
| RE17,023 | E | 7/1928 | Clement | |
| 3,764,747 | A | 10/1973 | Nakajima et al. | 179/7 R |
| 3,911,446 | A | 10/1975 | Albertini | 346/33 12R |
| 4,337,463 | A | 6/1982 | Vangen | 340/825.3 |
| 4,361,851 | A | 11/1982 | Asip et al. | 358/84 |
| 4,592,546 | A | 6/1986 | Fascenda et al. | 273/1 E |
| 4,622,583 | A | 11/1986 | Watanabe et al. | 358/84 |
| 4,630,143 | A | 12/1986 | Juso et al. | 360/72.2 |
| 4,695,879 | A | 9/1987 | Weinblatt | 358/84 |
| 4,718,106 | A | 1/1988 | Weinblatt | 455/2 |
| 4,847,886 | A | 7/1989 | Chumley | 379/56 |
| 4,864,604 | A | 9/1989 | Aihara | 379/110 |
| 4,870,515 | A | 9/1989 | Stokes | 360/72.2 |
| 4,887,308 | A | 12/1989 | Dutton | 455/156 |
| 4,920,432 | A | 4/1990 | Eggers et al. | 360/33.1 |
| 4,943,963 | A | 7/1990 | Waechter et al. | 370/94.1 |

(List continued on next page.)

FOREIGN PATENT DOCUMENTS

| | | | |
|---|---|---|---|
| EP | 0 604 639 B1 | 8/1998 | |
| FR | 2630536 | 10/1989 | G01B/7/30 |
| WO | WO9111062 | 7/1991 | |
| WO | WO 93/22877 | 11/1993 | |
| WO | WO 94/00842 | 1/1994 | |
| WO | WO 94/14282 | 6/1994 | |
| WO | WO 95/28803 | 10/1995 | |
| WO | WO 96/16491 | 5/1996 | |

OTHER PUBLICATIONS

Caitlin Bestler, "Flexible Data Structures and Interface Rituals for Rapid Development of OSD Applications", 1993 NCTA Technical Papers, Jun. 6, 1993, pp 223–236.

*Primary Examiner*—Thomas R. Peeso
(74) *Attorney, Agent, or Firm*—Gifford, Krass, Groh, Sprinkle, Anderson & Citkowski, PC

(57) ABSTRACT

An apparatus and method for ordering supplemental information about programs playing at a broadcast receiver. The method includes reproducing programs from one of a plurality of stations, recording an identification of a station and a time of a program, entering this information into one of a plurality of terminals, coupling the terminal to a depository and identifying a correspondence between the entered station identification and time and a program in a station log to obtain the desired supplemental information.

68 Claims, 69 Drawing Sheets

U.S. PATENT DOCUMENTS 4,953,039 A 8/1990 Ploch ..... 360/32
4,956,768 A 9/1990 Sidi et al. ..... 364/200
4,977,455 A 12/1990 Young ..... 358/142
4,989,234 A 1/1991 Schakowsky et al. ..... 379/92
5,013,038 A 5/1991 Luxenberg et al. ..... 273/439
5,036,500 A 7/1991 Ganter ..... 368/47
5,054,360 A 10/1991 Lisle et al. ..... 84/645
5,063,610 A 11/1991 Alwadish ..... 455/45
5,073,931 A 12/1991 Audebert et al. ..... 380/23
5,081,680 A 1/1992 Bennett ..... 380/50
5,083,800 A 1/1992 Lockton ..... 273/439
5,119,507 A 6/1992 Mankovitz ..... 455/154.1
5,119,711 A 6/1992 Bell et al. ..... 84/622
5,120,076 A 6/1992 Luxenberg et al. ..... 273/439
5,132,992 A 7/1992 Yurt et al. ..... 375/122
5,136,644 A 8/1992 Audebert et al. ..... 380/25
5,155,762 A 10/1992 Croquet et al. ..... 379/92
5,162,905 A 11/1992 Itoh et al. ..... 358/84
5,189,630 A * 2/1993 Barstow et al. ..... 709/246
5,191,573 A 3/1993 Hair ..... 369/84
5,195,134 A 3/1993 Inoue ..... 380/20
5,210,611 A 5/1993 Yee et al. ..... 358/191.1
5,214,792 A 5/1993 Alwadish ..... 455/45
5,216,703 A 6/1993 Roy ..... 379/59
5,262,964 A * 11/1993 Bonsall et al. ..... 709/246
5,303,393 A 4/1994 Noreen et al. ..... 455/3.2
5,313,408 A * 5/1994 Goto ..... 364/514 A
5,355,302 A 10/1994 Martin et al. ..... 364/410
5,357,505 A 10/1994 Tsumura et al. ..... 370/60
5,418,844 A 5/1995 Morrisey et al. ..... 379/207
5,438,355 A 8/1995 Palmer ..... 348/1
5,444,499 A 8/1995 Saitoh ..... 348/734
5,448,625 A 9/1995 Lederman ..... 379/67
5,455,823 A 10/1995 Noreen et al. ..... 370/50
5,457,739 A 10/1995 Le Cheviller ..... 379/93
5,539,635 A 7/1996 Larson, Jr. ..... 364/401 R
5,559,878 A 9/1996 Keys et al. ..... 379/265
5,570,295 A 10/1996 Isenberg et al. ..... 364/514 R
5,572,442 A 11/1996 Schulhof et al. ..... 364/514 C
5,574,962 A 11/1996 Fardeau et al. ..... 455/2
5,592,511 A 1/1997 Schoen et al. ..... 375/220
5,629,867 A 5/1997 Goldman ..... 364/514 R
5,661,787 A 8/1997 Pocock ..... 379/101.01
5,675,734 A 10/1997 Hair ..... 395/200.01
5,689,081 A 11/1997 Tsurumi ..... 84/609
5,689,245 A 11/1997 Noreen et al. ..... 340/825.49
5,703,795 A 12/1997 Mankovitz ..... 364/514 R
5,721,584 A 2/1998 Yoshinobu et al. ..... 348/13
5,734,119 A 3/1998 France et al. ..... 84/622
5,752,186 A 5/1998 Malackowski et al. ..... 455/414
5,758,286 A 5/1998 Leppanen ..... 455/445
5,761,606 A 6/1998 Wolzien ..... 455/6.2
5,774,534 A 6/1998 Mayer ..... 379/142
5,809,246 A 9/1998 Goldman ..... 395/200.47
5,815,814 A 9/1998 Dennison et al. ..... 455/456
5,835,583 A 11/1998 Hetz et al. ..... 379/220
5,857,149 A 1/1999 Suzuki ..... 455/186.1
5,864,804 A 1/1999 Kalveram ..... 704/233
5,867,155 A 2/1999 Williams ..... 345/327
5,867,780 A 2/1999 Malackowski et al. ..... 455/414
5,870,710 A 2/1999 Ozawa et al. ..... 704/500
5,880,386 A 3/1999 Wachi et al. ..... 84/601
5,886,274 A 3/1999 Jungleib ..... 84/601
5,892,171 A 4/1999 Ide ..... 84/622
5,900,564 A 5/1999 Kurakake ..... 84/477 R
5,907,322 A 5/1999 Kelly et al. ..... 345/327
5,907,793 A 5/1999 Reams ..... 455/3.1
5,913,258 A 6/1999 Tamura ..... 84/604
5,961,603 A 10/1999 Kunkel et al. ..... 709/229
5,999,970 A 12/1999 Krisbergh et al. ..... 709/217

* cited by examiner

FIG. 6A

SET UP MENU

1. BROADCAST STATIONS
2. PUBLICATIONS
3. USER ID
4. CLOCK
5. EXIT

FIG. 6B

BROADCASTING STATIONS

| PRESET | NAME | NUMBER | TELEPHONE |
|---|---|---|---|
| 1 | KKGO | 105.1 | 800-777-2211 |
| 2 | KPTH | 101.1 | 800-549-8765 |
| 3 | TV | 2 | 800-932-6789 |
| ⋮ | | | |
| EXIT | | | |

FIG. 6C

PUBLICATIONS

| PRESET | NAME | TELEPHONE |
|---|---|---|
| 1 | LA TIMES | 800-949-3256 |
| 2 | TIME | 800-437-5432 |
| 3 | BARRONS | 800-844-6514 |
| ⋮ | | |
| EXIT | | |

FIG. 6D

USER ID

NAME: _____

ADDRESS: _____

_____

TELEPHONE: _____

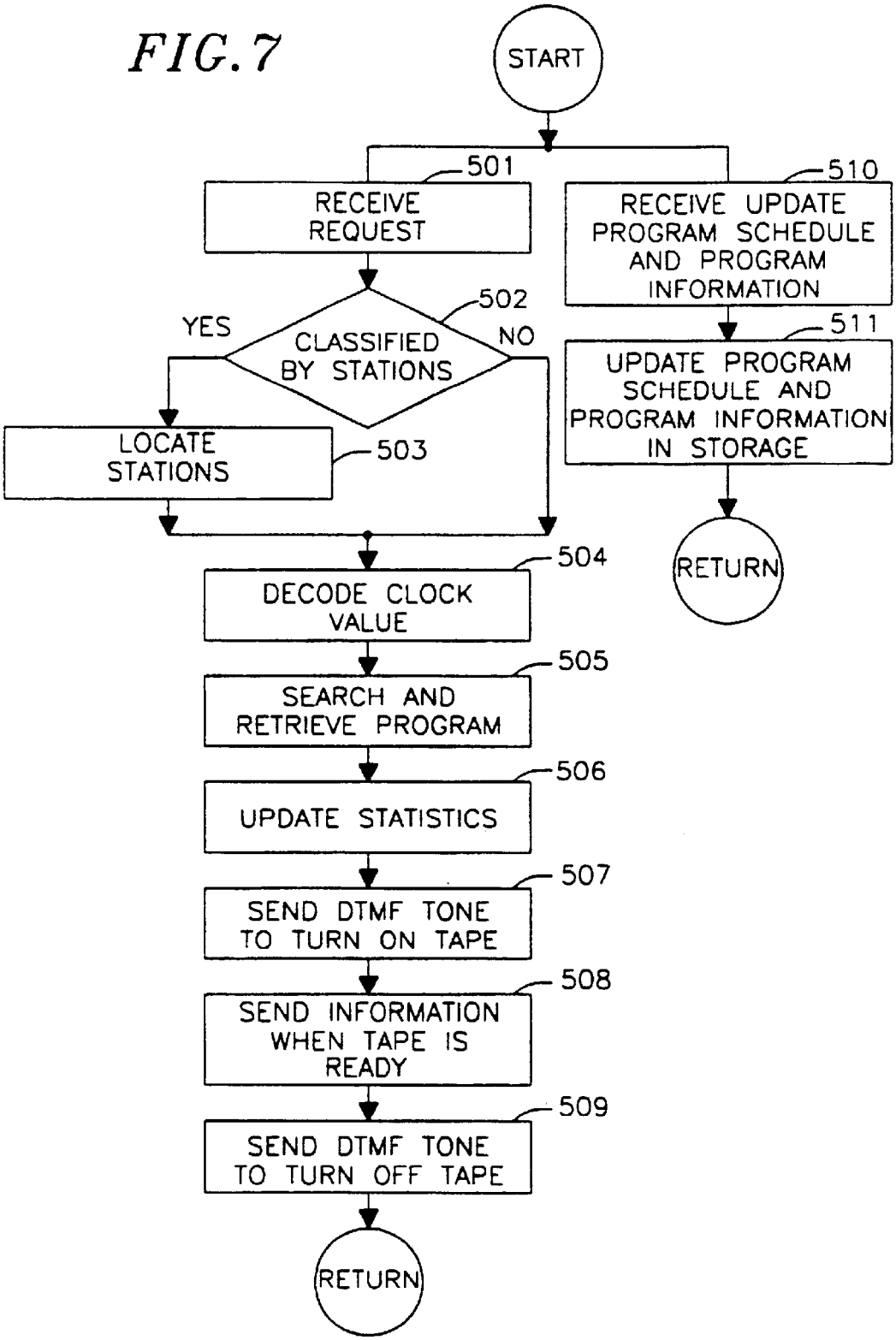
FIG. 7
START
501
RECEIVE REQUEST
510
RECEIVE UPDATE PROGRAM SCHEDULE AND PROGRAM INFORMATION
502
YES
CLASSIFIED BY STATIONS
NO
511
UPDATE PROGRAM SCHEDULE AND PROGRAM INFORMATION IN STORAGE
LOCATE STATIONS
503
RETURN
504
DECODE CLOCK VALUE
505
SEARCH AND RETRIEVE PROGRAM
506
UPDATE STATISTICS
507
SEND DTMF TONE TO TURN ON TAPE
508
SEND INFORMATION WHEN TAPE IS READY
509
SEND DTMF TONE TO TURN OFF TAPE
RETURN 1016
1017
LOS ANGELES FM
1011
1012
1027
1023
13C
1025
1026
1024
1010
1036
1020
13C
1022

AUTOMATED INFORMATION MACHINE (AIM)
1160
1163
1161
MODEM
TELEPHONE LINE
1010
INFORMATION CARD (ICARD)
1162
AUTOMATED INFORMATION MACHINE (AIM)
1160
1161
MODEM
1163
1162
SERVER AND AUDIENCE MONITORING FACILITY
HARD DRIVE
1180
1182
TELEPHONE LINE
FM STATION 1
1164
1162
FM STATION N
1164
1162
1168
TV STATION 1
TV STATION N
1168
1162
1172
AM STATION 1
1162
1172
AM STATION N
1193
1162
1193
1162
1190
MODEM
MERCHANT 1 (AIM)
1192
MODEM
MERCHANT N (AIM)
1192
1190
1010
INFORMATION CARD (ICARD)

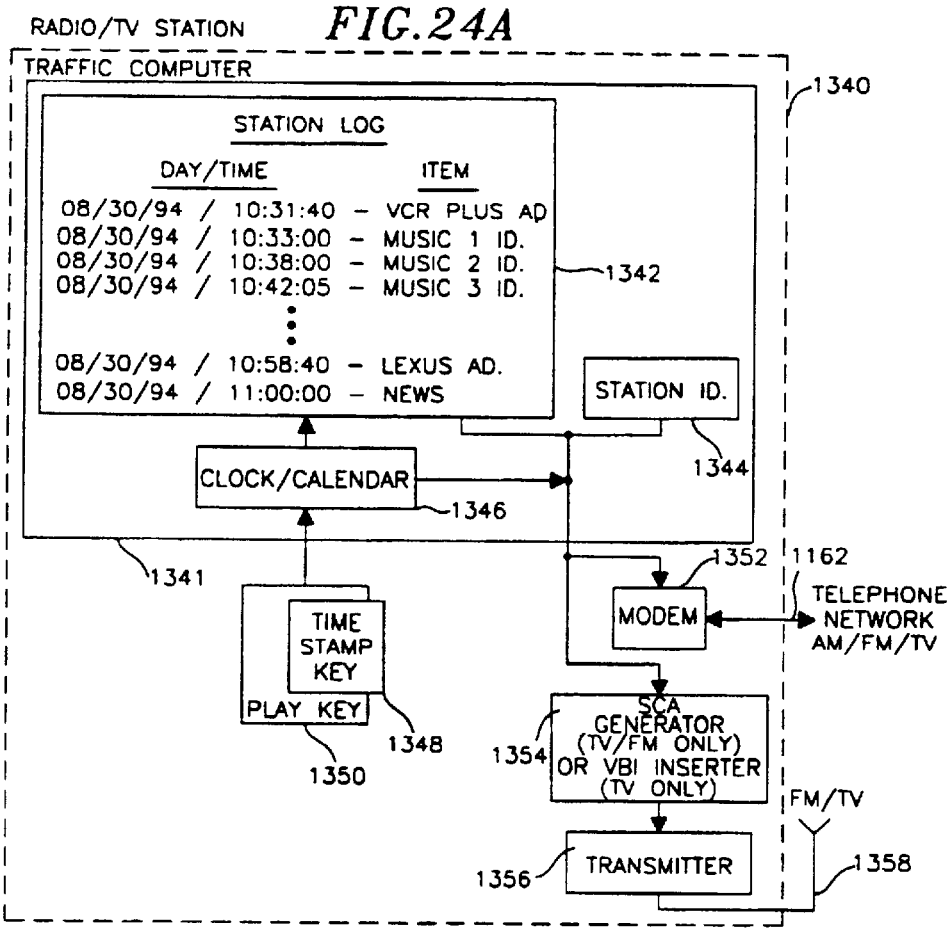
RADIO/TV STATION
FIG.24A
TRAFFIC COMPUTER
1340
STATION LOG
DAY/TIME
ITEM
08/30/94 / 10:31:40 - VCR PLUS AD
08/30/94 / 10:33:00 - MUSIC 1 ID.
08/30/94 / 10:38:00 - MUSIC 2 ID.
08/30/94 / 10:42:05 - MUSIC 3 ID.
08/30/94 / 10:58:40 - LEXUS AD.
08/30/94 / 11:00:00 - NEWS
1342
STATION ID.
1344
CLOCK/CALENDAR
1346
1341
1352
1162
MODEM
TELEPHONE NETWORK AM/FM/TV
TIME STAMP KEY
PLAY KEY
1348
1350
SCA GENERATOR (TV/FM ONLY) OR VBI INSERTER (TV ONLY)
1354
FM/TV
TRANSMITTER
1356
1358

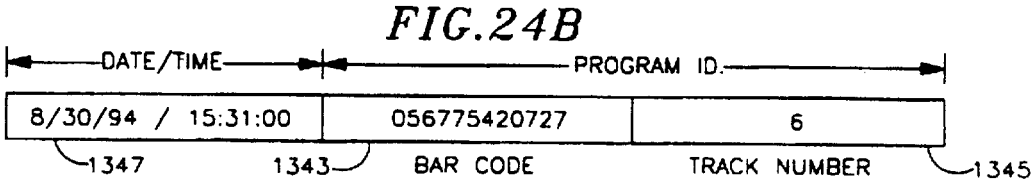
FIG.24B
DATE/TIME
PROGRAM ID.
8/30/94 / 15:31:00
056775420727
6
1347
1343
BAR CODE
TRACK NUMBER
1345

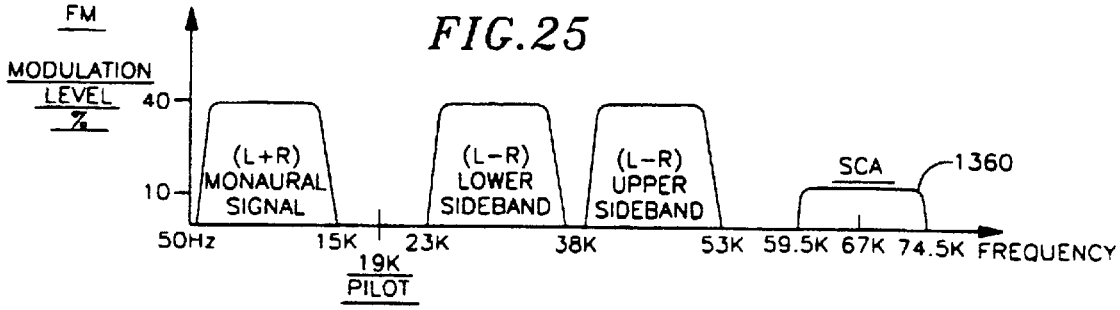
FIG.25
FM
MODULATION LEVEL %
40
10
(L+R) MONAURAL SIGNAL
(L-R) LOWER SIDEBAND
(L-R) UPPER SIDEBAND
SCA
1360
50Hz
15K
23K
38K
53K
59.5K
67K
74.5K
FREQUENCY
19K PILOT

FIG. 29A

FORMAT

| |
|---|
| CALL LETTERS / PARTICIPATION(Y/N) |
| FREQ. / CHANNEL AM/FM/TV RANK |
| PROGRAMMING TYPE / STATION ID. |

FIG. 29B

STATION MEMORY 1284 1286 1260

| | | | | |
|---|---|---|---|---|
| 1280 | KABC | | Y | |
| 1282 | 2 | TV | 1 | 1288 |
| 1290 | GENERAL | / | 1024591 | 1292 |
| | ⋮ | | | |
| | CNN | | Y | |
| | 52 | TV | 1 | |
| | NEWS | | 3456792 | |
| | ⋮ | | | |
| | KNX | | Y | |
| | 1070 | AM | 3 | |
| | NEWS | | 3214927 | |
| | ⋮ | | | |
| | KFI | | Y | |
| | 640 | AM | 2 | |
| | TALK | | 2167890 | |
| | ⋮ | | | |
| | KUSC | | Y | |
| | 91.5 | FM | 9 | |
| | NPR | | 2139511 | 1294 |
| | ⋮ | | | |
| | KKGO | | Y | |
| | 105.1 | FM | 1 | |
| | CLASSICAL | | 6973548 | 1296 |
| | ⋮ | | | |
| | KWAVE | | Y | |
| | 94.7 | FM | 11 | |
| | NEW AGE | | 7154333 | |
| | ⋮ | | | |
| | KOTY | | N | |
| | 94.6 | FM | 20 | |
| | SPORTS | | 5266331 | |

FIG. 31

AUXILIARY INFORMATION

1332

1304

| | |
|---|---|
| 056775 420727 | |
| LUDWIG VON BEETHOVEN | |
| CLASSIC GOLD COMPACT DISC | |
| DDD | |
| LOCATION IN STORE(AISLE NUMBER) | PRICE |
| PASTORAL SYMPHONY NUMBER 6 IN F MAJOR OP.68 | |
| SLOVAK NATIONAL PHILHARMONIC ORCHESTRA | |
| TRACK 1 ALEGRO MA NON TRAPPO | 10'28 |
| TRACK 2 ANDANTE MOLTO MOSSO | 13'23 |
| TRACK 3 ALLEGRO | 5'12 |
| TRACK 4 ALLEGRO | 3'50 |
| TRACK 5 ALLEGRETTO | 10'36 |
| EGMONT OP.72a | |
| LONDON PHILHARMONIC ORCHESTRA | |
| TRACK 6 OVERTURE | 8'20 |
| LEONORE OP.72a | |
| RADIO SYMPHONY | |
| TRACK 7 OVERTURE | 13'35 |
| • • • | |
| 76732 631928 | |
| NANCY GRIFFITH | |
| MCA RECORDS | |
| AAD | |
| LOCATION IN STORE(AISLE NUMBER) PRICE | |
| TRACK 1 STORMS | |
| • • • | |

1334

1336

FIG. 35A

SETUP
YOUR CARD IS NEW AND
MUST BE SETUP.
PRESS ENTER

FIG. 35B

SETUP
DO YOU WANT TO
CHANGE SETUP?
ENTER Y OR N

FIG. 35C

PERSONAL
ENTER NAME/ADDRESS
ENTER ZIP CODE
ENTER DRIVER'S LICENSE
NUMBER
ENTER OTHER ID.

FIG. 35D

SETUP
STATIONS HAVE BEEN
ADDED/DELETED TO/FROM
THE SYSTEM SINCE YOUR
LAST SETUP.
PRESS ENTER

FIG.35E

STATIONS

1. MANUAL
2. AUTOMATIC

ENTER NUMBER

FIG.35F

LOCATION

1. LA.
2. NY.
3. SF.

ENTER NUMBER

FIG.35G

TYPE

1. FM
2. AM
3. TV

ENTER NUMBER

FIG.35H

RADIO PROGRAMMING TYPE

1. CLASSICAL
2. OLDIES
3. ROCK
4. COUNTRY
5. NEWS
6. TALK

ENTER NUMBER

FIG.35I

TV PROGRAMMING TYPE

1. MOVIES
2. NETWORK
3. SPORTS
4. CHILDREN

ENTER NUMBER

FIG.35J

SELECT NUMBER OF KEY PRESSES/DAY 1. 5 [FREE]
2. 10 [$1.00]
3. 15 [$2.00]

ENTER NUMBER

| | |
|---|---|
| KEY F1 | LA TIMES |
| KEY F2 | WALL ST. JRN. |
| ⋮ | ⋮ |
| KEY F4 | CARDS |
| KEY F5 | CANCEL |
| ⋮ | ⋮ |
| KEY F10 | BOOKLIST |
| KEY F11 | 0 |
| KEY F12 | 1 |
| ⋮ | ⋮ |
| KEY F20 | 9 |
| | |

1722 1724

| PUB. NAME | DATE | NUMBER |
|---|---|---|
| LA TIMES | 8/13/94 | 21365 |
| | | |
| WALL ST. JRN. | 8/14/94 | |
| WALL ST. JRN. | 8/14/94 | |
| WALL ST. JRN. | 8/14/94 | |
| | | |
| ISBN | | |
| 0-671-65991-X | | |
| | | |
| ⋮ | | |
| CARDS | | |
| 5233 6029 9060 9233 | | |
| ⋮ | | |

1726 1730 1728 1732 1734 1735

BROADCAST/CABLE STATION SETUP SHEET–LOS ANGELES

| | | | | | |
|---|---|---|---|---|---|
| 34231 | KKGO 105.1FM_ | 34729 | KTWV 94.7FM | 26974 | KUSC 91.5FM |
| 16375 | KRTH 101.1FM_ | 94892 | KXEZ 103.5FM | 54754 | KFI 640AM |
| 58768 | CH 2 TV_ | 89760 | CH 4 TV | 54568 | ESPN CBL |
| 68064 | KMPC AM_ | 86879 | MTV CBL | 48809 | KABC 790AM |

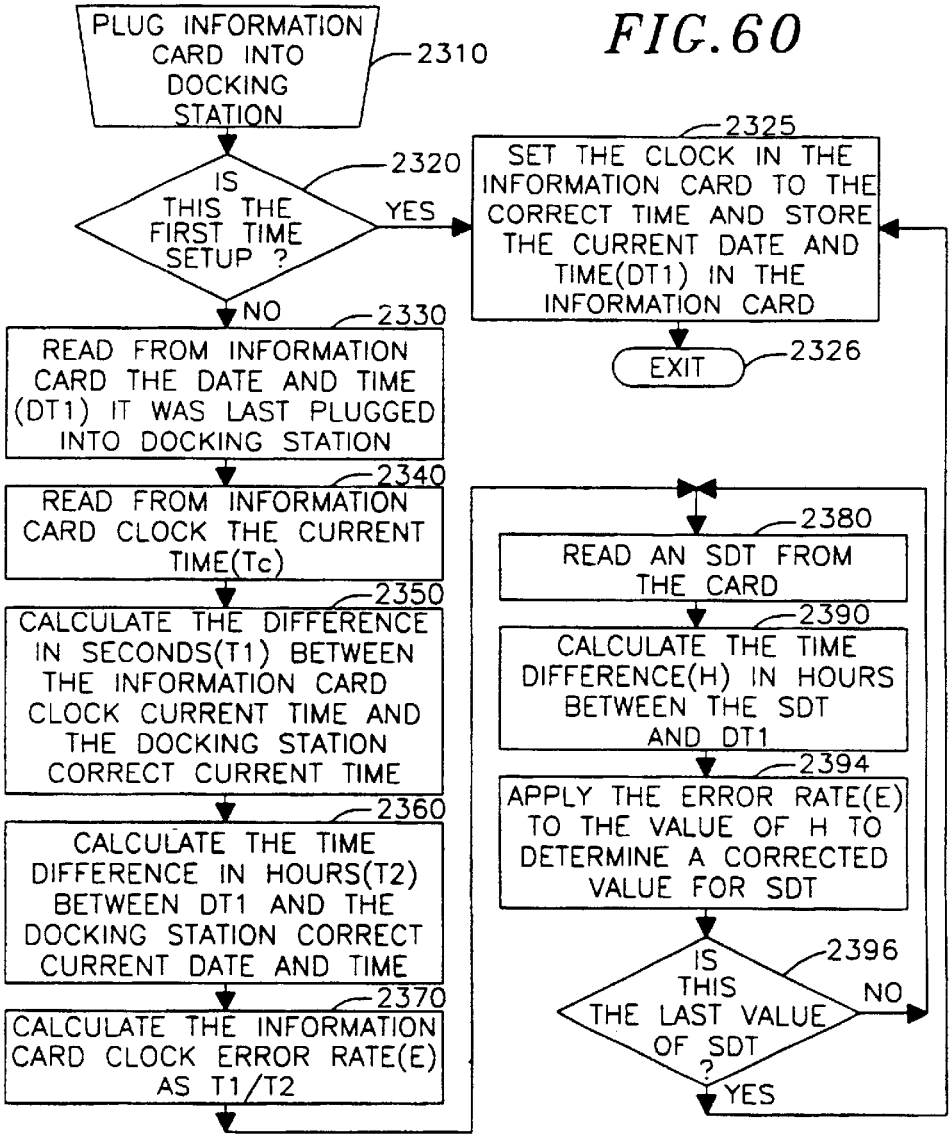
FIG. 60
PLUG INFORMATION CARD INTO DOCKING STATION
2310
IS THIS THE FIRST TIME SETUP ?
2320
YES
NO
SET THE CLOCK IN THE INFORMATION CARD TO THE CORRECT TIME AND STORE THE CURRENT DATE AND TIME(DT1) IN THE INFORMATION CARD
2325
EXIT
2326
READ FROM INFORMATION CARD THE DATE AND TIME (DT1) IT WAS LAST PLUGGED INTO DOCKING STATION
2330
READ FROM INFORMATION CARD CLOCK THE CURRENT TIME(Tc)
2340
CALCULATE THE DIFFERENCE IN SECONDS(T1) BETWEEN THE INFORMATION CARD CLOCK CURRENT TIME AND THE DOCKING STATION CORRECT CURRENT TIME
2350
CALCULATE THE TIME DIFFERENCE IN HOURS(T2) BETWEEN DT1 AND THE DOCKING STATION CORRECT CURRENT DATE AND TIME
2360
CALCULATE THE INFORMATION CARD CLOCK ERROR RATE(E) AS T1/T2
2370
READ AN SDT FROM THE CARD
2380
CALCULATE THE TIME DIFFERENCE(H) IN HOURS BETWEEN THE SDT AND DT1
2390
APPLY THE ERROR RATE(E) TO THE VALUE OF H TO DETERMINE A CORRECTED VALUE FOR SDT
2394
IS THIS THE LAST VALUE OF SDT ?
2396
NO
YES

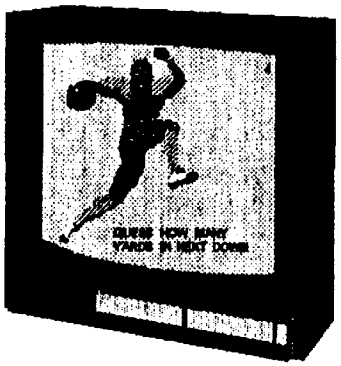
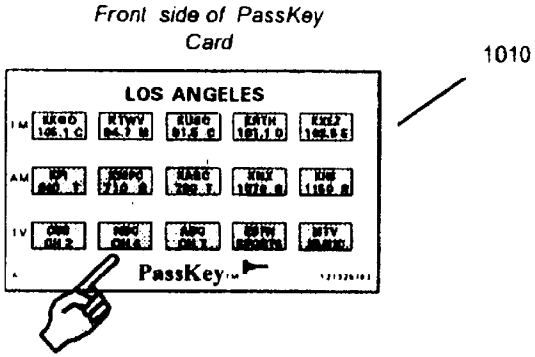
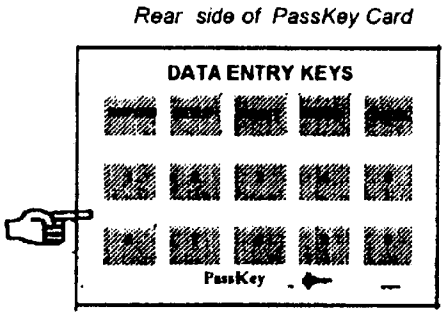
Figure 63

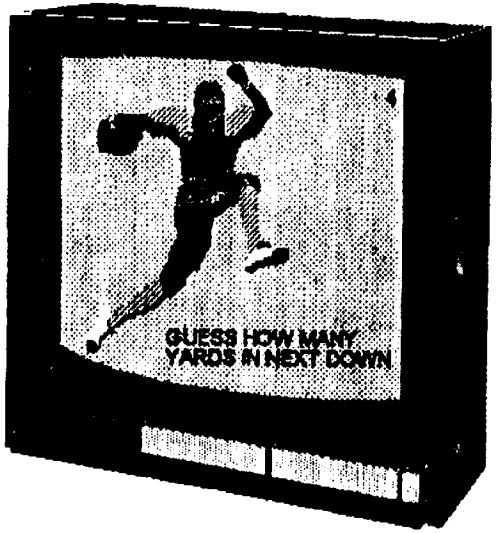
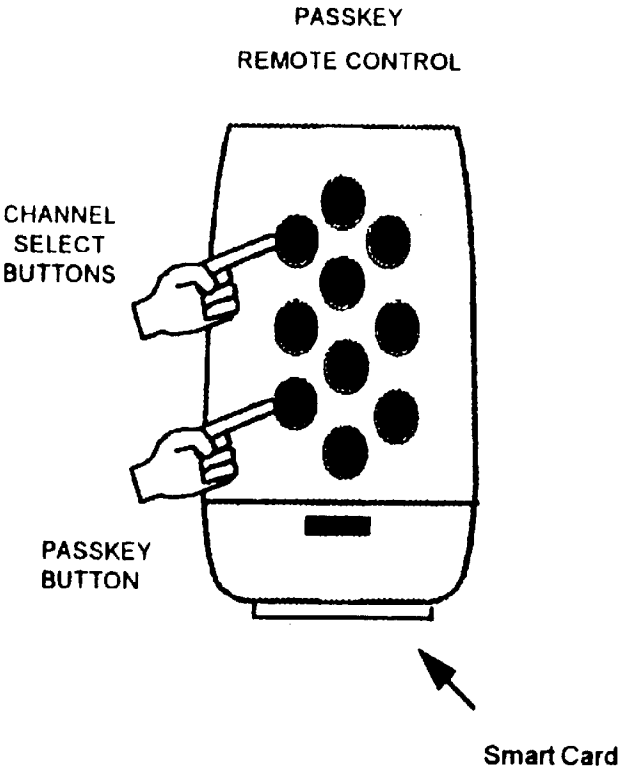
Figure 70

KXEZ 103.5
9/13/94 10:04 AM

"I CAN'T CRY"

NATALIE COLE

GOOD TO BE BACK $2.00 DISCOUNT COUPON FOR THIS ALBUM

Redeem at any BLOCKBUSTER MUSIC Store

Expires 9/27/94
PassKey
7777-46058-2

EXAMPLE OF SONG IDENTIFICATION AND COUPON

KCBS CHANNEL 2
9/20/94 7:42 PM

Name the Capital of Texas

AUSTIN

Your Answer:

AUSTIN

CORRECT!

COUPON FOR FREE GIFT

Redeem at any TOYS R US Store

Expires 10/24/94

EXAMPLE OF QUIZ RESPONSE

KNBC CH 4
9/18/94 8:57 PM

How many yards in the next down?
9

Your Answer:
9

YOU WON!
COCA COLA SWEEPSTAKES $500 HAS BEEN ADDED TO YOUR SMART CARD ACCOUNT!!

EXAMPLE OF CONTEST RESPONSE

Figure 72

APPARATUS AND METHODS FOR ACCESSING INFORMATION RELATING TO RADIO TELEVISION PROGRAMS

Matter enclosed in heavy brackets [ ] appears in the original patent but forms no part of this reissue specification; matter printed in italics indicates the additions made by reissue.

[This application is a 371 of PCT/US95/15343 filed on Nov. 22, 1995.]

*CROSS REFERENCE TO RELATED APPLICATIONS*

*This application is a Section 371 of PCT/US95/15343 filed on Nov. 22, 1995, which is a continuation-in-part of Application Ser. No. 08/486,769 filed Jun. 7, 1995 (now U.S. Pat. No. 5,703,795 issued Dec. 30, 1997), which is a continuation-in-part of Application Ser. No. 08/344,333 filed Nov. 22, 1994 (now abandoned), which is a continuation-in-part of Application Ser. No. 08/322,824 filed Oct. 13, 1994 (now abandoned), which is a continuation-in-part of Application Ser. No. 08/277,079 filed Apr. 13, 1994 (now abandoned), which is a continuation-in-part of Application Ser. No. 07/901,735 filed Jun. 22, 1992 (now abandoned).*

FIELD OF THE INVENTION

This invention relates in general to broadcast media which includes radio and television and to apparatus and methods for obtaining information for transmitted programs.

BACKGROUND OF THE INVENTION

A listener of radio may hear a song of interest and decides to buy it, but does not know the title or artist. Frequently the announcer of the radio station does not state the title, artist or other information of the song, or even if the information was announced, it was before the song played. The listener must wait until the song is heard again and hope that the title and artist are announced after the song. Even when the information of the song are announced and heard, there are situations where such information cannot easily be retained (such as when a listener is operating an automobile or simply when a listener does not have something to write on or write with).

The problem is especially true for commercials, for which the listeners usually must memorize information that are difficult to memorize, such as telephone numbers and addresses for ordering the products advertised. If listeners fail to remember these items of information, the effects of the commercials are diminished.

Similarly, a viewer of television may be scanning through different channels or stations and start watching a program that is already in progress. After a few minutes, the viewer may decide to view the show the next time it is on, because the viewer wants to see it in its entirety or the viewer may be watching something else. Therefore, the viewer must physically search through the current and subsequent TV program listings until the next showing of the program is found. This is time consuming and if several months pass, the viewer may forget the name of the show.

Despite the above described long-felt inconvenience to so many in the audience, no satisfactory solution has so far been found.

Another problem is the high cost of advertisements. An advertiser may only be able to finance a half-minute prime time commercial on television or radio. If a less expensive alternative communication channel is available for providing additional information (e.g. price quotes, store hours, details of a product, etc.) to listeners, the advertiser can then have more flexibility on how to spend the limited time and money available for media commercials. The listeners would access other information using the less expensive alternative communication channel.

The same alternative channel is also needed for newspapers and magazine advertisements which have a limited lifetime. For example, the Sunday paper real estate section typically lists homes which may only be available for viewing on that day. If a second channel of information is available, then information about the home can still be available to the readers even when the advertisement is taken off.

Despite the above identified economic benefits, a satisfactory and less expensive alternative channel of communication has yet to be found.

Prior art systems in this regard all require a station to broadcast the information in a secondary signal, concurrently with the broadcasting of the main program, and the listeners must be equipped with special decoder circuits for recovering the information. For example, the European radio broadcast systems (RDS) broadcast the identification of a program in the SCA band and require the listeners to have special receivers to decode and display this identification.

There is also a proposal to transmit identification of a television program during the vertical blanking interval (VBI) period. Unfortunately, special decoders are also needed under such method.

In a system described in patent application Ser. No. 07/806,152, filed Dec. 11, 1991 (incorporated herein by reference as though set forth in full), auxiliary information relating to a broadcast program or printed material is retrieved using a code which is broadcast or printed along with the program or print material. The code number is used for delayed recording from a television or a radio of a broadcast program containing the auxiliary information. However, the system does not retrieve information until the next day, and it requires a television and VCR for such retrieval.

Advertising rates for commercials of television programs are determined by the expected size of viewer audience for a predetermined number of television programs. These expectations are usually determined by the estimated audience sizes of previously broadcast shows. For example, for a weekly television series, the estimate of audience size for upcoming episodes is based on the estimated size of previously broadcast shows. In addition, advertising rates may be adjusted based on an "after the fact" estimation of the market share for the televised program.

The present systems for estimating market share involve survey evidence such as the Nielsen ratings. Previous market data was taken by selecting households to record their viewing habits. For example, a selected household might record in a written journal or diary when the television is turned on and turned off, what channels or stations are selected and the number of viewers in the room. This data may alternatively be collected by providing the user with an electronic device having a button that indicates turning on or off the television and the channel selected. Other systems are connected daily to the television that will monitor power on and off and the channel and time of the selected programs. The system is wired to a dedicated telephone line. When instructed, the electronics dump their memory over the phone line to a central computer for analysis. Each of these systems requires selecting individual households that represent an adequate sample of the general viewing audience and requires physically setting up the monitoring apparatus. These systems are inaccurate because the sample size is small, diary entries may be erroneous, or require viewer action.

However, despite its importance to advertisers and the media, a satisfactory method for gathering such data has yet to be found.

SUMMARY OF THE INVENTION

In one aspect, this invention discloses apparatus for facilitating access of auxiliary information relating to a selected program broadcast from radio and television and to selected articles in a publication. The apparatus for facilitating access of auxiliary information from broadcast media comprises a memory, means for receiving an input signal, means responsive to the input signal for providing an instantaneous identification of the program as a function of the time instance at which the input signal is received and means for storing the identification in the memory.

In another aspect, this invention discloses a system for communicating information between an audience and at least one broadcast station. The system comprises an electronic program information retrieval system storing information relating to programs broadcast from the station, means coupled to the electronic program information retrieval system for receiving a request from the audience, and means responsive to the request for retrieving the information from the electronic program information retrieval system and transmitting the information to the audience. In an embodiment of this invention, means are provided in the electronic information retrieval system for collecting requests from an audience as data for estimating the size of the audience of a program.

In yet another aspect, this invention relates to a receiver of broadcast programs. The receiver comprises means for receiving broadcast programs from one of a plurality of stations at different frequencies, a clock continually providing a time measure in day, hour and minute, and means for instantaneously identifying a broadcast program, comprising a memory, means for receiving an input signal from a user, and means responsive to the input signal for storing a program identification into the memory. The program identification includes the time at which the input signal is received and an identification of the station broadcasting the program.

According to the invention, apparatus and methods are provided for ordering supplemental information about programs playing at a broadcast receiver. One embodiment is a method for providing information to a user from an information depository. The method includes the steps of reproducing in the vicinity of each of a plurality of users, programs from one of a plurality of broadcast stations, recording upon command by a user, an identification of a station and a time of a program on the station for which supplemental information is desired by the user, entering the recorded station identification and time into one of a plurality of information exchange terminals, coupling the information exchange terminal to the information depository to transmit information therebetween; and identifying a correspondence between the entered station identification and time and program in a station log to obtain the desired supplemental information. The method additionally includes the steps of compiling a station log of stations, program times, and program identifiers for programs on the stations and mapping the program identifiers in the log to supplemental information relating to specific programs. The step of identifying a correspondence between the entered station identification and time to a program in a station log to obtain the desired supplemental information includes the step of searching the station log for a station, program time, and program identifier of a program that corresponds to the entered station identification and time.

Other embodiments show the use of intelligent information agents to process user responses to broadcast information, where either the Internet or the ATM/POS data communications systems are employed to interconnect the various components of the present invention. Smart card applications are also disclosed.

Other objects and many of the attendant features of this invention will be more readily appreciated as the same becomes better understood by reference to the following detailed description and considered in connection with the accompanying drawings in which like reference symbols designate like parts throughout the figures.

BRIEF DESCRIPTION OF THE DRAWINGS

FIGS. 6A–6D show different menus displayed on the radio/recorder unit of FIG. 3 during setup;

FIG. 7 is a flow chart illustrating the steps performed by a program information retrieval system to send information to the user;

FIG. 24A is a block diagram of a radio or TV station showing the maintenance of a station log and means for communicating the station log according to the present invention;

FIG. 24B is a diagram illustrating an entry in a station log according to the present invention;

FIG. 25 is a frequency spectrum illustrating SCA FM bands;

FIG. 29A is a diagram illustrating the format of the station information according to the present invention;

FIG. 29B is a diagram illustrating station information stored in a memory in the automated information machine according to the present invention;

FIG. 31 is a diagram showing auxiliary information for a program according to the present invention;

FIGS. 34A–35J are example display screens shown on the automated information machine while initializing the information card according to the present invention;

FIG. 60 is a flow diagram of a method for correcting clock errors according to the present invention.

FIG. 63 is an example of using the information card to respond to a broadcast contest.

FIG. 70 is an example of the use of the remote control of FIG. 69 to respond to a broadcast contest.

FIG. 72 is an example of printed coupons, quiz and contest responses produced by the present invention.

DETAILED DESCRIPTION

Figure 3:
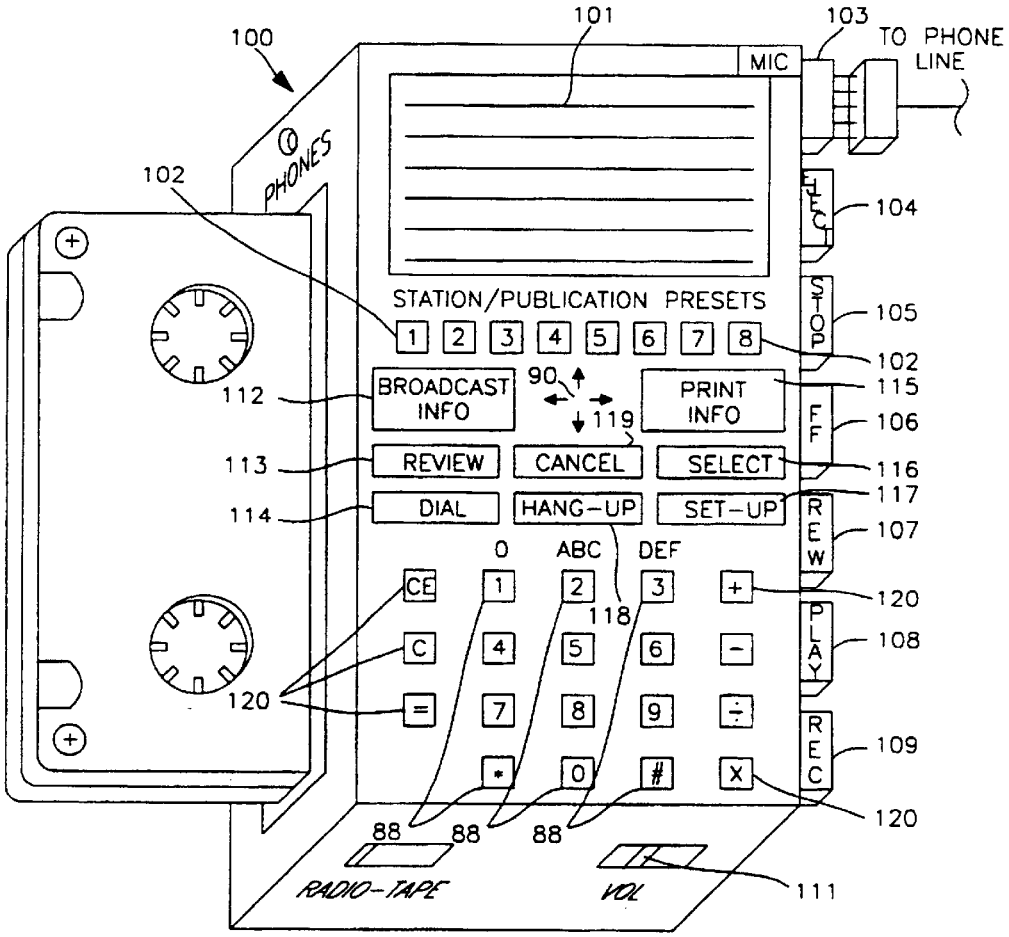
FIG. 3 is a diagram of a radio/recorder under which is one form of the receiver of FIG. 1.
Figure 4:
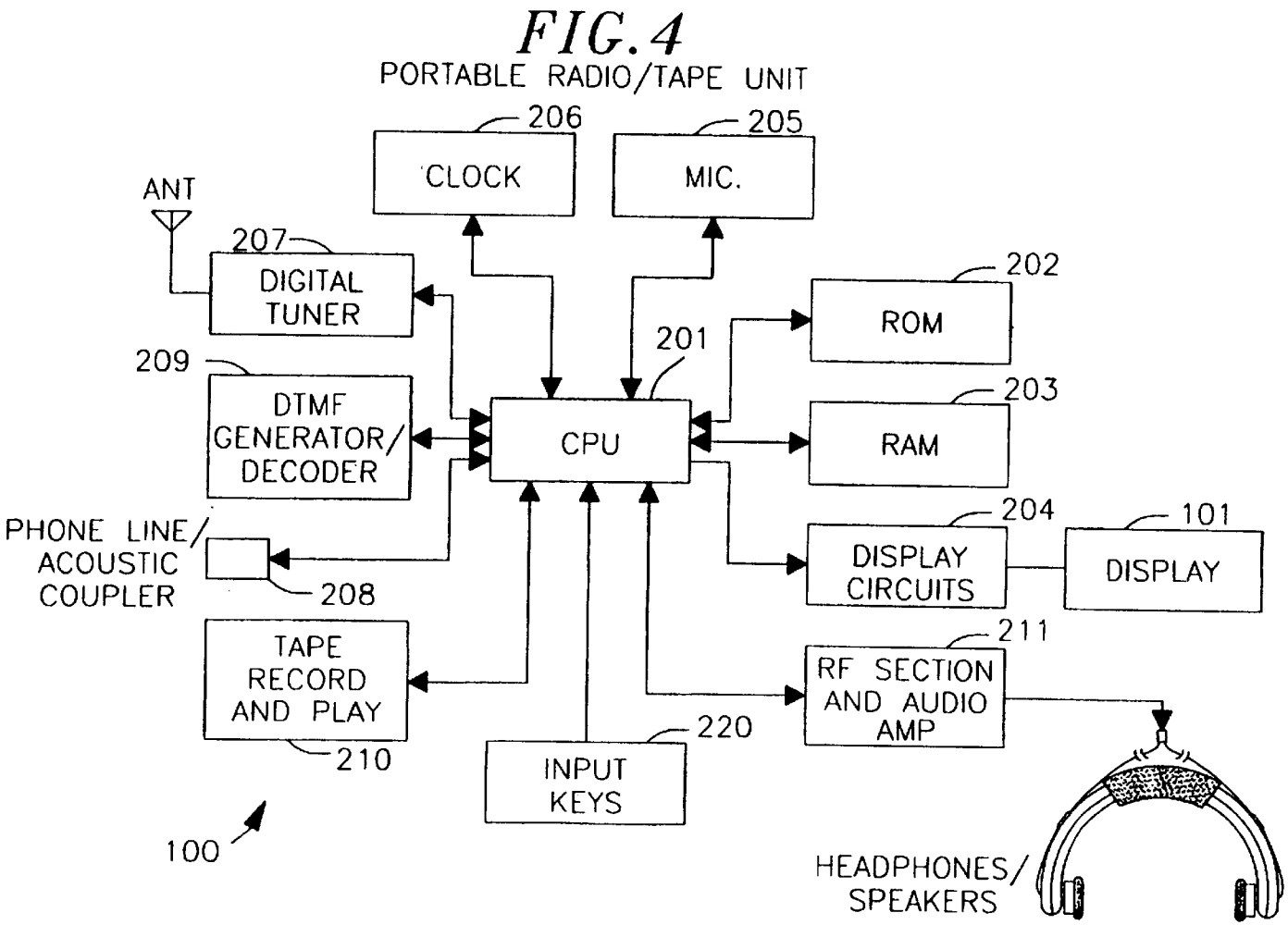
FIG. 4 is a schematic diagram showing the radio/recorder unit of FIG. 3 in more detail.
Figure 8:
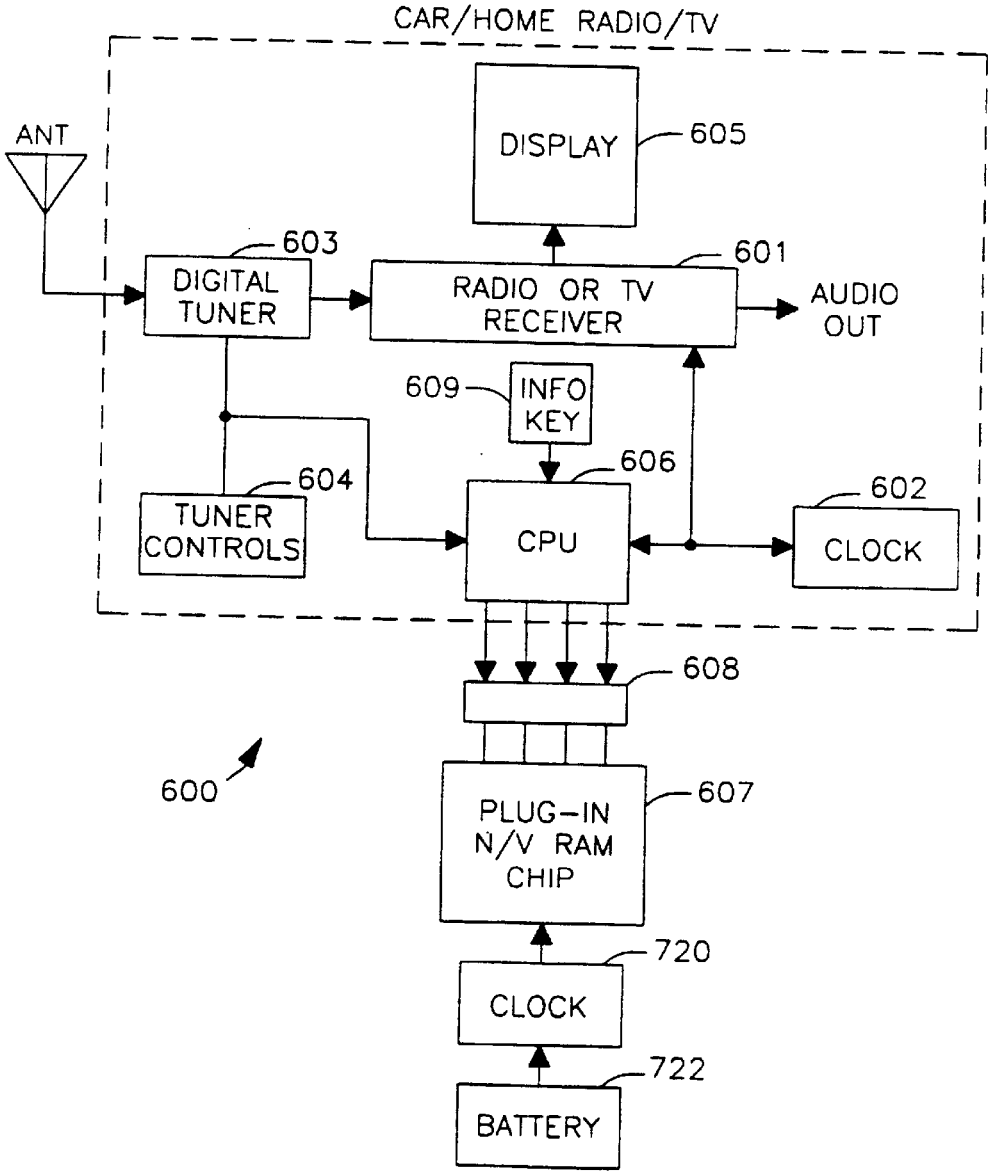
FIG. 8 is a schematic block diagram of another implementation of this invention for identifying a broadcast program.
Figure 12:
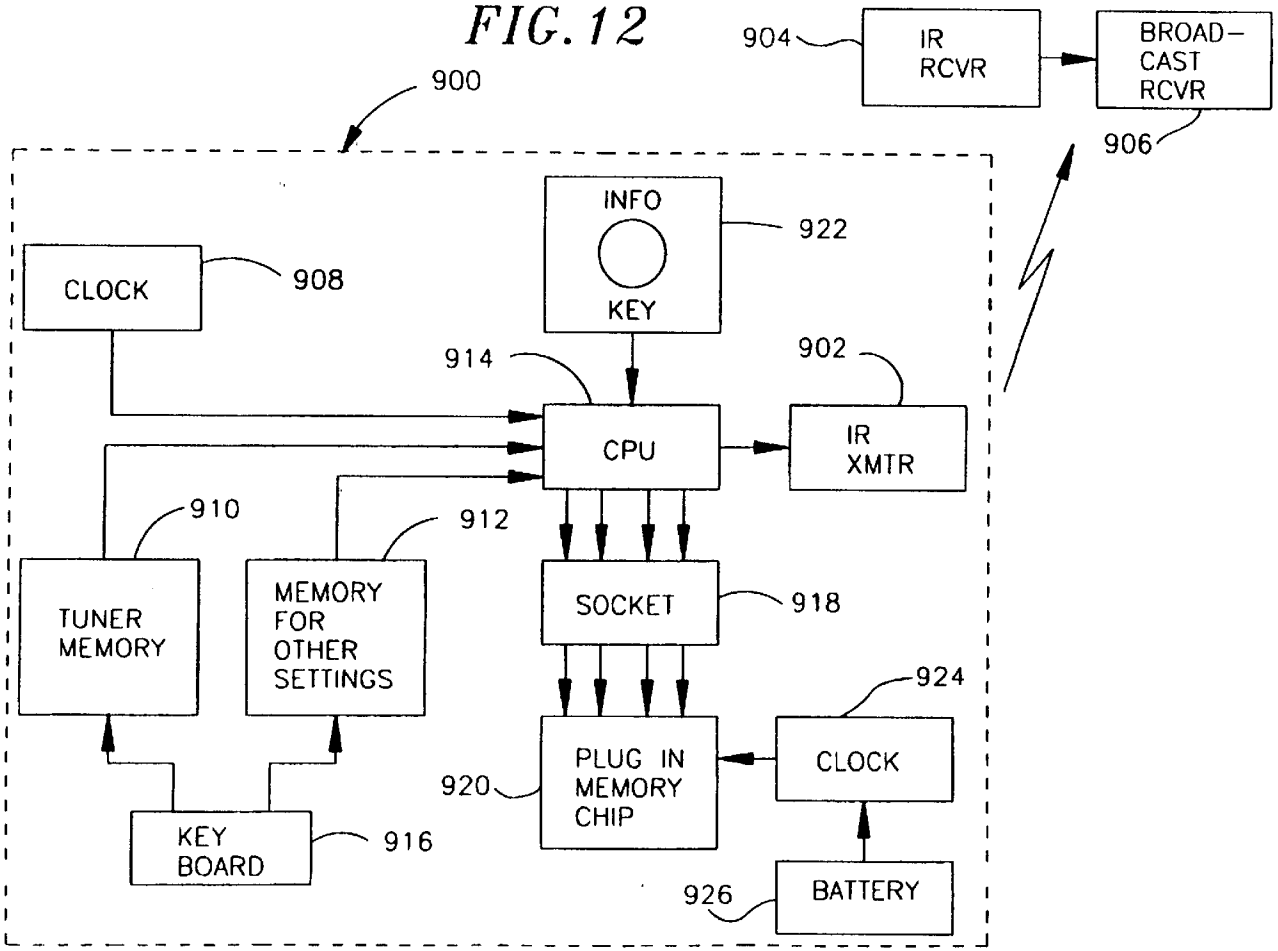
FIG. 12 is a schematic block diagram illustrating an internal design of an embodiment incorporated into a remote controller for a radio or television receiver.

The various embodiments of this invention can all be used to provide auxiliary information concerning a program being played on a station to a user. In one embodiment shown in FIGS. 1–3, a receiver includes a radio receiver, a memory, a clock, and a port for connection to a central station via a telephone line. When the user wishes to obtain auxiliary information concerning a received program, the user presses a button, which causes the station (the station the radio is tuned to), the day and the time (SDT), to be stored in the memory, which can later be downloaded to the central processor station for accessing the auxiliary information associated with the SDT for the program. In FIGS. 3 and 4, the memory and clock are housed with the radio. In the embodiment of FIG. 8 the memory and clock are separate from a radio or a television and the memory and clock are coupled via a connector to the radio or television. To access the auxiliary information the memory is uncoupled from the radio or television and plugged into an automated information machine (AIM) for accessing the auxiliary information associated with the SDTs for the programs stored in the memory. In FIG. 12, it is illustrated that the memory and clock can be incorporated into a remote controller for a radio or television. Since the remote controller controls the tuning of the radio, television, or other devices, the station is known and STD information can be stored in memory upon command. The memory can be removed from the remote controller and plugged into an AIM for accessing the auxiliary information associated with the SDTs for the programs stored in the memory. In another embodiment, shown in FIGS. 13A and 13B, the clock and memory are in a stand alone information card, with a keyboard with keys that have been set up to correspond to certain stations. The user presses a key to store SDT information in the memory and then the information card can be connected to an AIM for accessing the auxiliary information associated with the SDTs for the programs stored in the memory.

Figure 59:
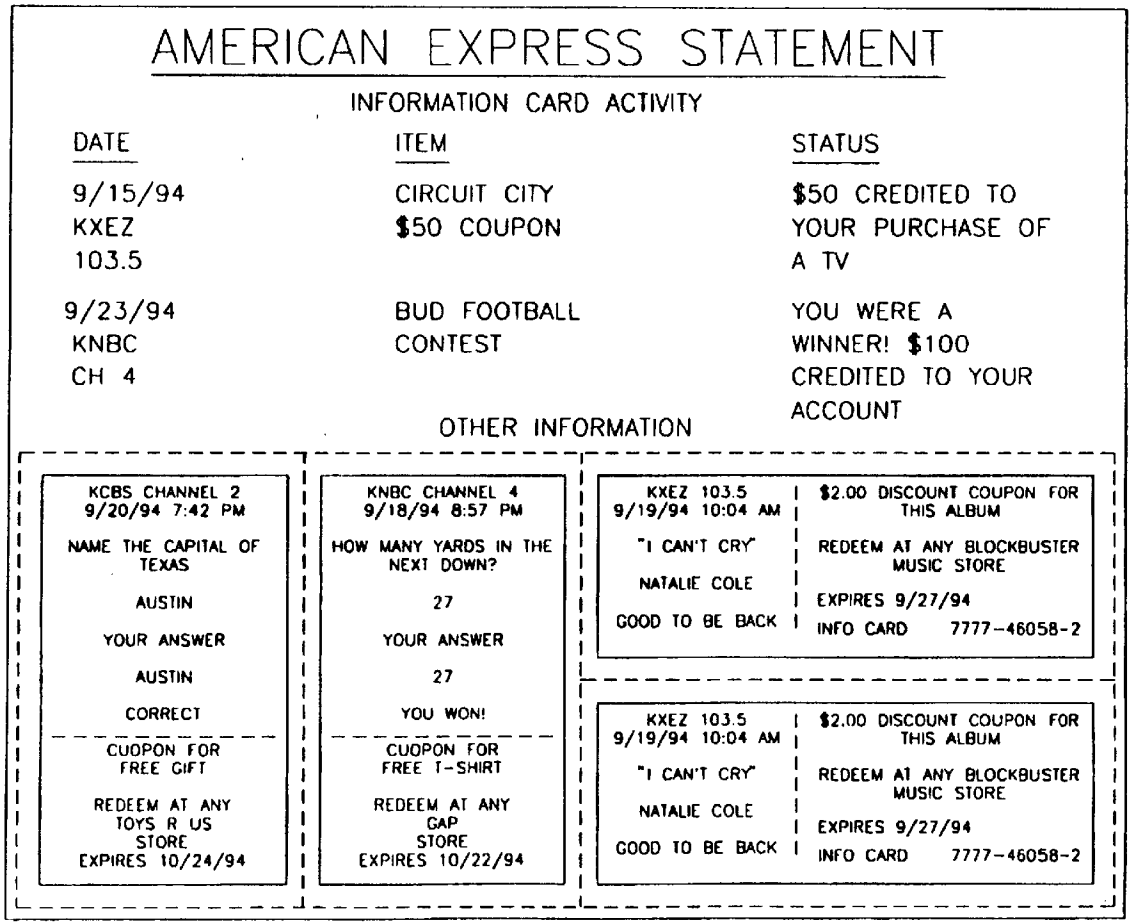
FIG. 59 is an example of a monthly credit card statement including data related to information card activity according to the present invention.

In all the embodiments the auxiliary information can be obtained from an AIM, a central computer server, or a distributed data base accessed over a network. In another embodiment shown in FIGS. 53 and 54, the auxiliary information can be obtained from an automated teller machine (ATM) or a point of sale (POS) terminal. In another embodiment the auxiliary information is provided to a user with the user's credit card statement, as shown in FIG. 59.

In yet another embodiment a smart card with memory only, can be coupled to a radio, television, or remote controller, which contains a clock and a station controller for providing SDT to the smart card when the user presses a button on the radio, television, or remote controller to obtain auxiliary information about a program. The SDT is read from the smart card at a ATM or POS terminal to obtain the auxiliary information for the user.

The foregoing is a brief summary of some of the embodiments and in all the embodiments the broadcast stations are part of the system. The following is a detailed description of the embodiments.

Figure 1:
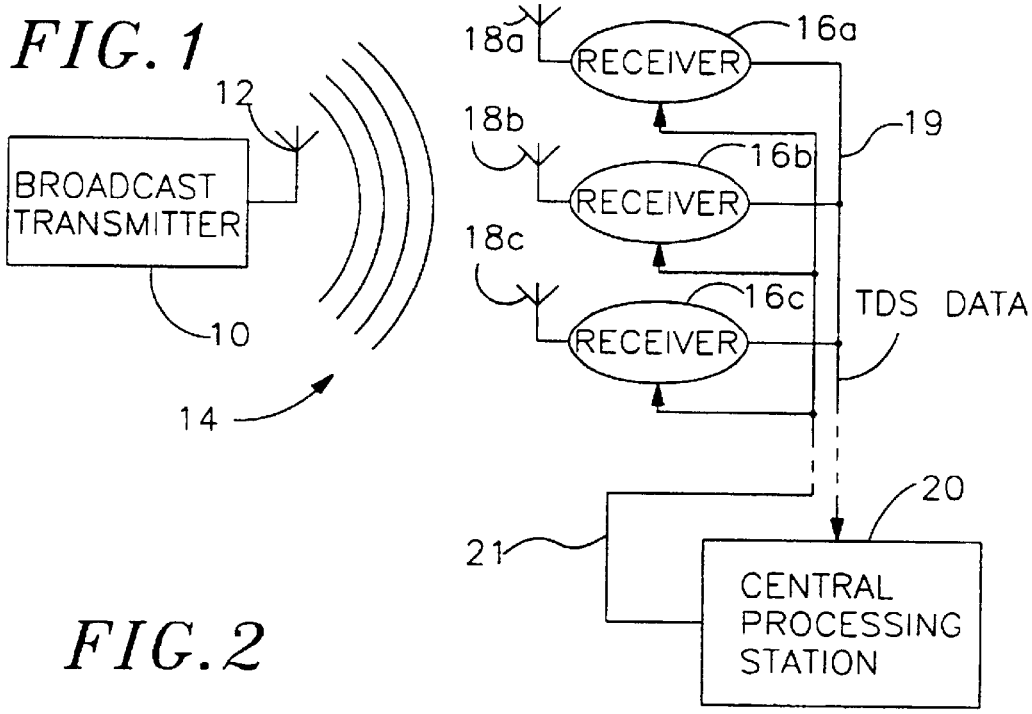
FIGS. 1 is a schematic block diagram of a preferred embodiment of the invention.

With reference to FIG. 1, a broadcast transmitter 10 having an antenna 12 broadcasts a radio or television signal represented by 14 to a plurality of receivers 16a, 16b, 16c, . . . , which have respective antennas 18a, 18b, 18c, . . . . The radio or television signal typically carries a program such as news, music, drama, or commercial messages. When a listener or viewer, hereafter called a "user", at one of receivers 16a, 16b, 16c, . . . wishes to receive more information about the subject of the program, hereafter called "auxiliary information", the user issues a store command by actuating a manual input device such as key or button. As described below, each receiver has a local real time clock that indicates time and day and a readout device that indicates the station or channel to which the receiver is tuned. Responsive to the store command, the station or channel, day, and time (SDT) is recorded in a memory at the receiver. As represented by a line 19, the recorded station, day and time (SDT) data is transmitted to a central processing station 20 with a user identification tag in one of a number of ways. For example, the SDT data could be stored on a removable memory chip that is carried or mailed to central station 20 by the listener or user. Or the SDT data could be transmitted by modem to central station 20 over a telephone line periodically in response to an interrogation command. The local real time clocks are synchronized to a master clock at central station 20, preferably through line 19. As represented by a line 21, the auxiliary information is transmitted to the particular listener or viewer requesting it in one of a number of ways described below.

Figure 2:
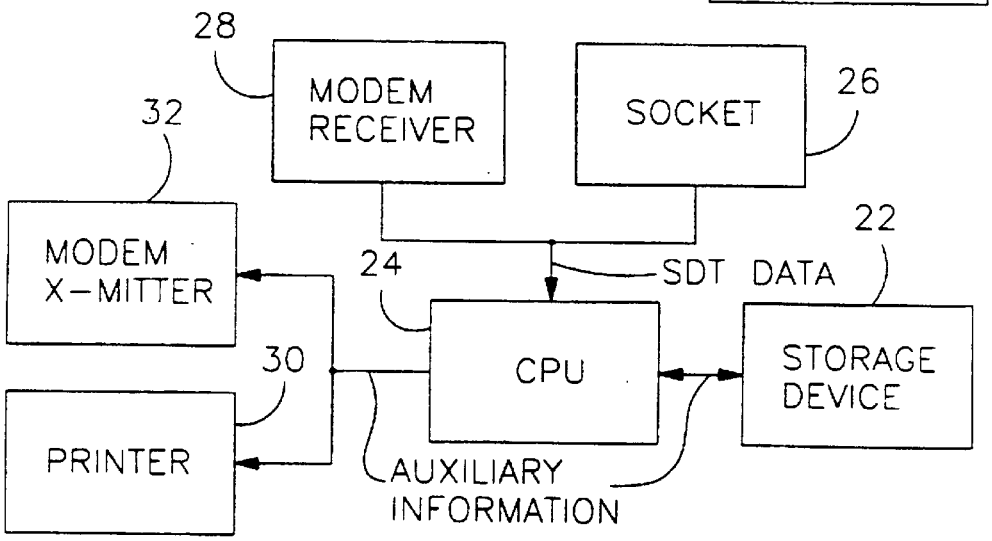
FIG. 2 is a schematic block diagram of the central processing station shown in FIG. 1.

Central station 20, which serves as a remote program information retrieval system (PIRS), is shown in FIG. 2. Auxiliary information about the broadcast programs is stored in storage device 22 such as a random access memory or a optical disk. The auxiliary information is organized in storage device 22 so it can be accessed according to the broadcast schedule, i.e., time, day, and station. In other words, the SDT data is mapped in storage device 22 to the auxiliary information for the program uniquely identified by the SDT data. The auxiliary information could take various forms depending upon the nature of the broadcast program. For example, if the program comprises musical selections, the auxiliary information could be the name, artist, and label of the musical piece; if the program comprises a drama, the auxiliary information could be a summary of the dramatic piece; if the program comprises a public interest discussion, the auxiliary information could be a written transcript of the program; and if the program is a commercial, the auxiliary information could be the name and address of a retail or mail order business where the advertised product or service can be acquired or an infomercial about the product or service. Similarly, the auxiliary information could be in textual, graphic, and/or video form. A central processing unit (CPU) 24 controls the storing and retrieving of auxiliary information in storage device 22. If the SDT data is transmitted to central station 20 by a plug in memory chip, the chip is inserted in a compatible memory receiving socket 26 which is connected to CPU 24. If the SDT data is transmitted to central station 20 by modem, the telephone line is connected to a modem receiver 28, which is connected to CPU 24. In any case, the SDT data uniquely identifies the individual programs being broadcast and serves as addresses to access the auxiliary information in storage device 22 relating to the individual programs. The auxiliary information can be transmitted to the listener or viewer in a number of ways. For example, a hard copy of the auxiliary information could be made on a printer 30 under the control of CPU 24 and delivered to the home by mail or messenger; the auxiliary information could be stored in electronic form, i.e. floppy disk computer tape, audio tape, or video tape, which is delivered to the home or picked up by the user at a service center, the auxiliary information could be sent back to the listener or viewer by a modem transmitter 32; or the auxiliary information could be sent back to the listener by a cable or broadcast television link. The user identification tags can be matched with demographic data about the users stored at central station 20 to provide a demographic profile of the users who responded to each program with a request for auxiliary information.

FIG. 3 illustrates one of the receivers, which takes the form of a portable radio/recorder unit 100. The unit 100 has a conventional radio and a tape recorder. The radio has a tuner for receiving broadcast signals from different radio stations, including amplitude modulation (AM) stations and frequency modulation (FM) stations. As an option, television audio reception is added to the FM tuner so that the unit 100 can receive audio signals from television (TV) stations. (Hereinafter, a "station" may also be referred to as a "channel").

Like many of today's units, unit 100 has a circuit for providing a time-of-day clock in hour, minute and second. Preferably, the clock further measures day, as well as month and year. The time measure of the clock is displayed on a display 101.

Like many conventional units, the unit 100 is equipped with a plurality of station presets. The station presets allow a user to selectively store certain stations into a memory so that the unit 100 can be tuned to any one of the preset stations by simply touching a Station/Publication Preset Key 102.

The unit 100 has a circuit for generating dual tone multiple frequency (DTMF) signals so that it can send messages through a telephone. A jack 103 for receiving a telephone plug is provided.

As will be described in reference to FIG. 4, a random access memory (RAM) is provided to store a plurality of telephone numbers, one corresponding to each of the station presets.

The display 101 is preferably one with low power consumption such as a liquid crystal display (LCD). It is normally used to display the frequency of the tuned station and/or the time of day.

The unit 100 also has a conventional magnetic tape recorder PLAYER. As in many standard recorders, a set of keys, including the EJECT 104. STOP 105. FF (fast forward) 106, REW (rewind) 107. PLAY 108 and REC (record) 109 keys are provided. And as in many conventional units, the unit 100 also has a radio-recorder key 110 to allow a user to select either the radio or the recorder, as well as a VOL control 111 to allow a user to change the volume output.

The unit 100 has a set of telephone keys 88-1 through 88-12 to provide a twelve-button key pad similar to that of a conventional telephone. In particular, the telephone keys 88-1 through 88-12 are the number keys "1" through "0", the star "*" key and the pound sign "#" key respectively. The letters of the alphabet are assigned to the telephone keys "2" through "9" as they are for a conventional telephone. For example, the letters ABC are assigned to the telephone key "2". However, unlike the conventional telephone key pad, the letters Q and Z are assigned to the telephone keys "1" with "0" respectively.

Alphabet characters are entered by a double key entry which is well-known to those skilled in the art. Each character is represented by two numbers. For example, the telephone key "2" corresponds to the letters ABC. However, pressing the key "2" once does not uniquely select one of the three letters. By pressing the "1" key, after pressing the "2" key, the first character or "A" is entered. Similarly, if "B" is being selected, the user presses the telephone key "2" and then again presses the telephone key "2" to select the second character "B". Other characters are similarly entered.

Alternatively, a standard keyboard such as used for typewriters or computers may be used.

A set of cursor keys 90 is provided to let a user moves a cursor on the display 101. The cursor keys 90 include a left arrow key for moving the cursor to the left, an up arrow key for moving the cursor upward, a down arrow key for moving the cursor downward and a right arrow key for moving the cursor to the right.

Beside the above described keys, the unit 100 also has a set of keys, including a BROADCAST INFO KEY 112, a DIAL key 114, a REVIEW key 113, a CANCEL key 118, a HANG UP key 119, a PRINT INFO key 115, a SELECT key 116 and a SETUP key 117. The functions of these keys will be described below along with the reference to the flow charts of FIGS. 5A–5B.

FIG. 4 is a schematic block diagram of an internal design of the unit 100. Operation of the unit 100 is controlled by a central processing unit (CPU) 201. The CPU 201 can be any one of the many of-the-shelf microprocessors on the market, such as a 8080 microprocessor manufactured by Intel Corporation, or a custom-made chip. It is coupled to a read only memory (ROM) 202 which stores operation software for operating the CPU 201.

The CPU 201 is connected to a random access memory (RAM) 203. The RAM 203 is used for storing the station presets and program identifications. It is also used for providing a scratch pad for the CPU 201 in performing other functions such as in operating the display 101 and for temporary storage of SDT data until it is sent to central station 20. Since it is contemplated that the unit 100 is portable, at least a portion of the RAM 203 is therefore implemented with non-volatile memory, such as a electrically erasable programmable read only memory (EEPROM) or a volatile memory with a battery backup, so that reusable data can be stored.

The CPU 20 is coupled to display control circuit 204 which controls the display 101 and a clock circuit 206 which controls the clock. Clock circuit 206 generates the signals representative of time and date. The digital tuner of the unit 100 is controlled by the CPU 201 through a digital tuner circuit 207, and the tape recorder of the unit 100 is controlled by the CPU 201 through a tape recorder control circuit 210. Digital tuner circuit 207 stores the frequency to which the receiver is tuned and thus generates the signal representative of the station to be stored. Designs for these circuits are known to a person skilled in the art, therefore, detail explanation thereof is deemed unnecessary.

Optionally, CPU 201 is also connected to a radio frequency section and audio amplifier, to which a head phone or a speaker can be connected.

The unit 100 has a microphone which is controlled by the CPU 201 through a conventional microphone interface 205. The CPU 201 also has control of a telephone and acoustic coupler circuit 208, and a DTMF generator and decoder through a DTMF circuit 209. The circuit 208 can be connected directly to telephone jack 103, or optionally to an acoustic coupler located on the rear surface of the unit 100. These devices are used to connect the unit to central station 20 and to receive from central station 20 auxiliary information on a broadcast program. Each of the circuits 208 and 209 can use one of the designs available in the art. Although all three devices are shown in FIG. 4, not all of them are needed.

As represented by block 220, the CPU 201 controls and receives the plurality of input keys shown in FIG. 3, specifically the BROADCAST INFO key 112, the DIAL key 114, the REVIEW key 113, the CANCEL key 118, the HANG UP key 119, the PRINT INFO key 115, the SELECT key 116 and the SETUP key 117.

When BROADCAST INFO key 112 (FIG. 3) is pressed by the listener or viewer to indicate an interest in auxiliary information, the SDT data from clock circuit 206 and tuner 207 are immediately coupled by CPU 201 to RAM 203 for temporary storage until the unit is later interrogated to transmit the SDT data to central station 20 via circuit 208. When the unit is interrogated to transmit the SDT data to central station 20. CPU 201 retrieves the SDT data from RAM 208, adds a user identification tag unique to the particular user, and supervises the transmission process.

In addition to its function as a regular radio or recorder PLAYER, unit 100 also operates to provide instantaneous identification and registration of broadcast programs of interest to a user as described above and in more detail below with reference to the flow charts of FIGS. 5a–5b.

When powered up, preferably by batteries (not shown), the unit 100 operates as a standard radio or a standard recorder, depending on the setting of the radio-tape key 110. An identification of the tuned station and the time-of-day clock may be shown on the display 101.

When any one of the enhancement keys is actuated, the CPU 201 is interrupted and a corresponding interrupt subroutine is executed.

When the SERUP key 117 is activated, step 401 is performed in which a setup menu similar to that illustrated in FIG. 6a is put on the display 101. The setup menu allows a user the options of: (1) setting the preset keys 102 to preferred stations by selecting the "BROADCAST STATIONS" option, (2) setting the preset keys to preferred publications by selecting the "PUBLICATIONS" option, (3) setting a user identification by selecting the "USER ID" option and (4) setting the clock 206 by selecting the "CLOCK" option. A user can select any one of these options by using the cursor keys 90 to move the cursor to a desired option and then pressing the SELECT KEY 116. When the SELECT KEY 116 is pressed, the position of the cursor (step 422) is noted and this position is used to set a pointer to point to a location in the RAM 203 (step 423). Under the setup operation, the pointer would point to a routine in memory to be executed by the CPU 201 for setting the unit 100.

If the user selects the "BROADCAST STATIONS" option, step 402 is entered and a menu similar to that illustrated in FIG. 6B is displayed. Under this menu, a user can use the cursor key 90 to select any one of the entries corresponding to the preset keys 102. When the cursor key 90 is positioned at the selected entry, the user can then press the SELECT KEY 116. In step 403, the user can set the corresponding preset keys 102 to a selected station by entering the name and frequency of that station.

In step 403, the user can enter a telephone number which will be used for retrieving information from a program information retrieval system wherein programs broadcast from the station is stored. It is contemplated that the telephone number is provided by the television or radio station through publication in newspapers (e.g. the TV/radio section) or the television guides, etc. The telephone number may be the number for the station itself which has its own program information retrieval system, or it may be the number of central location which keeps schedules and information of broadcast programs of several different stations in a PIRS.

The name, frequency and telephone number entered by the use at step 403 are stored into the non-volatile portion of the RAM 203.

The user can set another preset key 102 or execute the exit option which causes the CPU 201 to re-display the set-up menu of FIG. 6a.

If the user selects the "PUBLICATIONS" option, step 404 is entered and a menu similar to that shown in FIG. 6C is displayed. Under this menu, the user can set any of the preset keys 102 (steps 404 and 405) in a similar way as in steps 402 and 403, with the exception that in step 405, the user is no longer prompted to enter a station frequency. Instead, the name of the publication and a corresponding telephone number for the publication PIRS are entered. The data entered by the user are stored in the RAM 203 in similar a manner as that described in the previous paragraph.

If the user selects the "USER ID" option, step 406 is entered and a menu similar to that shown in FIG. 6d is displayed. Under this menu, the user can optionally enter his name, address and telephone using the alphabet option of the telephone keys 88. The entered data are stored in the RAM 203.

If the user selects the "CLOCK" option, steps 408 and 409 are executed and the CPU 201 prompts the user to enter a new clock value. As setting of the clock is similar to that found in many existing television and VCR remote controls, detail explanation thereof is thus deemed unnecessary.

When the user finishes with the setup operation, the "EXIT" option can be selected from the setup menu of FIG. 6a to terminate the setup. The station frequency and the clock value are again displayed.

A user can tune the unit 100 to any one station and listen to the broadcast using headphones. When a program (including, music, commentary, commercial, etc.) from that station is of interest to the user, the BROADCAST INFO key 112 can then be actuated. Thereupon, step 411 is entered. In step 411, the CPU 201 stores into the non-volatile portion of the RAM 203 an identification of the station, along with the time of the clock at which the BROADCAST INFO key 112 is pressed.

The station can be identified by its broadcast frequency or the name of the station (e.g. using 105.1 to retrieve the name KKGO). Using the station name is considered more advantageous because it is easier of the listener to recognize the station name than recognizing the frequency.

From the identification stored in the RAM 203, the user can retrieve auxiliary information of an identified program. This is performed by connecting the unit 100 to a telephone using a modular connector or an acoustic coupler. When the unit 100 is connected, the user can press the REVIEW KEY 113.

When the REVIEW KEY 113 is actuated, program identifications previously stored in the RAM 203 are retrieved (step 414) and displayed on the display 101 (step 415). There are several formats in which this information can be displayed. For example, the stored identifications may be displayed with the identifications organized by stations. The advantage of this format is that the user can now review the identified programs for one station before the corresponding telephone number is dialed. Another format is to organize the identification by dates. This format may help the user to more easily find a particular program previously registered.

When the previously identified programs are displayed, the user can use the cursor keys 90 to select the particular program of, or a particular station from, which the user is interested in getting the auxiliary information. When the program or the station is selected, the user can actuate the DIAL KEY 114 and the corresponding telephone number is retrieved (step 416) and dialed (step 417). When telephone connection is established, the CPU 201 retrieves the station identification from the RAM 203 and activates DTMF generator and decoder circuit 209. DTMF tones are then generated to send the program identification(s) to the PIRS of the station or central location (step 418). After the program identification is sent, the CPU 201 waits for the PIRS to transmit the information back (step 419).

In step 418, a user identification, which was entered previously under the USER ID option, may optionally be sent to the PIRS. The user identification may be a name, address and telephone number as described previously, or it may simply be a number such as his social security number. Transmitting the user identification has the advantage that it allows the PIRS to send bulky written information through mail or by direct telephone call.

FIG. 7 is a flow chart illustrating the steps of the PIRS when a request is received.

Upon receiving a request (step 501), the PIRS uses the station ID from the program identification to locate data for that station (step 503). (However, if the PIRS is an in-house system of a station step 503 may not be needed.)

In step 504, the clock value from the program identification is decoded to search the identified program. When the identified program is found, the PIRS retrieves auxiliary information (step 505) thereof.

Advantageously, the PIRS makes a record of the request. This record can then be used to provide statistical data for determining the popularity of the program, the station or other audience monitoring type data (step 506).

The PIRS sends the auxiliary information to the user by first sending a DTMF tone to unit 100 (step 507). The DTMF tone is received by the DTMF generator and decoder circuit 209 of the unit 100, which then interrupts the CPU 201. The CPU 201, upon interrupted by circuit 209, starts the tape recorder through control of the circuit 210. When the tape recorder is started, a signal is sent to the PIRS to initiate transmission of the auxiliary information (step 508). When the auxiliary information from the PIRS is received by the unit 100, they are stored on the tape.

If the auxiliary information relates to a musical selection, it might include the album, artist and title along with a short (e.g. 10 second) audio segment of the selection so that the user can relate the melody to the title. This concept is disclosed in my U.S. Pat. No. 5,119,507. if the auxiliary information relates to an advertisement, a portion of the ad may be repeated along with the auxiliary information to relate the product or service to additional information.

At completion of the transmission, the PIRS generates a DTMF tone to the unit 100 to stop the tape recorder and terminate the telephone connection (step 509). A signal can also be generated at the unit 100 so that the user is alerted to the completion and availability of the auxiliary information.

Figure 5A:
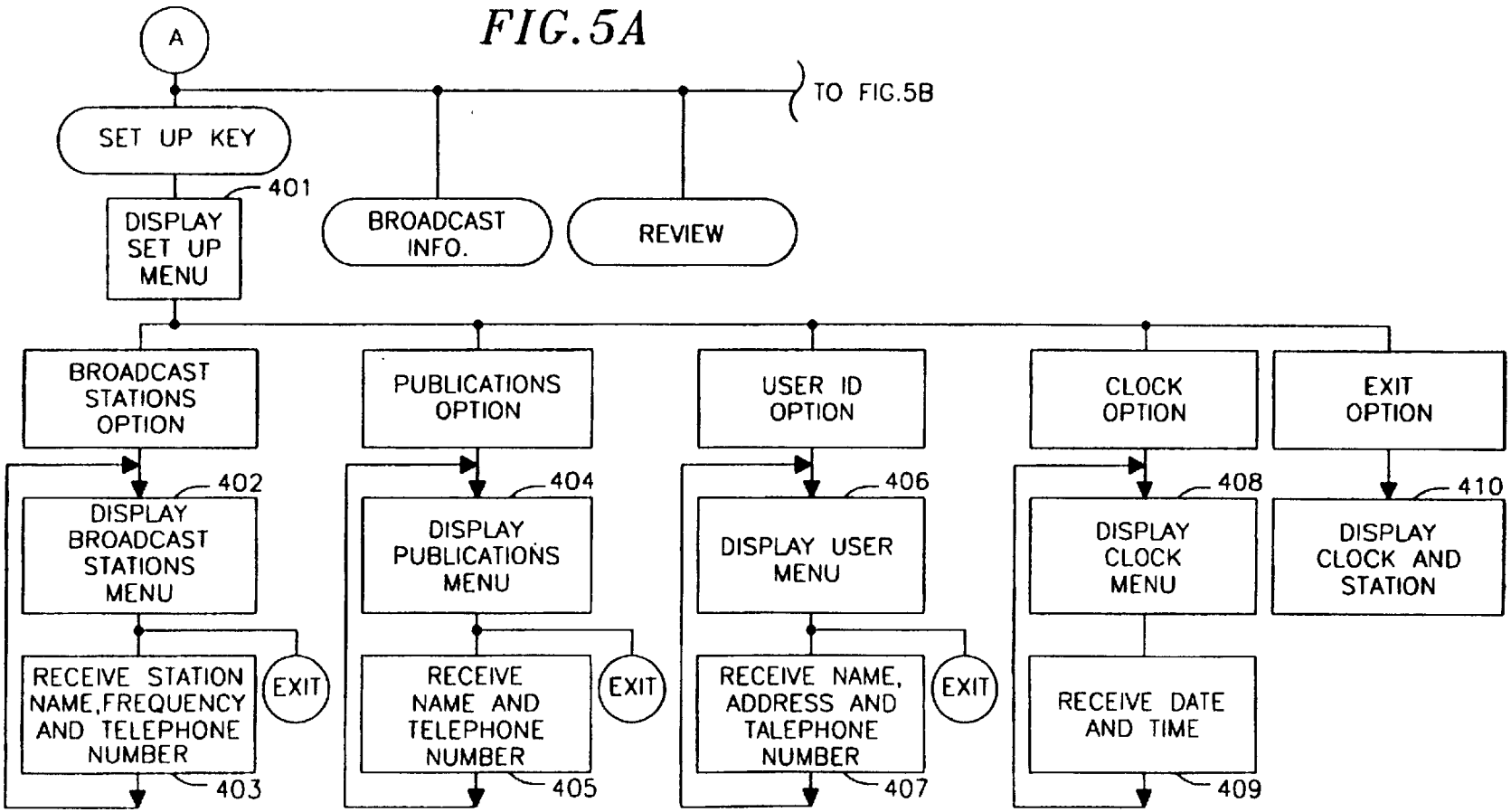
FIGS. 5A–5C is a flow chart illustrating the steps performed by the CPU of the unit in FIG. 4 in response to actuation of keys on the unit 100 shown in FIG. 3.
Figure 5B:
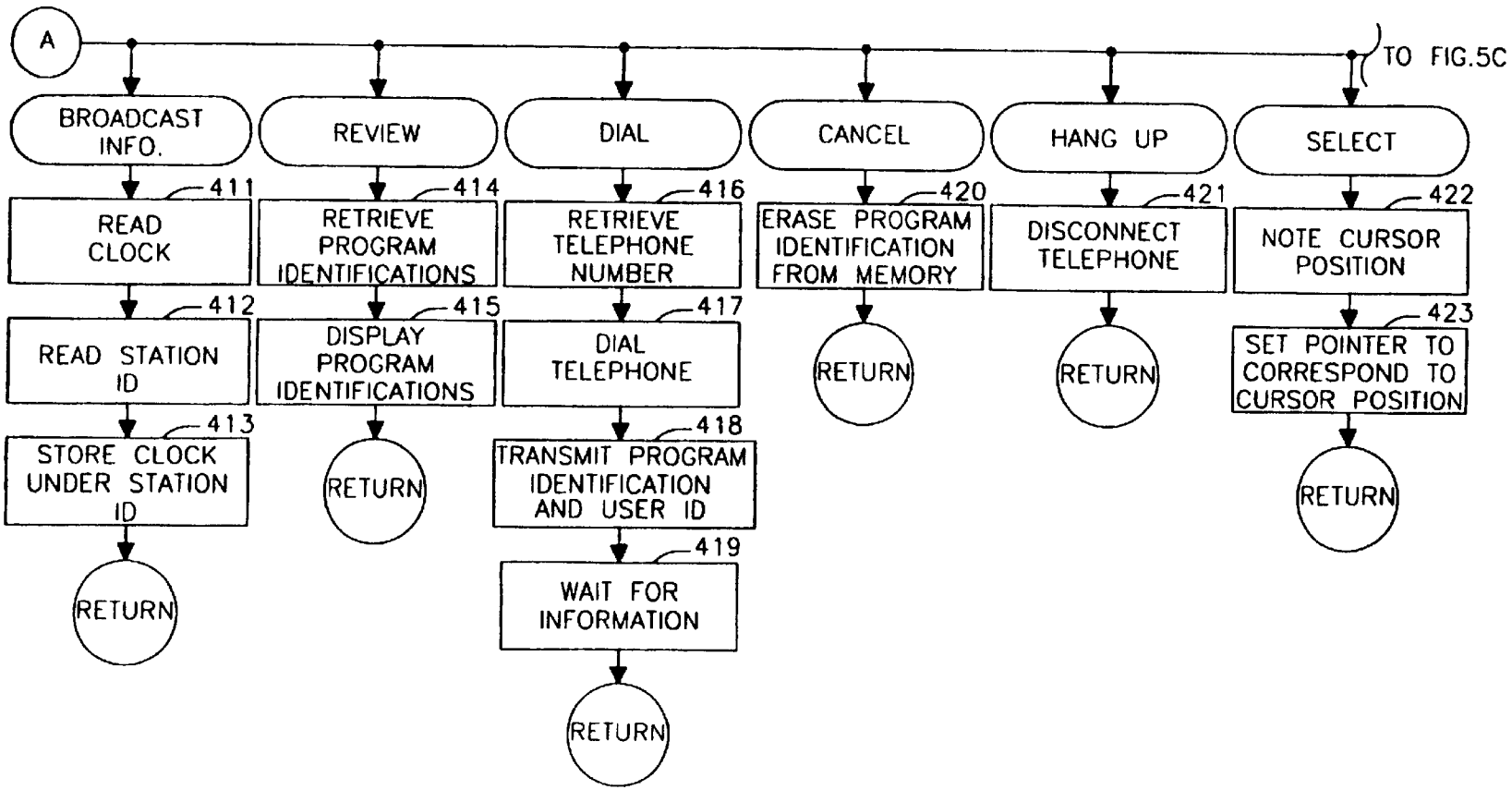
Figure 5C:
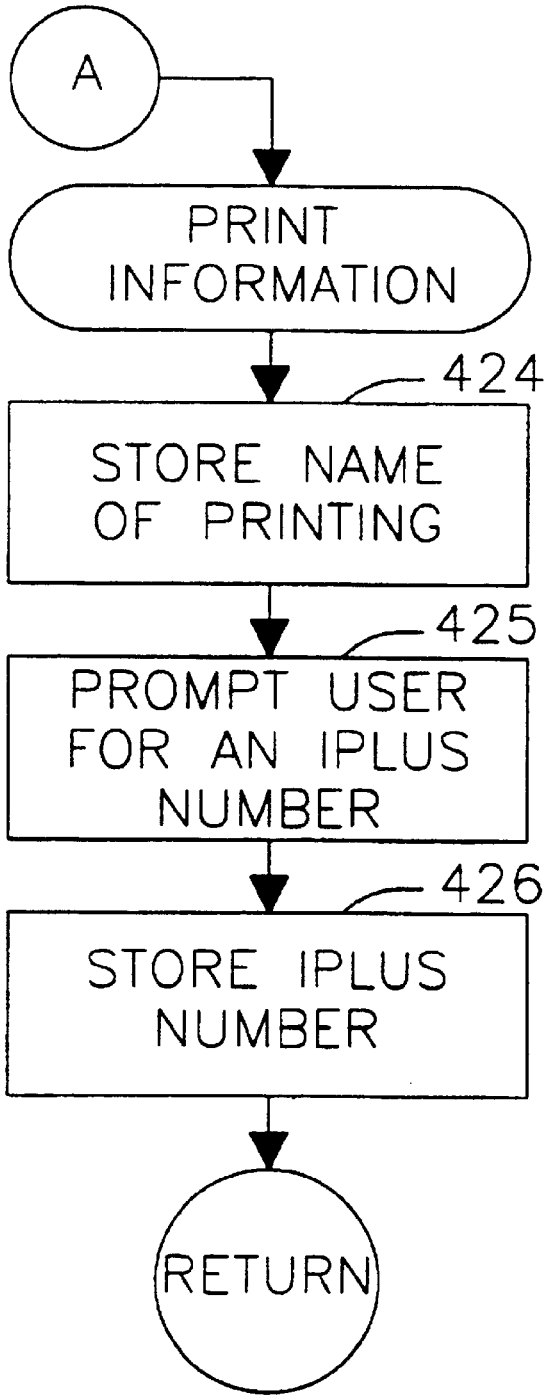

Referring back to the flow charts of FIGS. 5a–5b, if the user at any point during the retrieval of the auxiliary information decides to cancel the operation, the Hang Up key 119, can be actuated, and the telephone connection is cut (step 421).

When the program identifications are displayed upon actuation of the REVIEW KEY 113, a user may select to cancel a previously stored program identification from the RAM 203. This may be done by first using the cursor keys 90 to select the program identification the user wishes to cancel. Once the program identification is selected, the CANCEL KEY 118 can be actuated and the data corresponding to the selected program identification is thereby erased from the RAM 203 (step 420).

When the transmission is completed, the user can either hear the information directly from the tape recorder, or, optionally, the signals stored in the tape may be interpreted by the CPU 201 to produce text data which can then be displayed on the display 101.

Although the above is described with reference to identifying a radio program, the invention is not so limited. As described above, during setup of the unit 100, a user can also program the preset keys to store names of different publications (such as the Los Angles Times, Newsweek, Barrons, etc.), along with a corresponding telephone number for each publication. When reading an article, the user can press the corresponding preset key 102. When the user reads an article or an advertisement of interest, the PRINT INFO key 115 can be actuated to store the name of the publication into the RAM 203 (step 424). The CPU 201 then prompts the user for a code number such as an I PLUS number (step 425), which may be found printed in the article or the advertisement. The user enters the I PLUS number through the telephone keys 88, which is then stored into the RAM 203 (step 426).

To retrieve information on the identified article or advertisement, the user connects the unit 100 to a telephone. The REVIEW KEY 113 can be actuated to display the identification and then the DIAL KEY 114 to connection the unit to the PIRS as described above. The information is then retrieved through the telephone connection as disclosed previously.

In the above described embodiment, the identification of a broadcast program is recorded as a number so that it is sent over the DTMF tone. However, if unit 100 has a modem, more detailed program identification can be entered and sent to a PIRS, and a PIRS can send text information to unit 100. Moreover, if unit 100 has a modem, the transmitted information need not be stored on the tape, but directly in the RAM 203 which can then be displayed at display 101.

As an option, the unit 100 can be implemented to have keys commonly found in a calculator, as shown in FIG. 3. The CPU 201 can then be implemented to be able to perform mathematics so that the unit 100 can be used as a calculator.

A user need not be listening to the unit 100 in practice, but can be listening to any radio or television (including a car radio), with the unit 100 set to the same tuned station. Then, if there is program of interest, the BROADCAST INFO key 112 can be actuated to identify the program.

Preferably, the clock 206 is set to correspond to the local time. An audible DTMF tone can be broadcast by a local station on the hour a few times each day, so a user can synchronize the unit 100 using its internal radio circuit or from another radio, using the microphone of the tape recorder to detect the audible tone and reset the clock to the hour. Alternatively, a synchronizing DTMF tone can be downloaded to unit 100 via a telephone link to the central processing station through coupler circuit 208.

FIG. 8 is a block diagram illustrating schematically another embodiment of the present invention. This embodiment is a receiver 600 which is a modification of a common radio or television. The receiver 600 comprises a radio receiver circuit 601, a digital tuner 603 and a tuner control circuit 604 all of which can be found in standard radio or television sets. As in many common units, the receiver 600 may have a clock 602. If a clock is not present, one can be built easily. Preferably, the clock 602 measures and indicates date in addition to hour, minute and second.

In accordance with the present invention, the receiver 600 has a CPU 606 coupled to the digital tuner 604 and the clock 602. The CPU 606 has means 608, such as a socket for receiving a non-volatile memory chip 607 such as a EEPROM, or a magnetic strip recorder receiving a card with a magnetic strip. If a clock and battery are incorporated into chip 607 as described below, a less expensive volatile memory could be used.

The CPU 606 is activated when a "BROADCAST INFO" key 609 is actuated. When activated, the CPU 606 operates to store an identification of the tuned station (e.g. its frequency from the digital tuner 604) to the memory chip 607 along with the value of the clock 602 at the time the key 609 is actuated.

Since the memory 607 may be used separately (i.e. in different receivers), it becomes necessary to have a memory management scheme so that the CPU 606 can know where to write new data thereon each time. One such memory management scheme is to maintain a pointer in the memory 607. The pointer is kept at a predefined location, such as the first address. It points to a location in the memory for inputting the next data. When the memory 607 is inserted into the socket 608, the pointer is read by the CPU 606.

When a user hears a program of interest, the BROADCAST INFO key 609 can be actuated, which causes the station identification and the clock to be stored into the memory 607. Optionally, a user identification, which may be preset into the receiver 600, is also stored for purposes described above.

As described above, the user can retrieve information about the broadcast program by removing the memory 607 from the socket 608 and inserting it in a retrieval device (hereinafter called an Automatic Information Machine), which is one useful form of central station 20.

It is contemplated for this embodiment that a plurality of these Automatic Information Machines (AIMs) will be installed in different locations, such as in record stores and other retail establishments.

In the AIM, the time and station of the broadcast program is retrieved from the memory 607. From such identification, information such as the title (and/or other information, such as the singer) of a song is output in print form. With this information, the user can, for example, either purchase a record of the song, or other records by the same singer.

Figure 9:
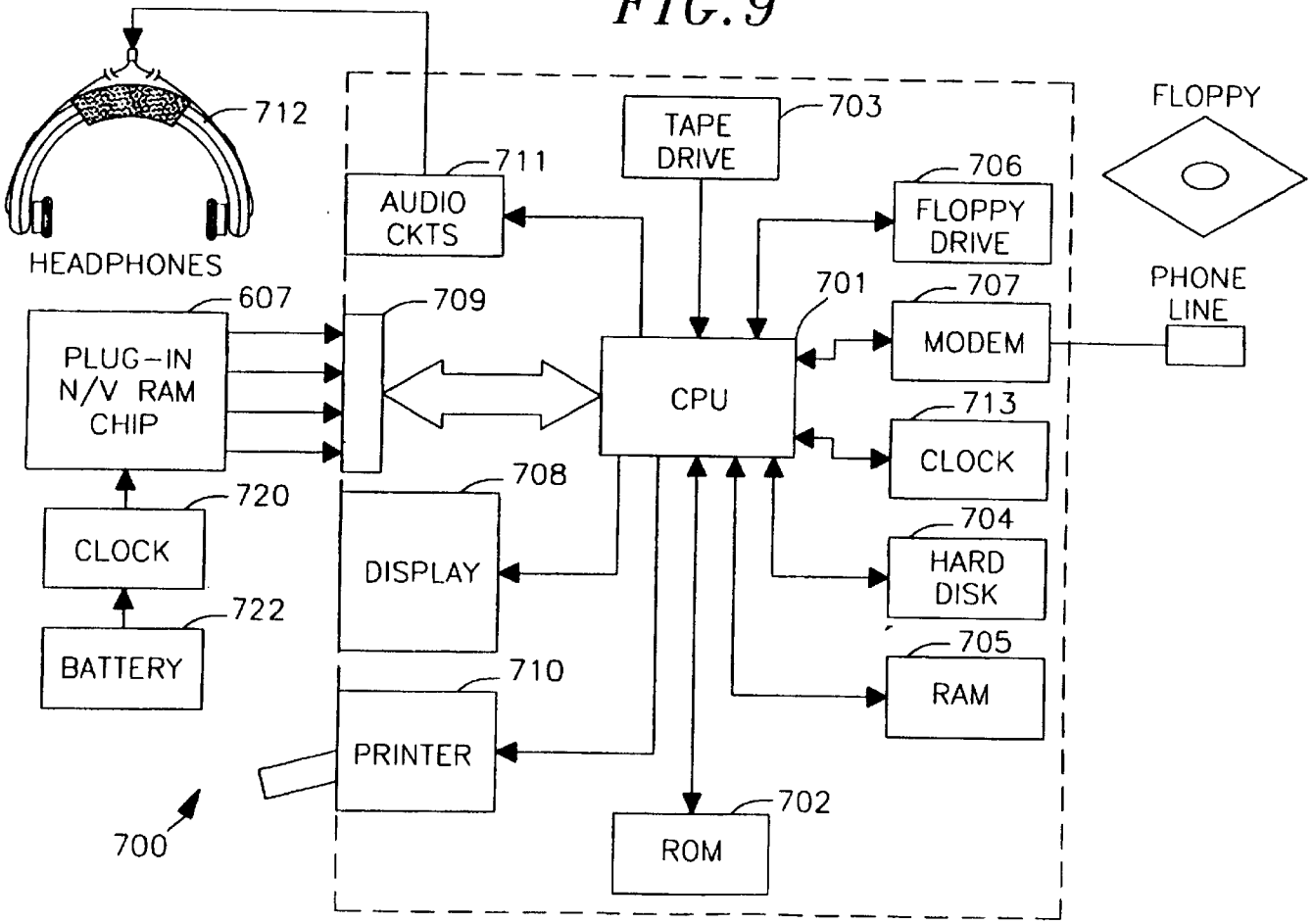
FIG. 9 is a schematic block diagram illustrating a design of an automatic information machine (AIM) wherein information on broadcast programs can be retrieved.

FIG. 9 is a block diagram illustrating a design of an AIM 700. The AIM 700 is controlled by a central processing unit (CPU) 701. Its operation is performed through execution by the CPU 701 of operating software stored in a read only memory (ROM) 702. The AIM 700 also has a clock 713 and memories (such as an audio tape drive 703, a disk 704 or semiconductor memory 705) for storing schedules of broadcast programs of AM, FM and TV stations. Means are provided in the AIM 700 so that the schedules and auxiliary information stored in the tape 703, the disk 704 or semiconductor memory 705 can be updated periodically. The updating means may be a floppy drive 706 and/or a modem 707 coupled to a telephone line which is in turn coupled to an information provider.

Clock 713 can serve as a master time standard to update the clocks in the receivers of the individual listeners or viewers via the memory chips plugged into the AIM. Specifically, there is incorporated into the memory chips a clock circuit 720 that serves as a slave clock when it is plugged into the AIM and as a master clock when it is plugged into a receiver. Clock circuit 720 is powered by a small battery 722 on board chip 607. CPU 701 is configured to synchronize the clock circuit on the memory chip to clock 713 when the memory chip is plugged into the AIM. CPU 606 (FIG. 8) is configured to synchronize clock 602 (FIG. 8) to the clock circuit on the memory chip when the memory chip is plugged back into the receiver 600.

A display 708, a printer 710, and headphones 712 coupled to audio circuitry 711 are provided to facilitate communication with a user.

The CPU 701 is coupled to a socket 709 where the memory 607 from a user can be inserted.

In operation, upon registering the programs of interest into the memory 607 as described above, a user can insert it into the socket 709 of the AIM 700. The CPU 701 reads the identification (channel or station, date and time (SDT) of the program from the memory 607 and uses this identification to search its memory, 703, 704 or 705 for information relating to the identified program. The information may include, for example, the title of a song, author or singer, price of a record or album for the song, etc. It may also be the program itself or a program related to the identified program.

The information can be stored in an AIM 700 in different formats. For example, if the information to be provided is for identifying an album of a song, then the information may simply be a standard UCC product identification bar code number which most record stores have been using to monitor their inventory. This UCC number can be incorporated as part of the information stored in the AIMs in the form of a broadcast station program schedule for a particular day as follows:

| | |
|---|---|
| Station Frequency (e.g. FM 98.7)<br>Date (e.g. 11/9/1991) | |
| Start Time (e.g. 13:01:03)–<br>End Time (e.g. 13:05:06) | UCC number/Track |
| Start Time (e.g. 13:05:06)–<br>End Time (e.g. 13:08:18) | UCC number/Track |
| Start Time (e.g. 13:08:18)–<br>End Time (e.g. 13:08:48) | Station commentary |

To further illustrate operation of the AIM, assuming a user was listening to FM 99.9, and at 1:05 pm on Nov. 9, 1991. The "BROADCAST INFO" key is actuated because a song of interest was heard on that station. At that time, the frequency (i.e. FM 99.9) of the station, along with the time at which the key was activated, would be stored in the non-volatile memory 607. When the non-volatile memory 607 is late inserted into a AIM 700 (which is located, for example, in a record store), the channel or station, date and time data ("SDT") are then used by the AIM 700 to locate the UCC number and track of the song.

From The UCC number and the track number, the user can retrieve other auxiliary information regarding the song, including the store stock level and the price of the album.

The retrived information can be displayed on the display, printed out on the printer, and/or provided to the user in audio from the tape 703 drive via the headphones 712.

If an AIM does not have information concerning an identified program (such as when the AIM belongs to a record store and an identified program is for a commercial of a automobile), an error message is displayed or printed so that the user is advised to take the memory to the right AIM.

After the information is retrieved, the AIM may give an option to the user to erase the corresponding identification from the memory 607.

Although the invention has been described above with reference to a radio, its application is not so limited. For example, instead of identifying radio programs, a device embodying the present invention can used to identify a television program. Moreover, an alternate embodiment may be implemented to allow a user to retrieve the program itself or an associated program. For example, the use may want to listen to the identified program again (such as a comedy or a commentary). In this case, the CPU 701 uses the program identification to retrieve a copy of the program and replays it on the audio circuit 711, so that the user can listen to it at the earphones 712. Alternatively, a user may want to watch a television program again. In that case, the CPU 701 uses the program identification to retrieve a copy of the program and replays it on the display 708. Another important feature of the AIM 700 is that it stores the information retrieved from the user's RAM chip memory 607, and furnishes that information to the information provider. This information yields valuable audience monitoring data concerning the popularity of various broadcast stations, musical selections and advertisements. The user information may be stored on the hard disk 704, and periodically provided to the information provider via the floppy drive/disk 706 on the telephone line/modem 707.

Figure 10:
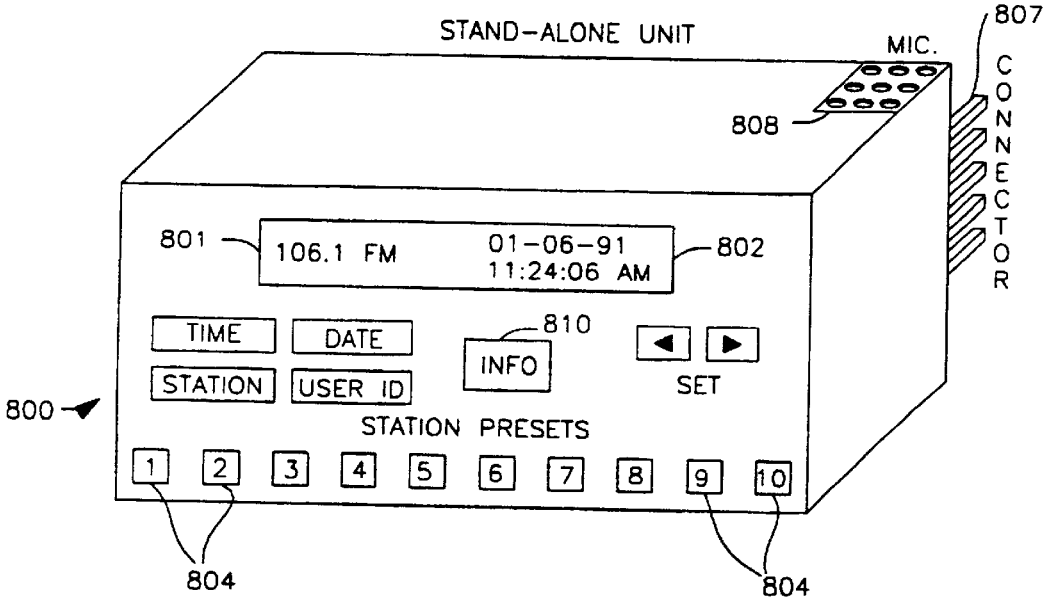
FIG. 10 is a diagram of another embodiment of the present invention.
Figure 11:
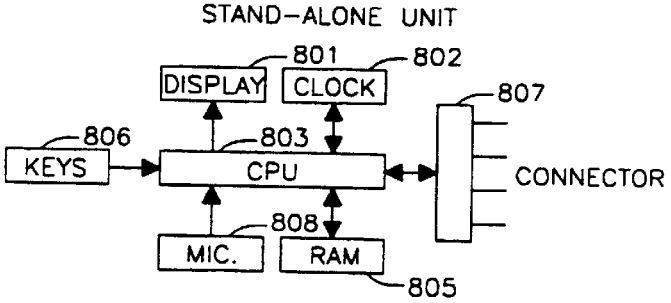
FIG. 11 is a schematic block diagram illustrating an internal design of the embodiment shown in FIG. 10.

Another alternate embodiment of the present invention is shown in FIG. 10. This unit 800 has the advantage that it can be used with all existing receivers without modification thereto. FIG. 11 is a schematic block diagram illustrating an internal design of the unit 800.

With reference to both FIGS. 10 and 11, the unit 800 comprises a battery powdered pocket size digital clock 802 having an LCD display 801. The clock 802 is implemented using TIME and DATE keys so that it measures day as well as hour, minute, and second. A set of station preset keys 804 are provided to allow a user to set the unit 800 to a plurality of preferred frequencies using the STATION and SET keys.

Within the unit 800 is a central processing unit (CPU) 803 which controls operation thereof, and a memory 805, such as a random access memory (RAM) which is used for storing program identification.

The unit 800 does not need to have a radio receiver circuit. When actuated, it merely operates to store the station frequencies and the value of the clock.

Optionally, provisions are made to let a user enter his user identification such as a social security number using the USER ID and STATION PRESET keys.

The unit 800 also includes a plug 807 for interfacing to an AIM, as described above.

In operation, a user sets the unit 800 to the station being listed to, either by the preset keys or manually. When the user hears a program of interest and desires to obtain information for the program, the INFO key 810 can be actuated. This action causes the value of the clock 802, as well as the station identification to be stored in the memory 805. These information can then be used to retrieve information from an AIM in the same manner as described above.

Optionally, the unit 800 has a circuit for reading the clock 713 when it is connected to an AIM. In this way, the clock 802 can be synchronized by the AIM. Alternatively, the unit 800 may have a microphone 808 whereby the clock 802 can be synchronized through audio time tones broadcast by an external radio.

In the same way as described above, the unit 800 may be equipped with means for storing identifications of different publications and I PLUS codes to retrieve information relating to a published article or advertisement.

In FIG. 12 a remote controller 900 has an infrared transmitted (IR XMTR 902) that transmits receiver infrared control signals to a remotely located infrared receiver (IR RCVR 904). The control signals intercepted by IR RCVR 904 are applied to a broadcast receiver (RCVR 906) (1) for broadcast saving, video or television, (2) to control its operation i.e. turn it on and off, change stations, adjust volume, color, etc. In remote control 900, a check 908, a tuner memory 910 and a memory 912 for other settings are coupled to a central processing unit (CPU) 914. Commands for broadcast receiver 906 are inputed through a keyboard 916. CPU 914 is configured to encode the commands it receives from clock 908, tuner memory 910 and memory 912 and to feed encoded signals to IR XMTR 902 for transmission to broadcast receiver RCVR 906. As described to this point, remote controller 900 is conventional. To adapt the remote controller for use with the invention, a socket 918 receiving a plug in memory chip 920 is coupled to CPU 914 and an information key 922 is coupled to CPU 914. Chip 920 also has a clock 924 powered by a battery 926. Clock 908 is synchronized to clock 924 as described above in connection with FIG. 9. CPU 914 is configured to monitor clock 908 and tuner memory 910 in response to an actuating command when a listener or viewer presses key 922 and outputs SDT data through socket 918 for storage in memory chip 920. It should be noted that to adapt a conventional remote controller for use with the invention only an information key, a memory chip socket and software to perform the described function are required.

CPU 914 is configured so that the remote controller will operate without memory chip 920 being plugged into socket 918. Thus, the plug in memory chip can be removed at any time and taken to an AIM to gain access to the auxiliary information. Furthermore, the plug in memory chips can be personalized to each user. For example, each member of a family could have his or her own plug in memory chip to store his or her own individual request for an auxiliary information and to obtain a personalize print-out from the AIM.

Figure 13A:
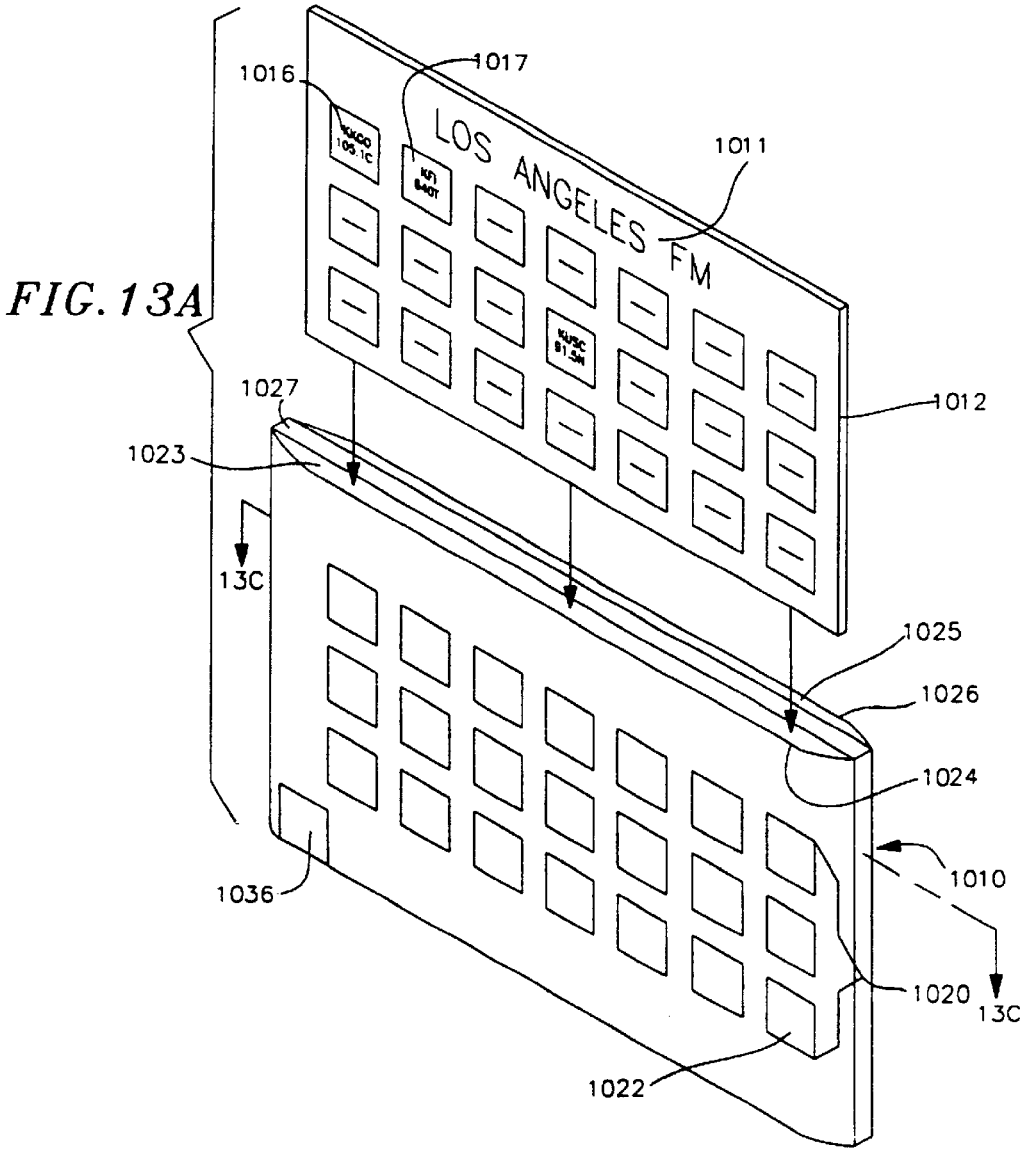
FIGS. 13A–13C show a front and rear, and cross-section view, respectively, of an information card according to the present invention.
Figure 13B:
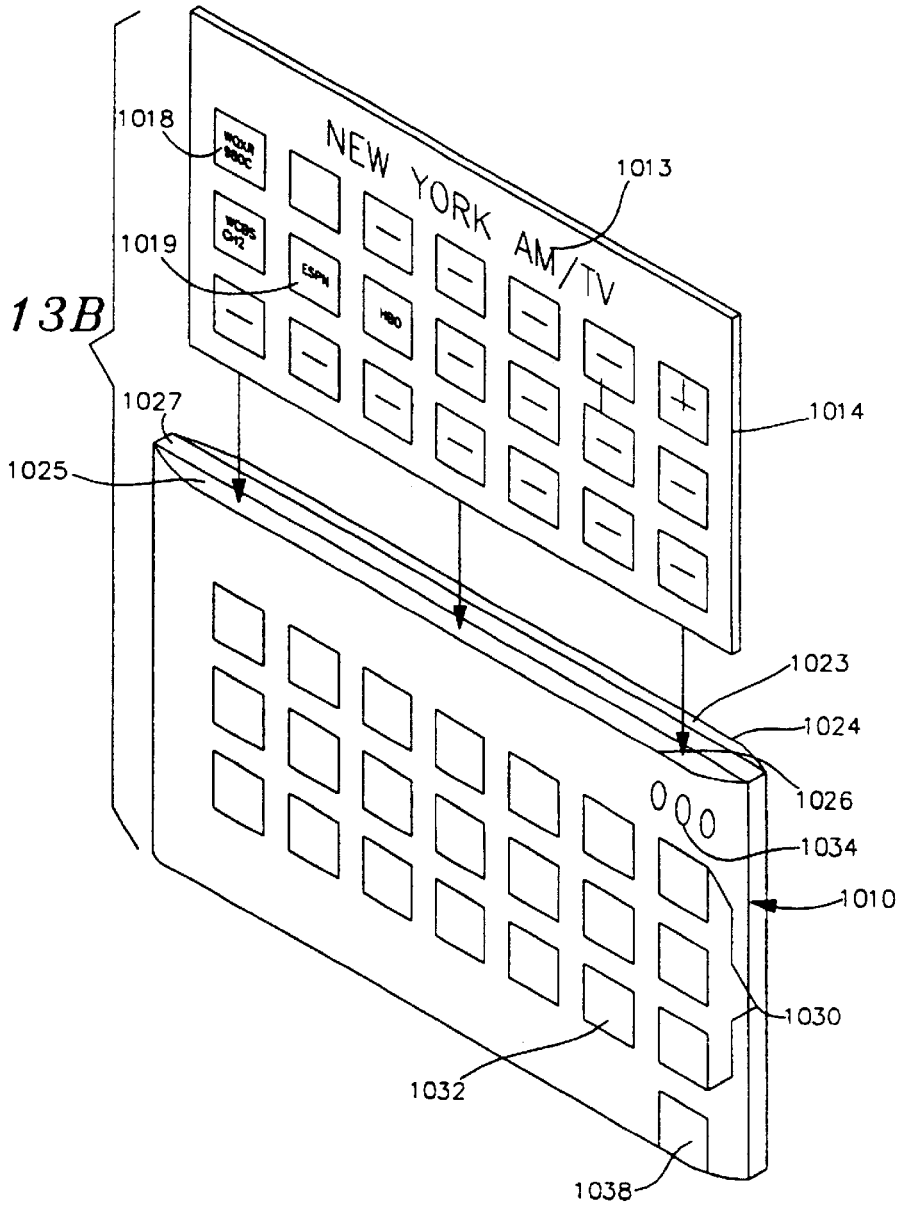
Figure 13C:
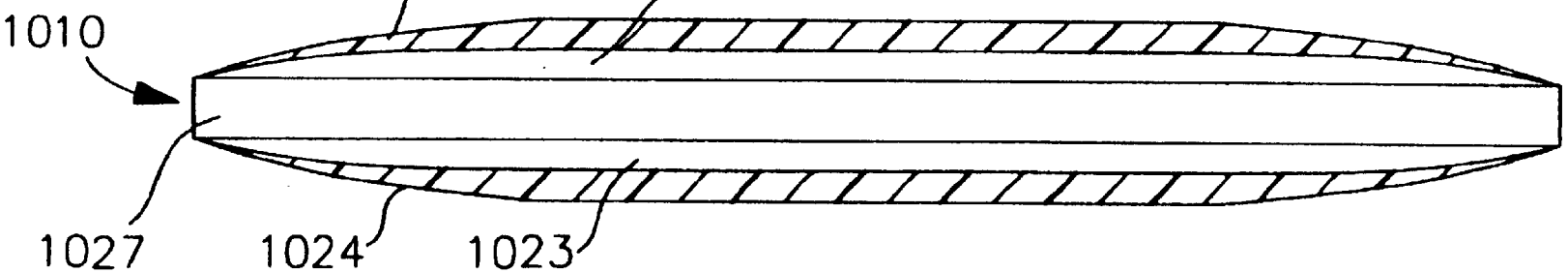

In another embodiment, an information card 1010 is provided as shown in FIGS. 13A and 13B, the front and rear, respectively, of the information card. On each side of the information card are keyboards 1020 and 1030 each having individual keys, such as key 1022 and key 1032. The keyboard can be implemented as membrane keyboards. On each side of the center 1027 of the information card are clear plastic overlays 1024 and 1026. The clear plastic overlays 1024 and 1026 provide pockets 1023 and 1025, respectively, into which a piece of paper or other media can be inserted, as shown by inserts 1012 and 1014. FIG. 13C shows a cross section of the information card showing the pockets 1023 and 1025. The purpose of the inserts is to identify the keys on the keyboards. For example, insert 1012 has FM radio station identifications printed on the insert in an area on the insert, which when the insert is inserted will overlay particular keys on the keyboard. As shown, station identification 1016 is for KKO 105.1 FM a classical music channel which is designated as a C. Thus, the station identifications printed on the insert 1012 can include the station call letters, the frequency or channel number, and the type of programming on the station. In another example, station identification 1017 is for the AM radio station KFI 640, which is a talk station, designed by a T. A title 1011 can be printed on the insert. For example, the insert 1012 has FM stations for the city of Los Angeles. The insert 1014 has AM and TV stations for the city of New York as indicated by the title 1013. For example, station identifier 1018 is for WQXR 980 which is a classical AM radio station in New York. Station identifier 1019 is for ESPN which is a well-known cable television channel carrying sports programming. When the paper inserts 1012 and 1014 are inserted into the clear plastic overlays 1024 and 1026, respectively, the stations associated with each key on the information card are identified.

The information card 1010 can have a beeper 1034 for warning the user of certain situations such as that the memory in the information card is full or that a clock in the information card needs to be reset. The information card is designed to have differential serial interface. The contact terminals for the serial interface on the information card can be provided directly onto the surfaces of the card. As shown in FIG. 13A, contact 1036 is on one side of the information card 1010 and located in a corner. The other side of the information card 1010 has a contact 1038 that is in the same corner as contact 1036 but on the opposite side of the information card 1010 as is shown in FIG. 13B. This allows a receptacle to be designed that accepts the information card and mates with the contacts 1036 and 1038 for interfacing to the serial interface on the information card.

Figure 14:
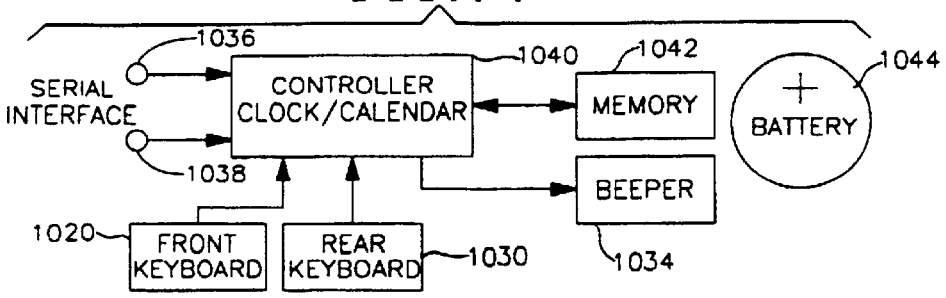
FIG. 14 is a block diagram of an information card according to the present invention.

FIG. 14 is a block diagram of the information card. The information card has a controller 1040 which contains a clock/calendar, a memory 1042, a front keyboard 1020, a rear keyboard 1030, a beeper 1034, and a battery 1044 which can be a watch battery. The serial interface contacts 1036 and 1038 are coupled to controller 1040. The clock/calendar in controller 1040 has the purpose of maintaining the time and date. The battery 1044 provides power to the information card and maintains the time and date in the clock/calendar. When the information card is initialized the clock/calendar is set to the current date and time.

Figure 15:
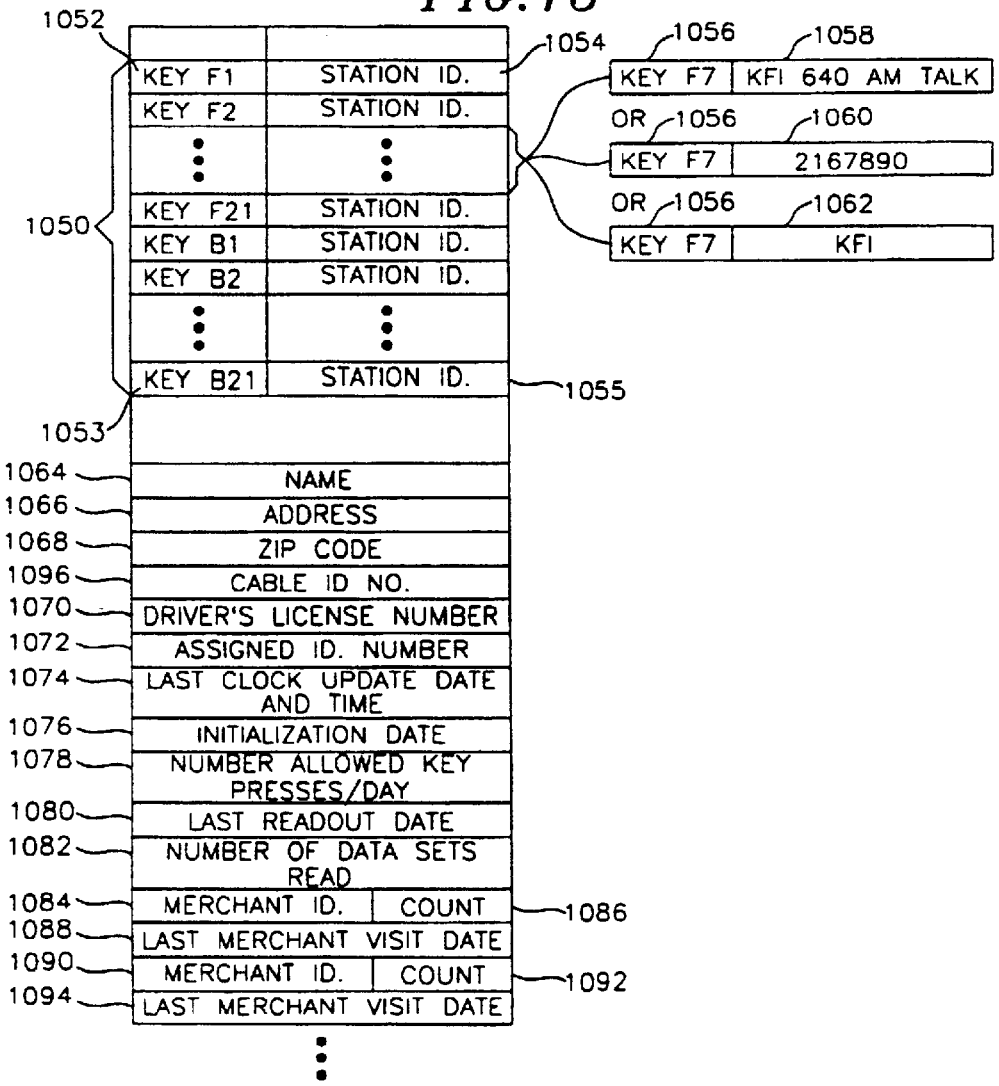
FIG. 15 is a diagram of the memory contents of an information card after initialization according to the present invention.

FIG. 15 is a diagram showing the contents of memory 1042 when the information card has bene initialized. A portion of the memory 1042 is used to store a table 1050 that maps the individual keys on the front and the rear keyboards to station identification. For example, key 1 on the front keyboard 1020, which is designated as element 1052 in FIG. 15, corresponds to station identification 1054. The station identification can be expressed in a number of ways as shown for key F7 (element 1056). Element 1058 indicates that a station identification can include the station call letters, station frequency, type of station such as AM, FM or TV, and the programming type, for example, KFI 640 AM and talk. Another way to express the station identification is to assign a unique station identification number to each station such as shown by station identification number 1060, which is shown in FIG. 15 to be 2167890. Another way to express the station identification is to merely use the station call letters such as shown in element 1062 of FIG. 15 for KFI. This can be done because all of the stations in the United States have unique station call letters.

There is a particular problem that arises if a station is a cable station. In the case of cable channels, the channel number is not enough to identify the station. A cable channel map is required for the cable company transmitting on the station. It is not necessary to store the cable channel map in the memory 1042, because the cable channel map can be stored at a central location, such as the memory in the AIM 1160 or server 1180 of FIG. 17, or the interchanges or banks of FIG. 52. The cable channel mapping is accomplished as follows. The cable channel maps for all of the cable companies (about 11,000 in the U.S.) are stored in the central location. Each cable company is assigned a unique five digit ID number. When the user sets up the information card, the user is requested to enter the Cable ID No. 1096 for his cable company, which is stored in memory 1042. The card ID numbers are supplied to the user, for example, in a small booklet. When the information card SDT information is read, the stored Cable ID No. 1096 is also read and sent to the central location along with the SDT data. The Cable ID No. is used to access the correct cable channel map, which is then used to map the stored station to the correct station, so that log data can be retrieved. The cable channel maps stored at the central location can be automatically updated as changes occur. The cable channel maps can be extended to cover other services such as satellite channel mapping, if needed.

Other information that can be loaded into the memory 1042 upon initializing the clock/calendar includes the user's name 1064, address 1066, zip code 1068, and driver's license number 1070. The information card can also be assigned to identification (ID) number 1072, which can be stored in the memory. Other items that can be stored in the memory of the information card include the last clock update date 1074, which is the date of the last clock/calendar 1040 setting, the initialization date 1076, the allowed number of key presses per day 1078, the last readout date 1080, which is the date of the last readout of the memory 1042, and the number of data sets last read 1082. The function of these entries in the memory are explained below. Other items shown in FIG. 15 such as merchant ID 1084, count 1086 and last merchant visit date 1088 are also explained below.

Figure 16:
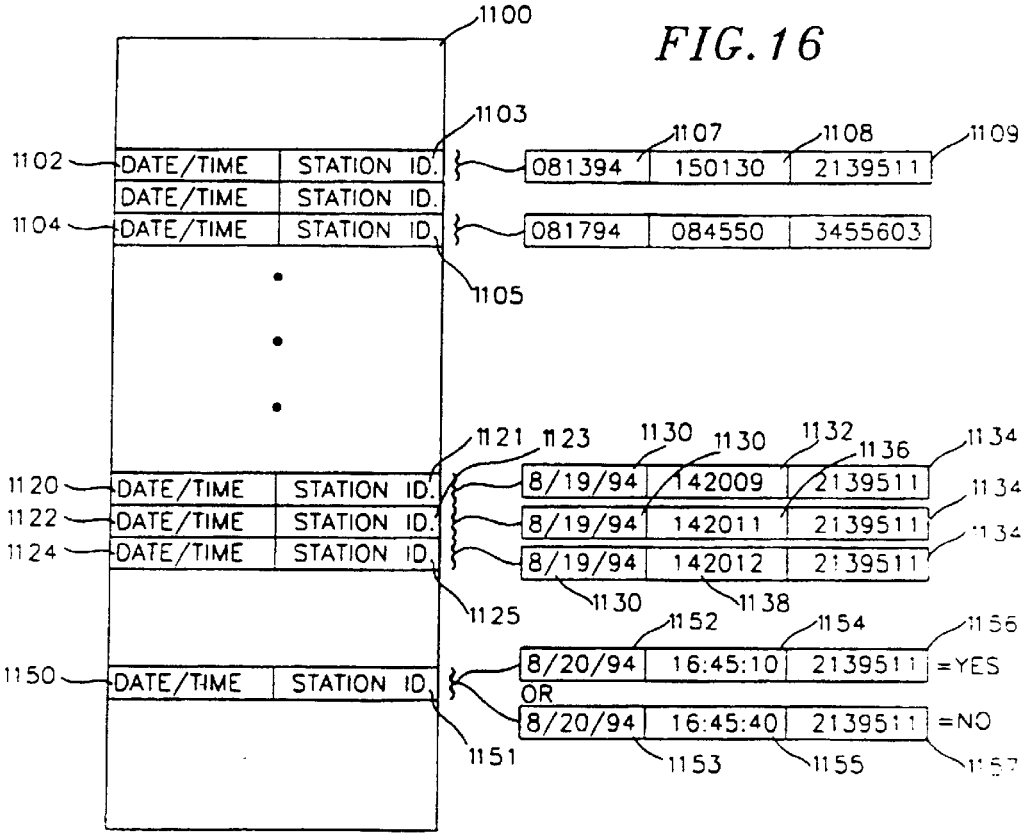
FIG. 16 is a diagram of a portion of the memory that has stored date, time, and station identification data according to the present invention.

When a user presses a key on the information card, the controller 1040 accesses the table 1050 of key-to-station ID correspondences stored in memory 1042. For example, suppose the user presses the key 1007 on the front side of the card, then the station identification (ID) that is found in the table shown in FIG. 15 is for KFI. The controller 1040 then reads the current time and date from the clock/calendar and stores the time and date along with the station ID corresponding to the pressed key into the memory 1042. FIG. 16 shows the contents of a portion 1100 of memory 1042 after a number of keys on the keyboard have been pressed. For example, station identification 1103 and date and time 1102 (SDT) stores the station identification 1109, the date 1107, and the time 1108. At another time a station identification 1105 and date and time 1104 (SDT) are stored. Each data set consisting of a station identification, date, and time (SDT) can be compared to a broadcast station log which records data sets for each program broadcast on that station. The station log data sets contain a date, time, and program identifier for each program and commercial aired on the station. By comparing the data sets stored in the information card to the station log data sets, it is possible to access auxiliary information related to the program identifier in a station log that has the same station identification as the station identification in the data set read from the information card, and that has the same date and substantially the same time as the data set read from the information card. In other words, by using the station identification recorded in the information card to access a station log for the station corresponding to the station identification, and then comparing the date and time of a data set in the information card to the date and times of the station log for a comparison, a program identifier can be found that corresponds to the date and time recorded in the information card. Once the program identifier with a corresponding date and time that compares with the date and time recorded in the information card is found, then the program identifier is used to access auxiliary information for the program that was transmitted from the station at the date and time indicated in the station log.

It is also possible to use the information card for recording a response to a question transmitted from a station. Suppose the station asks a question having a numerical answer. Then by pressing the key corresponding to the station N times in rapid succession, the user can affectively enter a number answer into the information card. For example, elements 1120 through 1125 are entries that are made in the memory 1042 when a particular key is pressed three times. As indicated in FIG. 16 the date Aug. 19, 1994 (1130) is the same for elements 1120, 1122, and 1124. The station identification 1134, which in this case is 2139511 is also the same for elements 1121, 1123 and 1125. The time 1132, 1136 and 1138 differ by a few seconds. In particular, adjacent entries in this series differ by not more than two seconds. The typical user can press at least one key per second. For example, time 1136 is two seconds more than time 1132 and time 1138 is one second more than time 1136. When the memory 1042 is read, a series of entries in the memory 1042 having the station identification and differing from each other by only a few seconds, is determined to be a series of entries that represents a number. The station identification is then used to access a station log and the station log is searched for a date and time and a number entry that approximately compares with the date and approximate time of a series of entries read from the information card. This is further explained below.

Another type of data that can be stored in the information card is a YES or NO response to a question transmitted on a station with a YES or NO answer. To accomplish this, a performer on the station can announce that for the user to enter a YES answer that the user should press the key now. Then after waiting for example 30 seconds, the performer on the station can announce to the audience that to enter a NO answer the user should press the same key that corresponds to the station now. It is assumed that the user will either enter a YES or a NO answer rather than both answers. By comparing the date and time and station identification read from the information card to a station log that is for the station that corresponds to the station identification, and comparing the date and time of the entry in the information card to a corresponding date and time in the station log, it can be determined whether the user has entered a YES or a NO response. For example entries 1150 and 1151 shown in FIG. 16, corresponds to either a YES or a NO answer. In this case the question has been asked on the station corresponding to station identification 2139511 (element 1156) and if the user wishes to answer YES, the user presses the key corresponding to station identification 2139511 on Aug. 20, 1994 at 16:45 and 10 seconds (1152, 1154). If the user wishes to record a NO answer then the user presses the key corresponding to station identification 2139511 (element 1157) on Aug. 20, 1994 at 16:45:40 (elements 1153, 1155). This feature can be used for polling an audience for their opinion on a particular subject. By comparing the data in the information card to entries in a corresponding station log, the number of YES responses and the number of NO responses can be counted.

Figure 17:
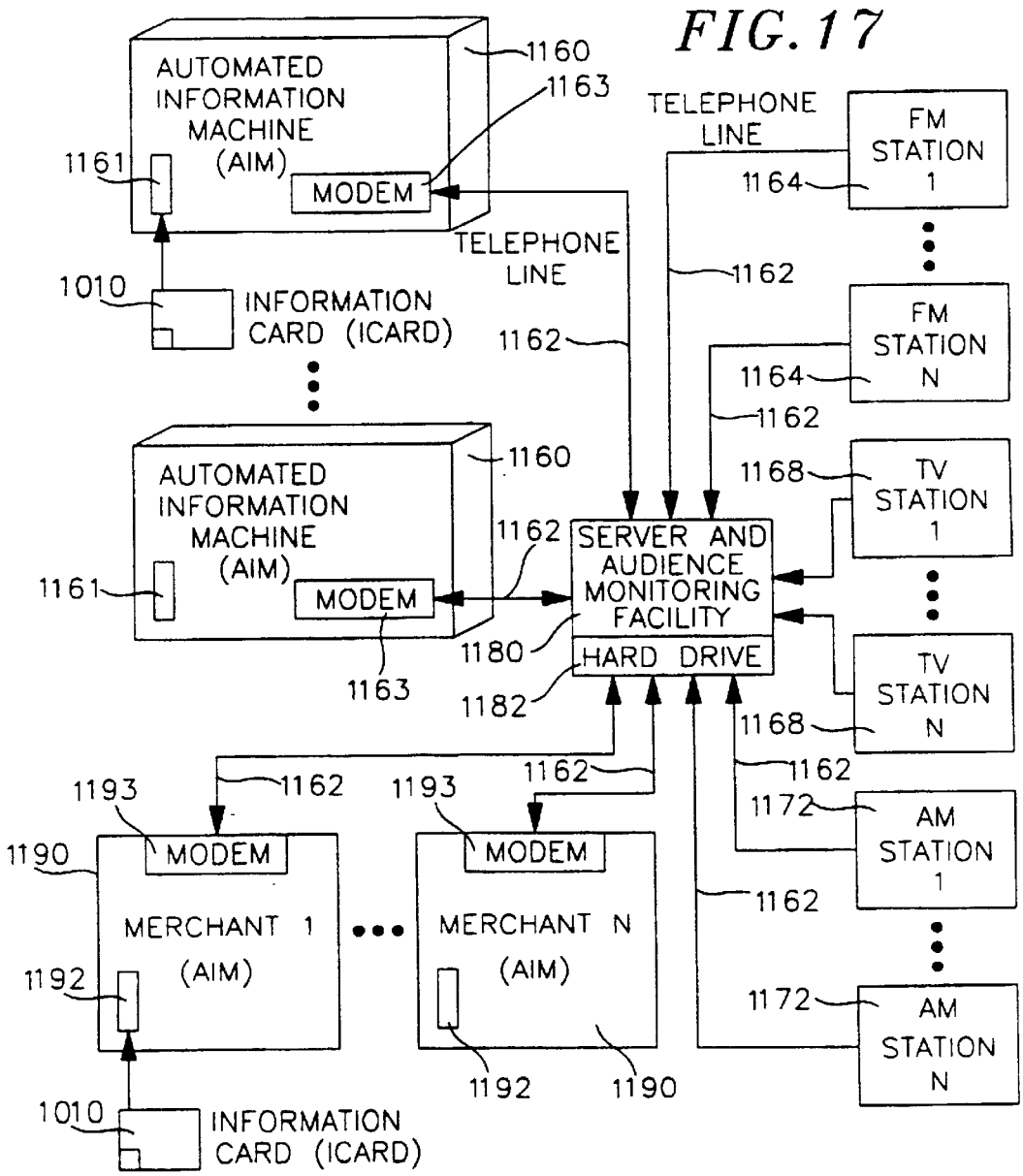
FIG. 17 is a diagram of a system including TV and radio stations, a central station, automated information machines (AIMs) and information cards according to the present invention.

In order for the data sets stored in the information card to be compared to station logs, the station logs are communicated to an automated information machine (AIM) that is adapted to receive the station logs and compare them with data sets read from the information card. FIG. 17 is a block diagram of a system which includes FM radio stations 1164. TV stations 1168. AM radio stations 1172, automated information machines 1160, server 1180, information cards 1010, and merchant AIM's 1190. The merchant AIM's 1190 operate similar to the automated information machines 1160; however, the merchant AIM's 1190 also have the capability of tracking via the information card the number of transactions the user of the information card has conducted with the merchant. If the number of transactions with the merchant is equal to or greater than a threshold, then the merchant can reward the user of the information card with a free purchase or some other reward. As shown in FIG. 15, the memory 1042 can contain entries for a merchant identification number 1084, a count 1086, and a last merchant visit date 1088. This data can be stored for multiple merchants as indicated in elements 1090, 1092 and 1094. The method of using the merchant identification, account, and last merchant visit date is further explained in connection with FIG. 41.

In the system shown in FIG. 17, the stations communicate their station logs in digital form via telephone lines 1162 to the server 1180 which stores them on hard drive 1182 along with auxiliary information related to the log entries and of interest to consumers. The automated information machines 1160 and the merchant AIM's 1190 also have access to the hard drive on server 1180 via telephone lines 1162 and modems 1163 and 1193, respectively. In this system, audience monitoring data collected in each AIM can be provided to a central data center on server/audience monitoring facility 1180, each night, using the modems and telephone lines.

The automated information machine has a slot 1161 which is adapted to receive the information card 1010 for reading the data sets in the memory 1042 into the automated information machine. Similarly the merchant AIMs also have a slot 1192 adapted to receive the information card 1010.

Figure 18:
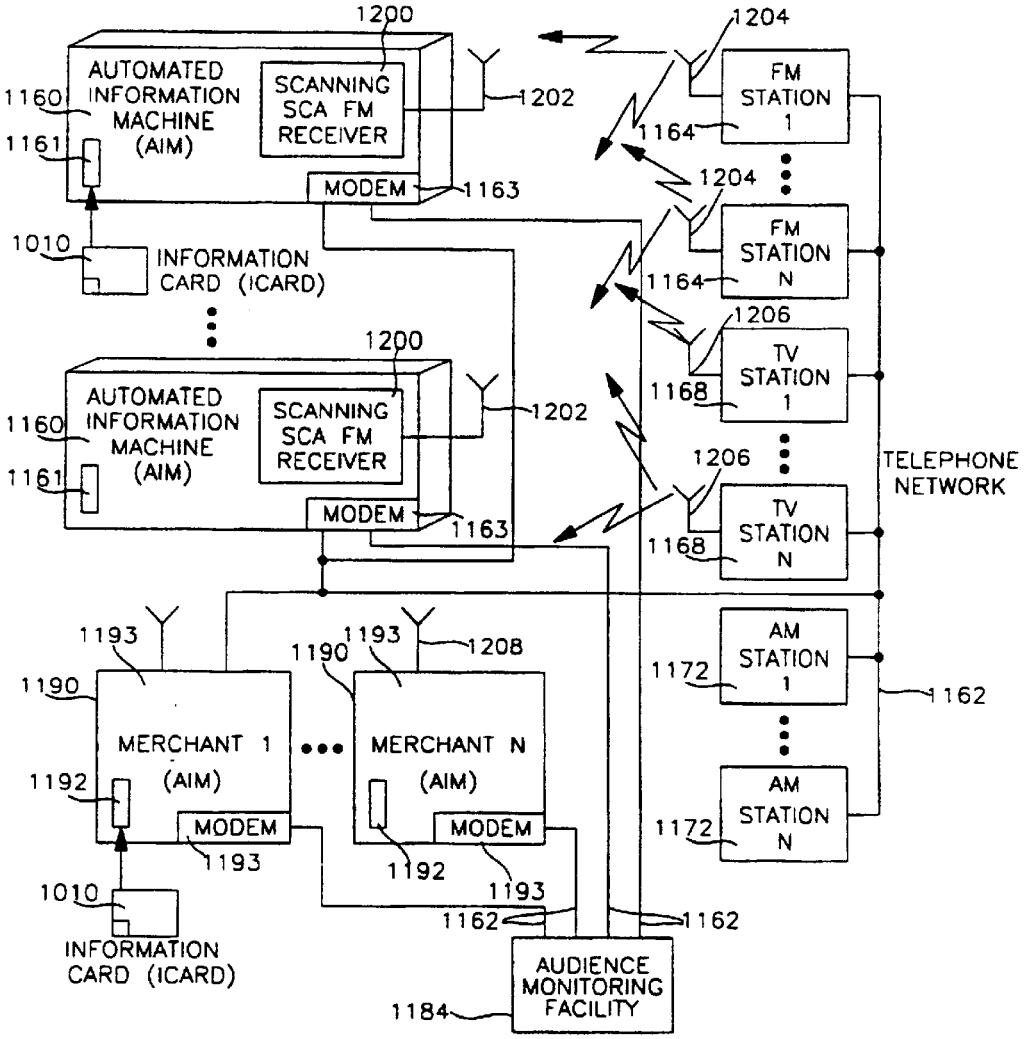
FIG. 18 is a diagram of an alternate system including TV and radio stations and automated information machines (AIMs) having wireless communication with the TV and radio stations according to the present invention.

FIG. 18 illustrates an alternate system for communication of the station logs to the automated information machines for comparison with the data sets read from the information cards. In FIG. 18, the FM stations 1164 and the television stations 1206 use sidebands to transmit the station logs to the AIMs 1160 and to the merchant AIMs 1190. The station logs are transmitted in a wireless fashion via FM station antennas 1204 and television station antennas 1206 and are received by antennas 1202 at the AIM 1160 and antennas 1208 at the merchant AIM 1190. This particular system of communication of the station logs has the advantage that the stations can more rapidly update station logs stored by the AIM 1160 and the merchant AIM 1190. Side band carrier transmission is available for FM stations and TV stations but is not generally available for AM stations. The television stations 1168 can also send the station logs by inserting them into the vertical blanking interval of a video signal. The method of inserting data into a vertical blanking interval is described below in relation to FIGS. 19–23.

The AM stations can communicate directly via telephone line to the AIMs or via telephone to the televisions stations 1168 or the FM stations 1164, which would then transmit the AM station logs to the AIMs 1160 via sideband transmissions or inserting the station logs into the VBI of a television station. The audience monitoring data collected in each AIM can be provided to audience monitoring facility 1184, each night, using the modems 1163 and 1193 and the telephone lines 1162.

The following description describes the manner of embedding data in a video signal at a station and decoding the data at a receiver.

Video images in a cathode ray tube (CRT) type-video device, e.g. television, are generated by scanning a beam along a predefined pattern of lines across a screen. Each time all the lines are scanned, a frame is said to have been produced. In on implementation, such as used in the United States, a frame is scanned 30 times per second. Each television frame comprises 525 lines which are divided into two separate fields, referred to as field 1 ("odd field") and field 2 ("even field"), of 262.5 lines each. Accordingly, these even and odd fields are transmitted alternately at 60 Hz. The lines of the even and odd fields are interleaved to produce the full 525 line frame once every 1/30 of a second in a process known as interlacing. Another standard in the world uses 625 lines of information and interlace 312 and 313 lines at 50 fields per second. In the 525 line standard used in the United States, approximately 480 lines are displayed on the television screen.

Figure 19:
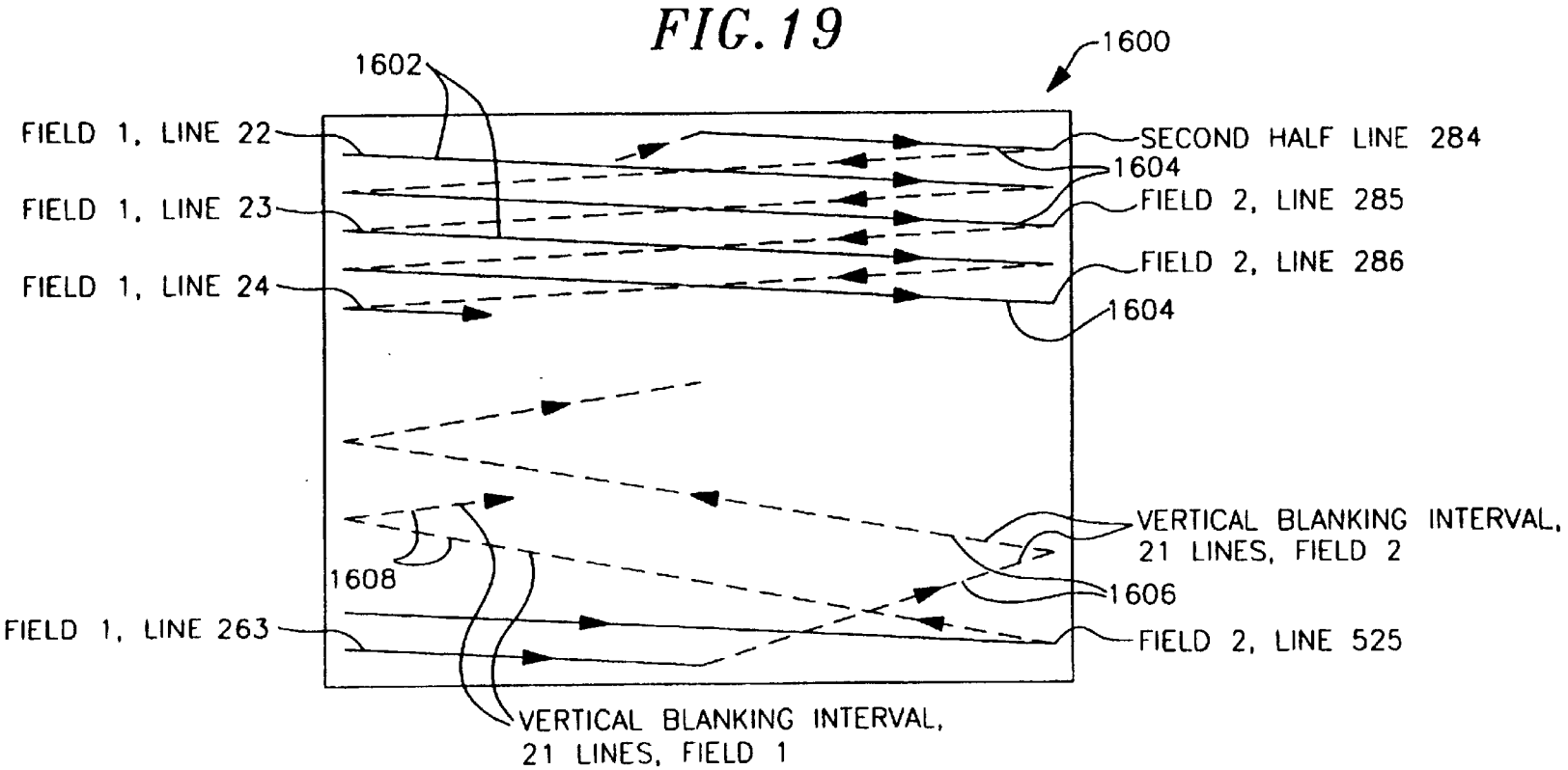
FIG. 19 is a schematic diagram illustrating an interlaced raster scanning pattern of a conventional television.

Referring now to the drawings, FIG. 19 is a schematic diagram illustrating the interlaced scanning pattern 1600 on a screen of a conventional television receiver. A video display scans the beam from the top left hand corner and scans across the screen (line 22, field 1 in FIG. 19). After it finishes scanning the first line, the beam returns to the left hand side during a period known as a horizontal blanking interval and repeats scanning along another line which is parallel to but lower than the previous line (line 23, field 1 in FIG. 19). The scanning continues along the lines until the beam reaches the center of the bottom part of the screen (line 253, field 1) to complete field 1, which is comprised of lines 1602.

From the bottom center of the screen, the beam returns to the top where it starts scanning from substantially the center of the screen along the lines 1604 for field 2 which interlace the lines of field 1. This is not an instantaneous bottom to top jump but actually requires the length of time to scan 21 horizontal lines. These lines 1606 are lines 1 through 21 of field 2. The second half of line 21 field two (line 284 as shown in FIG. 19) is displayed. Then lines 285 to 525 of field 2 are scanned to complete field 2. When the beam reaches the bottom, right hand corner of the screen, the picture frame is formed. Then the beam retraces to the top and the vertical blanking interval lines 1608 are numbered 1 through 21 of field 1. In the NTSC protocol widely used in North America, each field contains 262.5 horizontal lines and a pair of fields constitute a single 525 line video frame and creates one video picture at one instant in time on the video display.

During the time in which the beam returns from the bottom to the top of the screen between the fields, it carries no video or picture signals because it does not produce any picture element on the screen. This time interval is generally known as the vertical blanking interval (VBI). Its duration is typically 21 times the time duration that it takes the beam to scan across the screen. In other words, the duration of the VBI is equal to the time for the beam to scan 21 lines and is divided into 21 lines. In interlaced scanning, the VBI is identified by the field with which it is associated. Apparatus and methods using the NTSC standard wit 21 lines in each VBI are well known in the art and therefore are not discussed in detail herein.

Figure 21:
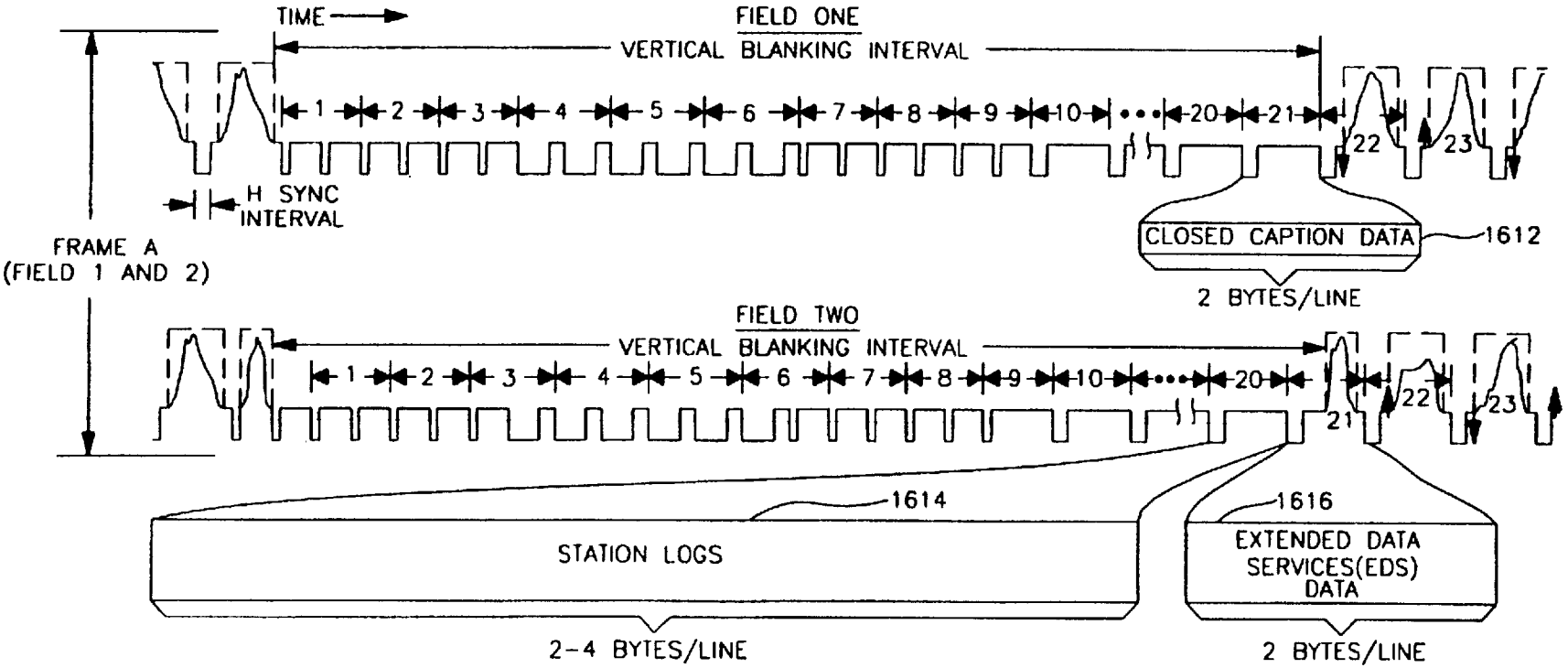
FIG. 21 is a timing diagram showing the vertical blanking interval (VBI) lines of field 1 and field 2 of a interlaced raster scanning pattern of a conventional television and data in the VBI according to the present invention.

Because no image is produced on the display during the vertical blanking interval, no picture information therefore needs to be carried by the broadcast signals. Thus, the VBI is used for conveying auxiliary information from a television network or station to an audience. For example, closed caption data associated with the television program are transmitted as encoded composite data signals in VBI line 21, field 1 of the standard NTSC video signal, as shown in FIG. 21.

Lines 1 through 9 of the VBI of each field are used for vertical synchronization and post equalizing pulses. Thus, lines 10 through 21 are available for auxiliary information.

Figure 20:
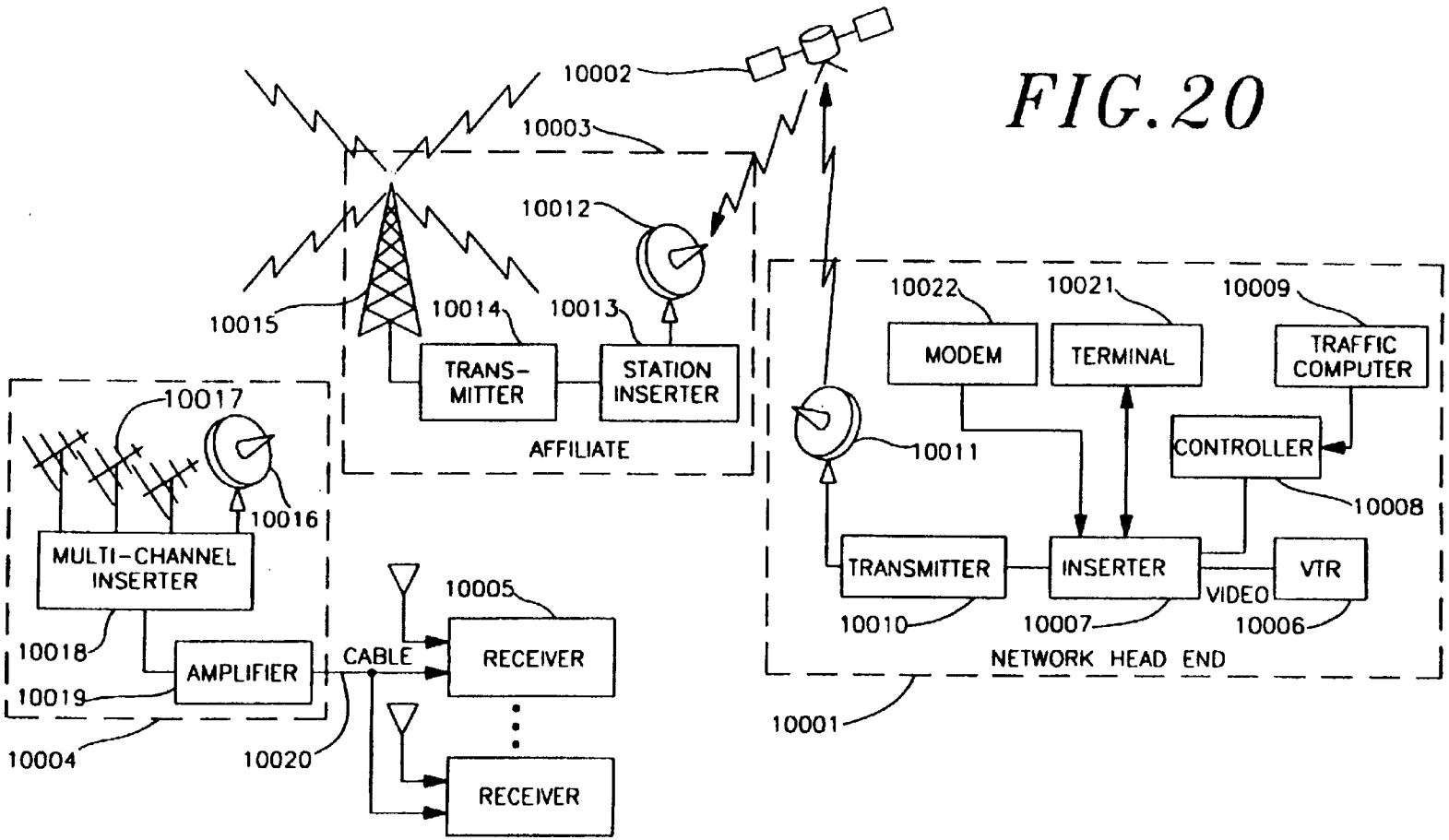
FIG. 20 is a functional block diagram of a television video and data transmission system.

FIG. 20 is a functional block diagram of a data transmission system. As used herein, the terms "broadcast" and "transmit" are used interchangeably for the transmission of signals over cable or fiber optics, to or from satellites, over the air, and the like. A network head end 1001 transmits a composite television signal containing inserted information in a portion thereof, typically the vertical blanking interval, to a satellite 10002 which rebroadcasts the same to a local affiliate 10003. The affiliate 10003 may further insert data into the vertical blanking interval of the received television signal and transmit the same to a local cable head end 10004. The cable head end 10004 receives television signals from a plurality of sources (including satellites) and may further insert data into the vertical blanking interval of any of the television signals. The signals from the plurality of sources are combined into a composite television signal, amplified, and provided over a cable to a plurality of individual receiver 10005, which can include televisions, cable boxes, VCRs and satellite receivers. In addition, the individual receivers 10005 may receive signals directly from the local affiliate 10003 by air, which may include the use of a satellite 10002, or by cable.

More specifically, the network head end has a video tape recorder (VTR) 10006 for providing a program signal to an inserter 10007. A controller 10008 also at the head end controls the scheduling of loading tapes from a cart (a machine with a plurality of video tape cassettes which are moved by a robotic arm from a storage location and inserted into a video tape recorder and vice versa). Furthermore, the controller 10008 controls the lighting of stages during live broadcasts, such as news broadcasts. The controller 10008 is typically a microprocessor based system. A traffic computer 10009 controls the exact timing of playing individual segments of video tapes and inserting commercials therebetween as well as switching between different programs. Some network head ends have both a traffic computer 10009 and a controller 10008. The controller 10008 provides data and commands to the inserter 10007. The traffic computer 10009 provides data and commands to the controller if present. Otherwise, the traffic computer 10009 provides these signals directly to the inserter 10007. The inserter 10007 inserts data into the vertical blanking interval of the composite television signal, as will be described below, and provides the television signal to a transmitter 10010 which in turn provides the television signal on a microwave carrier to a satellite dish 10011 for transmission to the satellite 10002.

The satellite 10002 retransmits the received signal, which is received by a satellite dish 10012 at the affiliate 10003. The dish provides the signal to a station inserter 10013 at the local affiliate 10003. The affiliate may also insert data into the composite television signal as will be described below. The television signal is then provided to a transmitter 10014 and then to a transmitting antenna 10015.

A local cable operator 10004 has a plurality of satellite dishes 10016 and antennas 10017 for receiving signals from a plurality of networks 10001 and affiliates 10003. The received signal from each of the dishes 10016 and antennas 10017 is provided to a respective input of a multi-channel inserter 10018, which can input data into the vertical blanking interval of a received signal. The multi-channel output from the inserter 10018 is amplified in an amplifier 10019 and provided over a cable 10020 to individual receivers 10005. Alternately the receivers 10005 could receive broadcast information via antennas or satellite receivers. Each receiver 10005 includes a VBI decoder, which can include a VBI slicer and closed caption decoder, that scans VBI lines 10–21 of both fields 1 and 2. In addition it is possible to use the first few visible lines in each video frame for VBI data, for example, lines 22–24. Lines 1 through 9 are typically used for vertical synchronization and equalization and, thus, are not used to transmit data. Closed captioning and text mode data are generally transmitted on VBI line 21, field 1 of the standard NTSC video signal, at a rate of 2 bytes for each VBI line 21, field 1, as shown by closed caption data 1612 in FIG. 21. The text mode fields fill the entire screen with text. The default mode is an open ended mode in which the page is first filled up and then scrolled up. The individual recipient of such data has no control over the data. Extended data services (EDS) data can be transmitted on VBI line 21, field 2, as shown by EDS data 1616 in FIG. 21, at a rate of 2 bytes per VBI line 21, field 2.

By way of background, the data in the vertical blanking interval can be described in terms of the wave form, its coding and the data packet. The closed caption data wave form has a clock run-in followed by a frame code, followed by the data. The coding of the data is non-return-to-zero (NRZ) 7 bit odd parity.

Under mandatory FCC requirements effective July 1993, color televisions having a size 13" and greater must provide a closed caption decoder. Caption data decoding is further described in the following specifications, which are hereby incorporated by reference herein: Title 47, Code of Federal Regulations, Part 15 as amended by GEN. Docket No. 91-1; FCC 91-119: "CLOSED CAPTION DECODER REQUIREMENTS FOR THE TELEVISION RECEIVERS"; Title 47, C.F.R., Part 73.682(a). Caption Transmission format; Title 47, C.F.R. Part 73.699, FIG. 6; "TELEVISION SYNCHRONIZING WAVE FORM"; Title 47, C.F.R., Part 73.699, FIG. 17a; "LINE 21, FIELD 1 DATA SIGNAL FORMAT"; and PBS Engineering Report No. E-7709-C, "TELEVISION CAPTIONING FOR THE DEAF: SIGNAL AND DISPLAY AT SPECIFICATIONS".

Under the extended data services (EDS) proposed in the Recommended Practice for Line 21 Data Service, Electronics Industries Association, EIA-608 (drafts Oct. 12, 1992 and Jun. 17, 1993) (hereinafter referred to as "EIA-608"standard"), the subject matter of which is incorporated herein by reference, additional data is provided in line 21, field 2 of the vertical blanking interval. This recommended practice includes two closed captioning fields, two text mode fields and the extended data services. The extended data includes, among other information, program name, program length, length into show, channel number, network affiliation, station call letters, UCT (universal coordinated time) time, time zone, and daylight savings time usage. Upstream at the network, the network inserts the program name, the length of the show, the length into the show, the network affiliation, and the UCT time. Downstream at the affiliate, the affiliate inserts the channel number, the time zone, the daylight savings time usage and program names. The network inserts the data that does not differ for different affiliates.

It is possible for the insert to the insert data other than closed captioning data and EDS data into the television signal. The station inserted data can include data such as the station log data and other auxiliary data, which can be inserted into either or both fields in any VBI line between 10 and 20. For example, the data can be inserted into line 20 of field 2, as shown by data 1614 in FIG. 21. The data may be inserted into the VBI at the closed caption rate (1X format) or at two times the closed caption rate (2X format), which is further explained below.

The data may be manually entered from a local terminal 10021, which can be used to pre-build, recall, or edit messages. The terminal 10021 typically includes a computer. In addition, a modem 10022 may be used to provide data to the inserter 10007. The output of the inserter 10007 is a composite television signal with the data inserted.

The timing of video signals in NTSC format is well known in the art. As described above, the vertical blanking interval is the time between the flyback from the bottom of the screen to the top of the screen. Although no video signal is displayed, the horizontal synchronization pulses are still provided during the VBI. The standard data transmission rate is defined in the EIA-608 standard.

Figure 22:
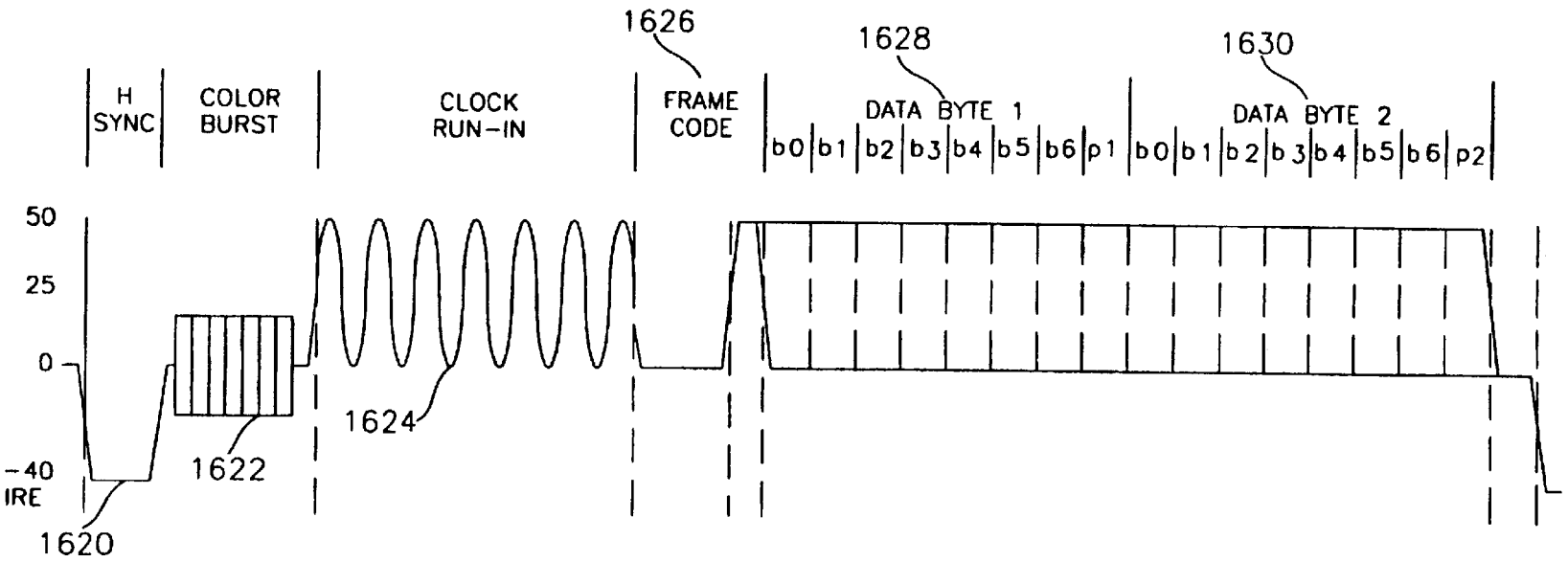
FIG. 22 is a timing diagram of the standard data format (1×) for transmitting data in the VBI.

As shown in FIG. 22, the horizontal synchronization pulse 1620 is followed by color burst signals 1622. For closed caption and EDS data, a clock run-in cycle 1624 follows the color burst which in turn is followed by a frame code 1626. The clock run-in is "10101010101." The frame code is "01000011." Two day bytes 1628 and 1630 are transmitted in each VBI line. Each byte is 8 bits including a parity bit. This format is referred to as the standard data rate format (or 1X format). Each byte in the VBI line is arranged with the least significant byte first. The last bit is used as parity for error checking. Each byte of the transmitted data is parity checked upon receipt. The 1X format is the format used to transmit closed captions in VBI line 21 field 1, as shown by closed caption data 1612 in FIG. 21. It is also the format used to transmit EDS data in VBI line 21 field 2, as shown by EDS data 1616 on FIG. 21.

Figure 23:
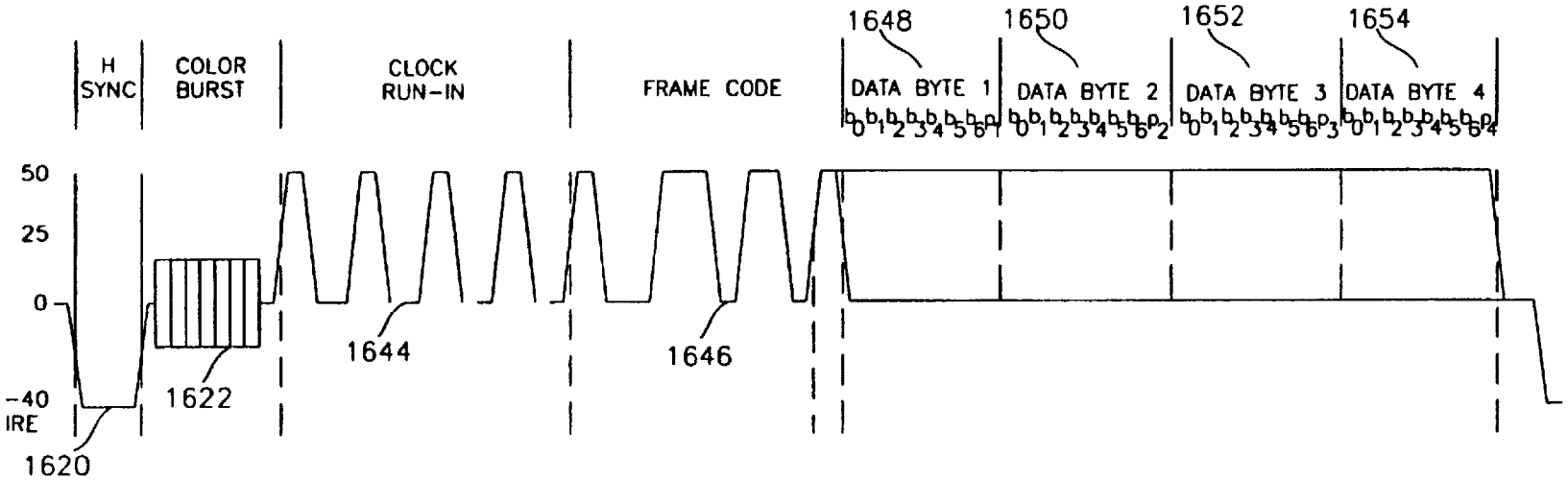
FIG. 23 is a timing diagram of the accelerated data formed (2×) for transmitting data in the VBI.

An accelerated data format (2X format) as shown in FIG. 23 uses a bit rat twice that of the 1X format to thereby provide 4 bytes per VBI line. The clock run-in 1644 is the bit sequence "10101010." The frame code 1646 is "10011101101." Four data bytes 1648, 1650, 1652 and 1654 are transmitted each VBI line. The 2X format can be used to transmit data 1614 in FIG. 21.

FIG. 24A is a block diagram of a portion of a radio or television station 1340. A television or radio station generally has a traffic computer 1341 which stores the station log 1342 and a station identification 1344. The traffic computer also has a clock/calendar 1346 for maintaining the correct date and time. Each time a program is transmitted on the station, the date and time are recorded along with a program identification corresponding to the transmitted program. The date and time and program identification can be stored in the station log automatically or can be stored when a disc jockey presses a time stamp key 1348. The time stamp key 1348 could be automatically pressed each time a play key 1350 is pressed. When a time stamp key 1348 is pressed then the date and time from the clock/calendar 1346 is read and stored in the station along with a program identifier. FIG. 24B illustrates an example entry in the station log. The date and time 1347 are recorded along with a program identifier consisting in this case of bar code number 1343, and a number 1345. In this case a radio station has played a cassette disc having a bar code 056775420727 and track 6 on that CD on Aug. 30, 1994 at 15:31:00.

Either continuously or periodically, the radio or TV stations transmit the station logs and the correct time of day to the server 1180 via modem 1352 and telephone network 1162. TV stations and FM stations can also contain an SCA generator 1354 and transmitter 1356 which can transmit the station log via antenna 1358. Television stations can also insert the station log data into vertical blanking interval (VBI) of a video signal by using VBI inserter 1354 to transmit the data. Note that when the station log is transmitted either via the telephone network or via antenna 1358, that the station ID 1344 is appended to the station log and is also transmitted.

FIG. 25 is an illustration of a frequency spectrum for a FM radio station illustrating SCA FM bands 1360. The SCA FM bands are used to transmit data and are commonly used today for transmitting data to pagers.

Figure 26A:
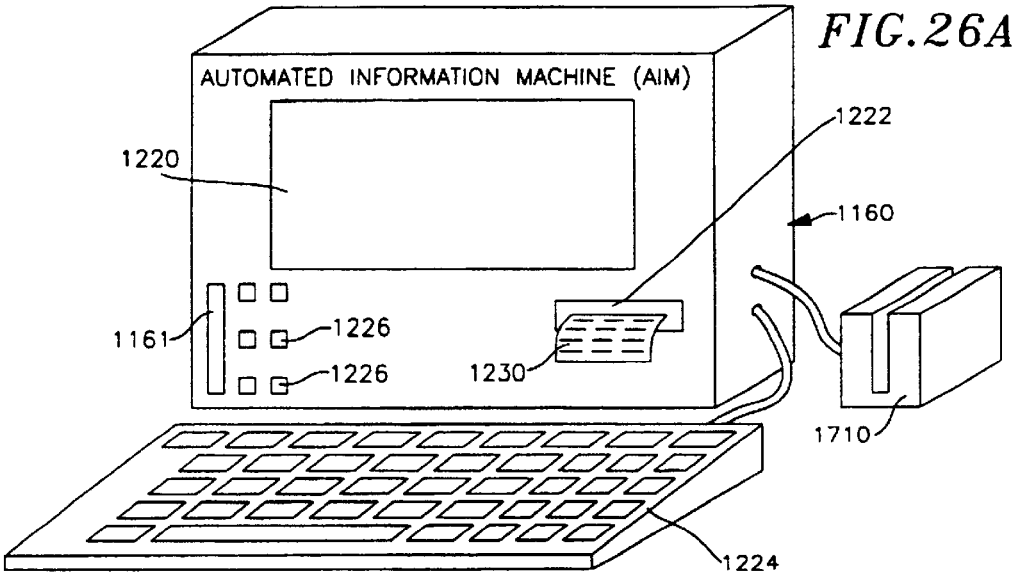
FIG. 26A is a diagram of an automated information machine (AIM) according to the present invention.
Figure 26B:
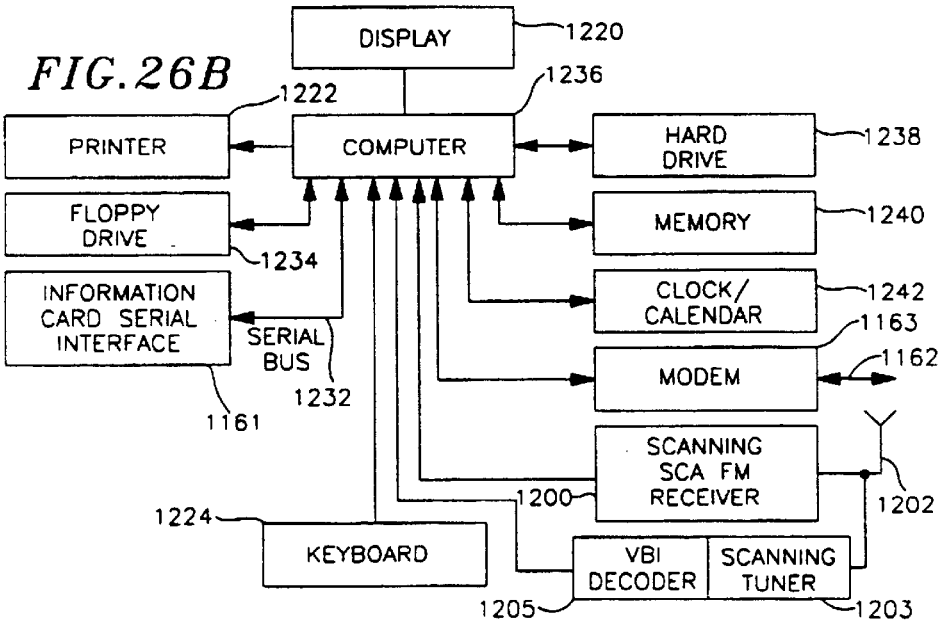
FIG. 26B is a block diagram of an automated information machine according to the present invention.

FIG. 26A is an illustration of one embodiment of an automated information machine 1160. The automated information machine has a keyboard 1224, a display 1220, a pointer 1222, and a slot 1161 which is adapted to be an interface for the information card. The automated information machine can also have various controls 1226. The printer 1222 is used to print the inserts 1012 and 1014 shown in FIGS. 13A and 13B and is also used to print auxiliary information that is accessed via the use of the information card. The printer 1222 can be a laser printer or a thermal printer or other type of printers, such as dot matrix. FIG. 26B is a block diagram of an automated information machine. As shown the automated information machine has a computer 1236 that interfaces to display 1220, printer 1222, floppy drive 1234, keyboard 1224, hard driver 1238, memory 1240, and clock/calendar 1242. The computer also interfaces to modem 1163 and also to scanning SCA FM receiver 1200, and to scanning tuner 1203 and VBI decoder 1205.

The scanning SCA FM receiver or television VBI decoder receives transmissions from the FM radio stations and the television stations that transmit their station logs via SCA FM or via the VBI. Since each station transmits on a different carrier frequency, the receiver 1200 and the tuner 1203 must scan the frequencies to receive the station logs from all of the transmitting stations via antenna 1202. Alternatively, multiple receivers can be employed, each tuned to a station.

The AIM 1160 also has an information card serial interface 1161 which interfaces to the contacts 1036 and 1038 on the exterior of the information card, as shown in FIGS. 13A and 13B. The information card serial interface is coupled to the computer 1236 via serial bus 1232.

Auxiliary program information, such as computer data, can also be appended to station log data in each AIM using the keyboard or other input media. A merchant can also program data filters. For example, the merchant hosting the AIM may not wish to print coupons of a competitor.

Figure 27:
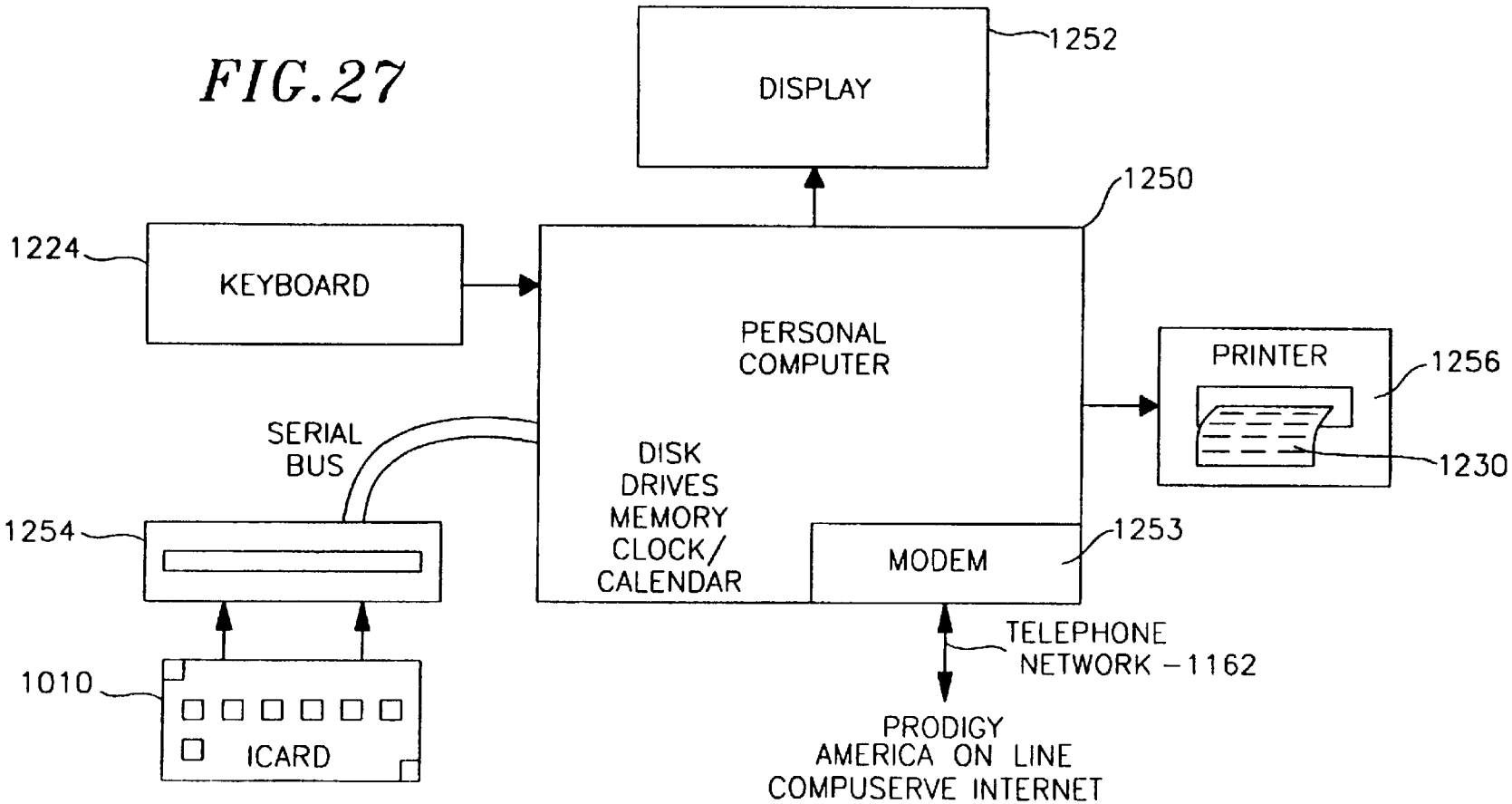
FIG. 27 is an alternate block diagram of an automated information machine using a personal computer according to the present invention.

FIG. 27 illustrates an alternate implementation of an AIM. In FIG. 27 an AIM interface device 1254 is provided for interfacing with an information card 1010. The AIM interface device 1254 is interfaced via a serial bus to a personal computer which contains disc drives, memory and a clock/calendar. The personal computer also has a keyboard 1224, a display 1252, and a printer 1256. The printer can be used in the same manner as printer 1222 in FIG. 26A for printing media, which can be used for the inserts 1012 and 1014 shown in FIGS. 13A and 13B and for printing auxiliary information for a program. The modem 1253 can be used to access various on-line services via a telephone network 1162. For example, the telephone network 1162 can be used to access on-line services such as Prodigy, America On-Line, Compuserve and/or the Internet, which can be used to provide station logs and auxiliary information for programs transmitted from stations. These on-line services could receive this data from the server 1180 or directly from the stations. The advantage of the embodiment shown in FIG. 27 is that a user of the information card 1010 can access the desired auxiliary information for programs from home. Another advantage is that the user can easily change the setup of the information card at home using his/her own printer to print new inserts 1012 and 1014 and to reset the information card clock/calendar 1040 using the date/time information provided from the on-line service. Even the functions of the merchant AIMs can be performed at home on the personal computer. For example, if the information card has an entry that indicates that the user has visited a merchant the required number of times to obtain a reward, then the printer 1256 can be used to print a coupon for the user which can be used on the next visit to the merchant. The coupon can be used to obtain a free item or to obtain a discount. The model 1253 can be used to transmit to the on-line service all of the information entered by the user for audience monitoring purposes.

Figure 28:
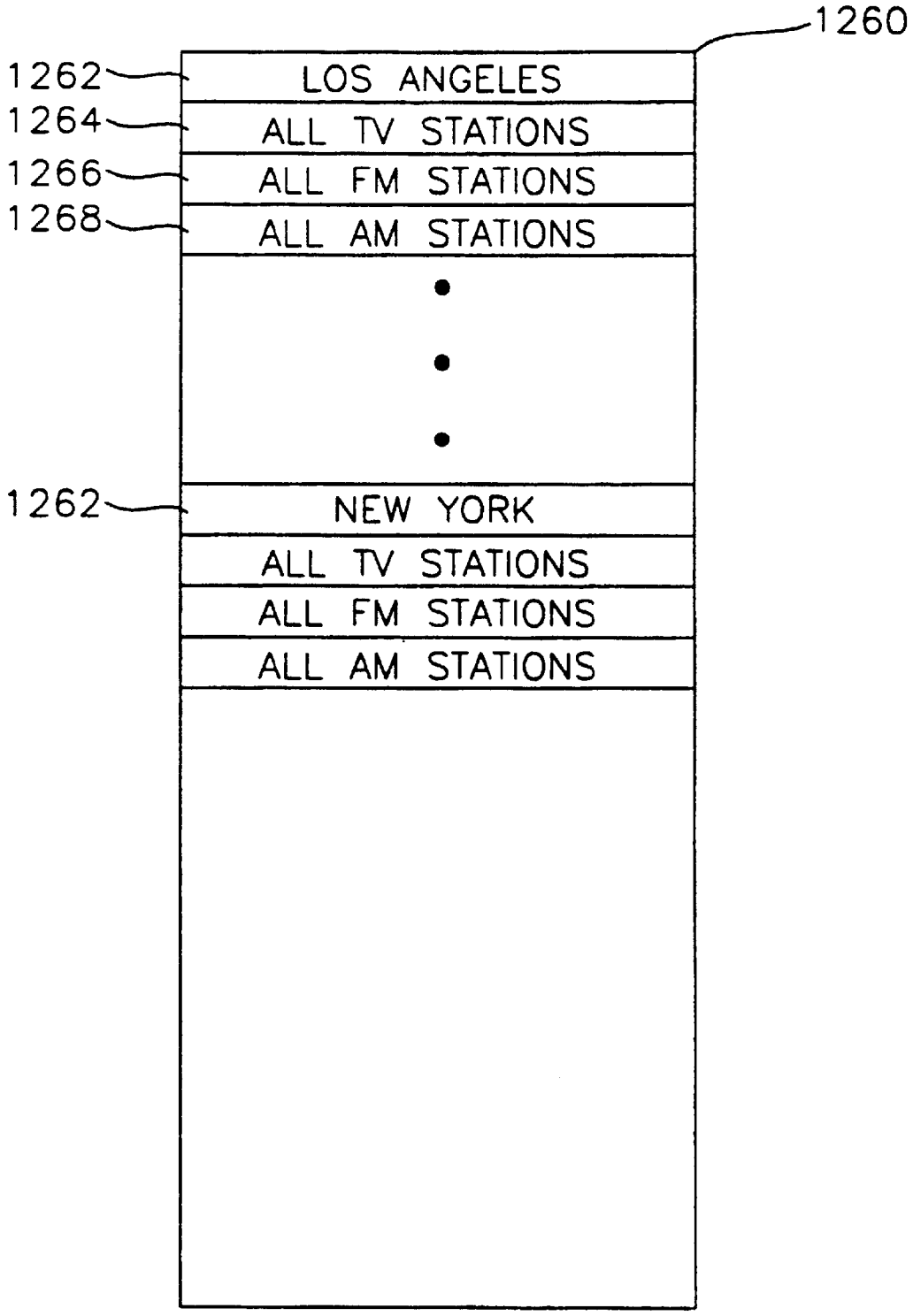
FIG. 28 is a layout of a memory having stored, in the automated information machine, station information according to the present invention.

The AIM 1160 is used to initialize the information card 1010. For example, the table 1050, shown in FIG. 15, which maps the keys on the information card to the station identifications corresponding to the keys is loaded into information card memory 1042. FIG. 28 shows a portion of the data that can be stored in the automated information machine 1160 or the computer 1250 for initializing the information card 1010. For cities such as Los Angeles 1262, the memory would contain data for televisions stations 1264, FM stations 1266, and AM stations 1268. By storing the stations sorted by city and TV/FM/AM, the AIM can display to the user the stations in his/her area. If the user wishes to access stations in another city such as New York, then that data can also be available in the AIM. FIG. 29A shows the format for storing information for each station. The station information can include call letters, the frequency or channel of the station, the designation of whether the station is AM, FM or a television station, the programming type of the station and a station identification number. The programming type of the station can be, for example, news, talk, classical, or sports. In order to uniquely identify the station, a station identification is required which can be the call letters of the station or a unique station identification number assigned to the station. Other information that can be included with the station identification includes a participation indication and a rank. The participation identifier indicates whether the station participates in the system for accessing auxiliary information. For example a station may chose to not participate, in which case the participation indication will be N for no. The station may with to not participate in order to avoid a fee for participation. If a station does participate then the participation indication is Y for yes. The rank is used to indicate the relative importance of stations. The rank can be determined by the amount paid by the station. The rank can be a numerical indicator from 1 to 20 or any other range. The rank can be used to order the assignment of stations to keys on the information card 1010. FIG. 29B is a listing of station information for various channels. As shown the station KABC 1280 has a participation indication of Y 1286, and the channel for KABC is 2 (element 1282). KABC is a television station, the rank of the station is a 1, the programming on this station is general, and the station identification number is 1024591. These are identified as elements 1280 through 1292 on FIG. 29B. Another example of a station listed in FIG. 29B is KKGO which has a frequency of 105.1 and is a classical FM radio station.

Figure 30:
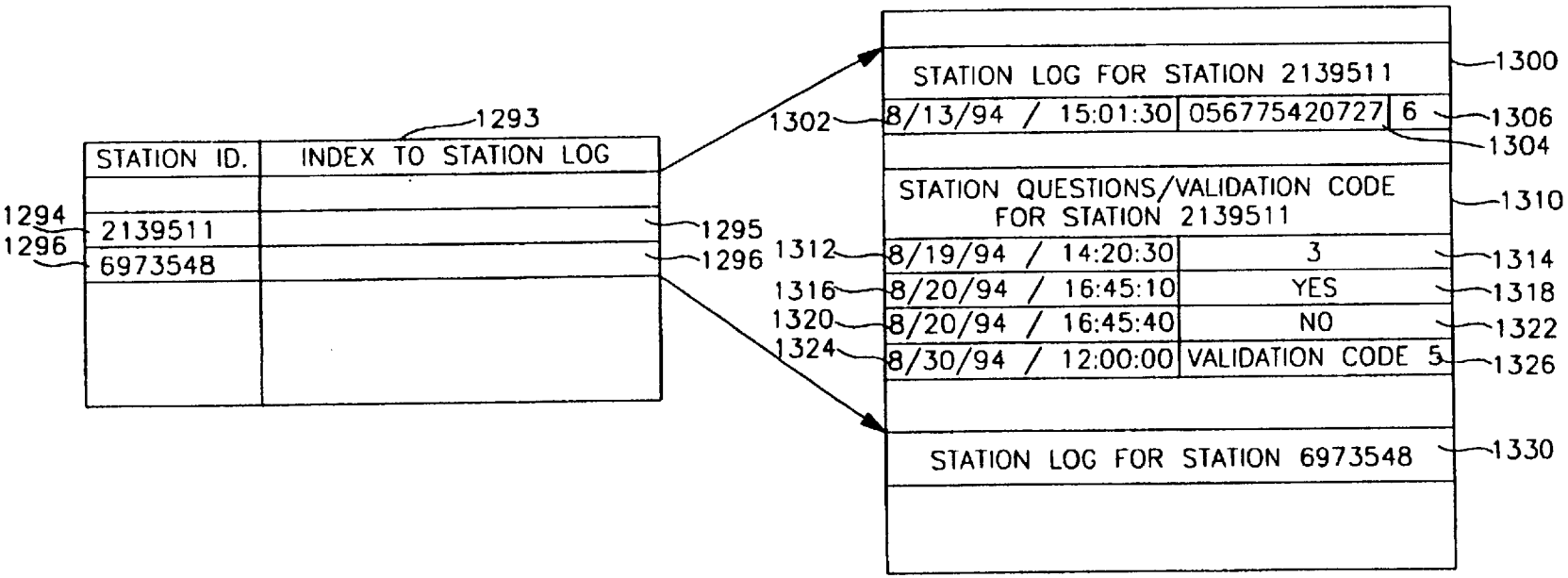
FIG. 30 is a diagram illustrating the mapping of a station identification to a station log according to the present invention.

The station information is used by the user to initialize the information card. In particular the station identifications corresponding to keys are loaded into the memory 1042 of the information card 1010. When the information card 1010, and the memory 1042 is read by the AIM 1160, then the station identification of a data set in the memory 1042 such as station identification 1103 shown in FIG. 16, is used to access an index table 1293 shown in FIG. 30, which maps the station identification to an index to a station log which has been stored in the AIM 1160. For example, the station identification 1109, which is 2139511 as shown in FIG. 16 is used in FIG. 30 to access a station log for station 2139511, which is shown as station log 1300 in FIG. 30. Once the correct station log has been found then the station log is searched for a date and time that matches the date 1107 and falls within the transmission time 1108 shown in FIG. 16 which are 8/13/94 and 15:01:30, respectively. As shown in FIG. 30, the entry 1302 has the same date and time as date 1107 and time 1108. Since there is a comparison between the date and time and the data read from the information card and the data stored in the station log for the station corresponding to the station identification read from the information card, the program identifier 1304 and 1306 are then used to access auxiliary information for the program. In this case the program identification 1304 and 1306 indicates that the program ID is 056775420727, which is a bar number on a CD and the 6 in element 1306 indicates that track 6 of that CE was played on the date and time shown in FIG. 30.

Note that there will rarely be an exact match of time. It is only necessary that the time stored in the information card fall within a range between the time of a program and the start time of a following program to generate a match. For example, if a station log indicates that a first program starts at 10:00 a.m. and that the next program starts at 10:15 a.m., then if the time reads from the information card is 10:08, then the auxiliary information for the first program will be accessed.

FIG. 31 shows auxiliary information 1334 corresponding to the program identifier 1304 and 1306. The information for 1336 for track 1006 indicates that at the time recorded in the information card the overture Leonore OP. 72a was playing on the station. By searching the station information listed in FIG. 29B the AIM 1160 can determine that the station was KUSC which has a station identification 1294 which as shown corresponds to station identification 2139511.

The station log 1300 shown in FIG. 30 can also contain a portion which is devoted to questions asked on the station or requests for the user to enter a validation code. For example, suppose the station has asked a question on August 19 at 14:20:09 that has an average of 3. The user enters the number 3 in the information card by pressing the key corresponding the broadcasting station three times. The entries are shown as entries 1120, 1122, and 1124 in FIG. 16. As indicated in elements 1130, 1132, 1136, 1138 and 1134 the entries differ only by the time entries. When the AIM 1160 reads the entries 1120, 1122, 1124 from the information card 1010 then because the date and times only differ for the series of entries by a preestablished number of seconds, the AIM counts the number of entries in the series with the small difference in time and concludes that the number 3 has been entered for the station corresponding to station identification 2139511. Then the AIM 1160 compares the number 3 entered at the date and time indicated by elements 1130 and 1132 in FIG. 16 to the portion of the station log containing answers to questions. When this is done the entry 1312 which has the same date and time in the station log as the entry in the information card will be found and then the count 3 will be compared to the answer 1314 which in this case is also a 3. Since the count and the answer are equal, the user can be rewarded with a coupon that can be printed by the AIM 1160. More elaborate reward criteria can be established. For example, the winner could be restricted to the first person to enter the correct answer in the AIM.

As shown in FIG. 30, the station log can also contain YES and NO answer data. For example, elements 1316 and 1318 correspond to a YES answer and elements 1320 and 1322 correspond to a NO answer. The key difference is that the YES answer needs to have a time of 16:45:10 and the NO answer should have a time of 16:45:40. As indicated in FIG. 16, the entry 1150, 1151 can contain a corresponding YES or NO answer. The answer entered into the information card depends on the time at which the user presses the station key corresponding to the station ID 2139511.

Also on FIG. 30 are shown date and time elements 1324 and validation code 1326 which are recorded in the station log for the date and time at which the user has been requested to enter a 5 into the information card. The validation code can be used to require the user to enter the validation code in order to access data for a particular station. This can be used to prevent misuse of the information card. The user would enter the validation code in the same manner as shown in elements 1120, 1122, 1124 of FIG. 16 for entering a number in response to a question that has a number answer. The comparison of the entries in the information card to the validation code would be done in the same way as comparing the count obtained from elements 1120, 1122, 1124 to the number answer 3 (element 1314).

Figure 32:
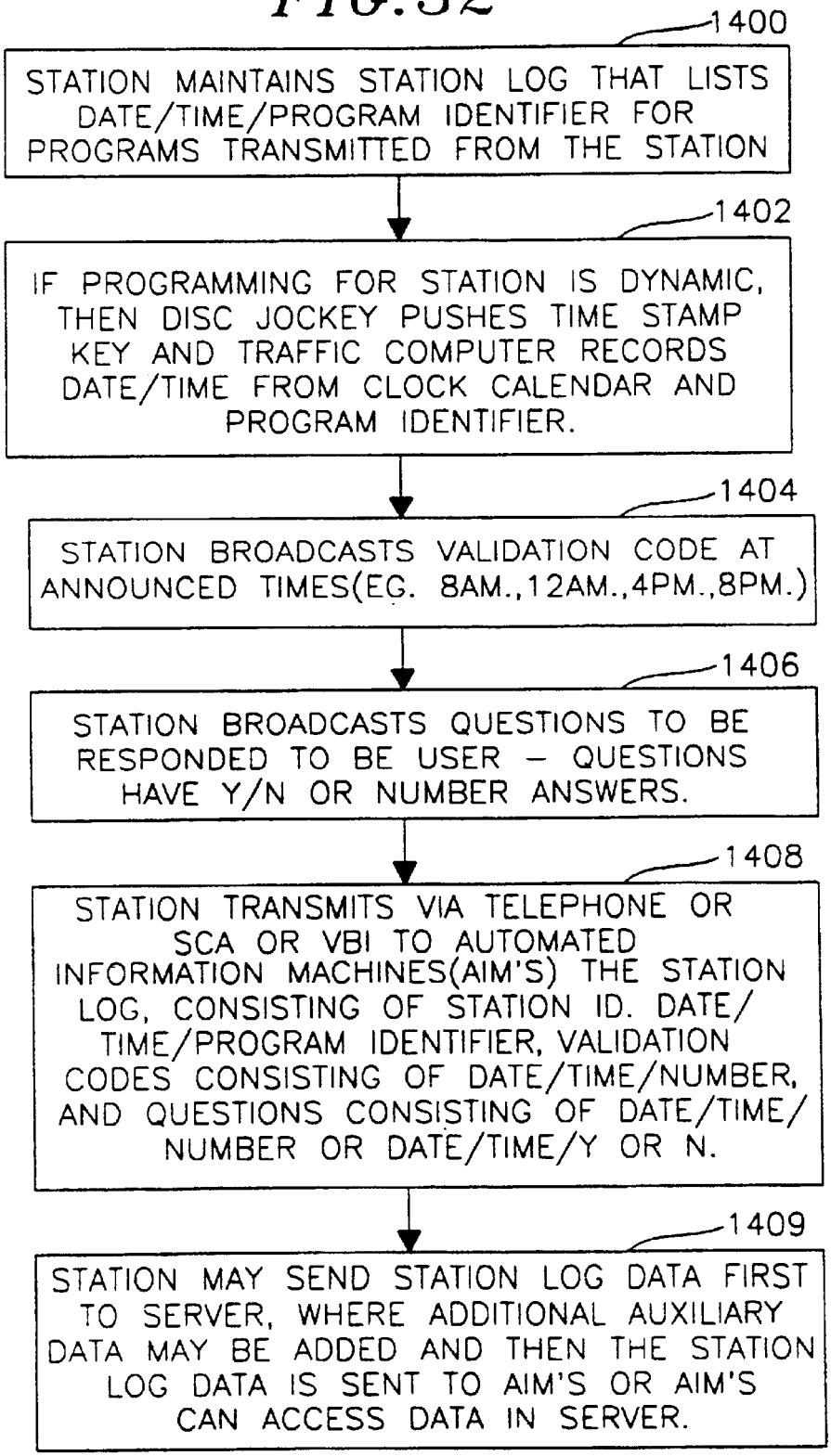
FIG. 32 is a flow diagram for a method for maintaining a station log and periodically communicating the station log to automated information machines according to the present invention.

FIG. 32 is a flow diagram of a method for operating a station in order that a user with an information card can obtain auxiliary information for a program transmitted from the station. In step 1400, the station maintains a station log that lists the date and time and program identifier for programs transmitted from the station. If the programming is prearranged then the station log can be automatically recorded. If the programming for the station is dynamic, then a disc jockey can push a time stamp key for a traffic computer to record the date and time from a clock/calendar maintained at the station and the station log would also record the program identifier, as shown in step 1402. In step 1404, it is shown that the station can broadcast validation codes at announced times. The validation codes are then entered in the information card by the user. One possibility is to broadcast the validation codes at set times such as 8:00 a.m., 12:00 a.m., 4:00 p.m. and 8:00 p.m. and give the user a choice of which time to enter the validation code for a day. In step 1406, it is shown that the station can broadcast questions to be responded to by the user. The questions can have YES or NO answer or numerical answers. Then in step 1408, the station transmits the station log via telephone, SCA or VBI to the automated information machines. The station log consists of the station ID, a listing of date, time, and program identifiers, validation codes, the correct time of day and questions.

If the station logs are first collected in a server 1180, as shown in FIG. 17, additional auxiliary information can be added at this point, as shown in step 1409.

Figure 33:
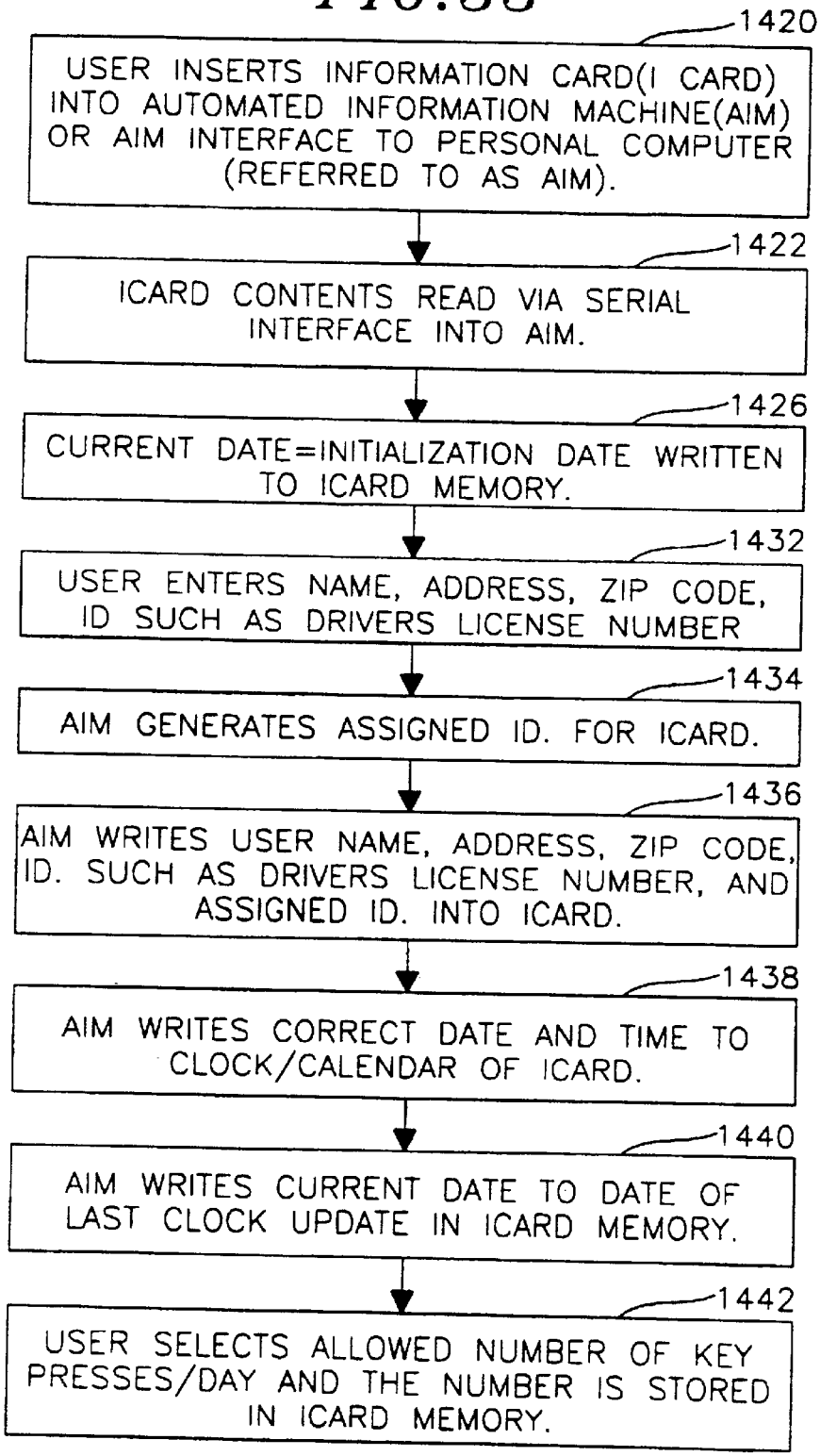
FIG. 33 is a flow diagram of a method for initializing an information card via an automated information machine according to the present invention.

FIG. 33 is a flow diagram of a method for initializing an information card. In step 1420 the user inserts the information card into the AIM or into an AIM interface which is coupled to a personal computer. Then in step 1422 the information card contents are read via the serial interface on the information card into the AIM. In step 1426 the current date is written into the initialization date location in the information card memory. In step 1432 the user enters his name, address, zip code, and ID such as a driver's license number. The AIM then generates an assigned ID for the information card in step 1434. Then in step 1436 the AIM writes the user name, address, zip code, and identification (ID) such as driver's license number and assigned ID into the information card. Then in step 1438 the AIM writes the correct date and time as received from any of the stations or the server to the clock/calendar of the information card. Then in step 1440, the AIM writes the current date to the last clock update date location in the information card memory. In step 1442 the user can select the number of key presses/day by responding to the screen shown in FIG. 35J. The number is stored in information card memory 1042.

Figure 34:
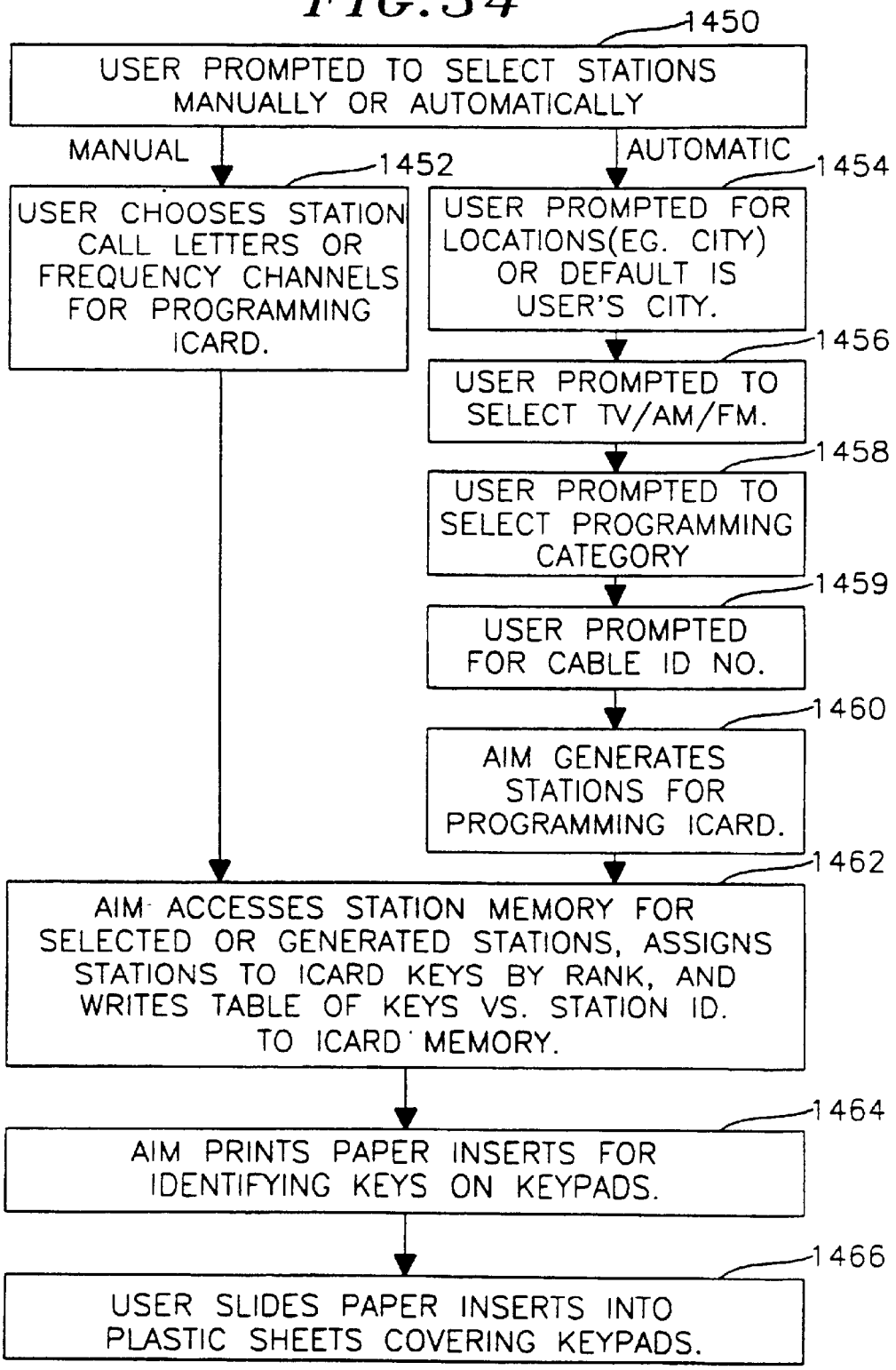
FIG. 34 is a flow diagram of a method for selecting stations whose station identifications are stored in the information card and for which the automated information machine prints an insert for identifying keys on the information card keyboards according to the present invention.
Figure 36:
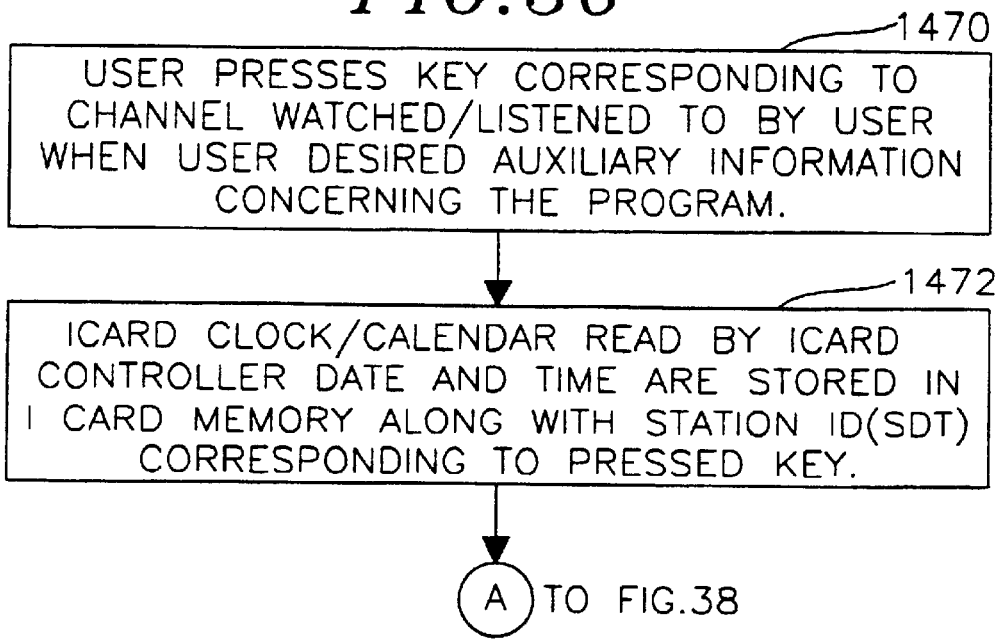
FIG. 36 is a flow diagram of a method for storing a station identification, date and time (SDT) in an information card according to the present invention.

FIG. 34 is a flow diagram of a method for selecting stations to be loaded into the information card. In step 1450 the user is prompted to select stations manually or automatically. If the user selects to enter the stations manually, then the user selects from a displayed menu the station call letters or the frequency or channels of the participating stations for programming the information card as shown in step 1452. If the user selects automatic programming of the information card, then in step 1454 the user is prompted for a location such as a city or a default can be made to the user's city as listed in the user's address. Then in step 1456 the user is prompted to select TV/AM or FM. Then in step 1458 the user is prompted to select a programming category such as classical, news, or sports. In step 1459, the user is prompted to enter a cable ID number, which can be used for accessing a cable channel map, as described above. Then in step 1460 the AIM generates the stations for programming the information card. In step 1462 the AIM accesses station information for the selected or general stations, assigns stations to information card keys by rank, and writes the table of keys versus station identification to the information card. Then in step 1464 the AIM prints paper inserts for identifying keys on the keyboards and then in step 1466 the user can slide the inserts into the plastic sheets covering the keyboards on the information card 1010. For a two sided information card, each insert includes a side ID, such as A or B corresponding to an ID identifying each side of the information card.

FIGS. 35A through 35J are example screens that are displayed to the user on the AIM display 1220. FIGS. 35A through 35D are self explanatory as in FIG. 35E. FIG. 35F are the locations that the user can choose between and FIG. 35G is used if the user wishes to only enter stations of a certain type. FIG. 35H is a listing of programming types that the user can choose for radio and FIG. 35I is a listing of programming types for television.

FIG. 35J illustrates a particular display that can be used to charge the user for use of the information card and the AIMs. The user can select the number of keypresses per day. A certain number can be offered for free with higher numbers being charged a fee. This would encourage most users to use the free selection, which reduces the number of printouts that the user can obtain from the AIM and therefore saves paper in the AIM printer.

FIGS. 36, 37A, 37B, and 38 are flow diagrams for using an information card to obtain auxiliary information for programs. In step 1470 the user presses a key corresponding to the channel that is being watched or listened to when the user desires information concerning a program. Then in step 1472 the information card clock/calendar is read by the information card controller and the date and time are stored in information card memory along with a station ID corresponding to the pressed key.

Figure 38:
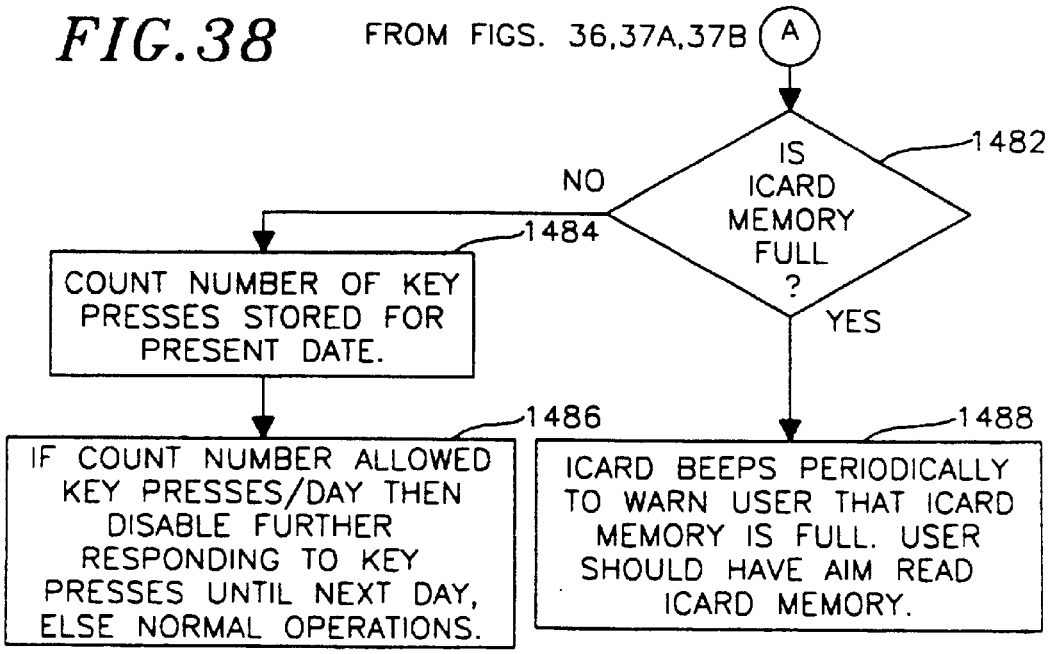
FIG. 38 is a flow diagram of a method for indicating that the information card memory is full and for disabling the information card if the usage is abnormally high according to the present invention.

In FIG. 38 a test is made as to whether the information card is full as shown in step 1482. If the information card memory is full, then the beeper in the information card beeps periodically to warn the user that the information card memory is full. The user can then go to an AIM to have the information card read. If the information card memory is not full then in step 1484 the number of key presses for the present date can be counted. If in step 1486, the count is greater than the allowed number of key presses per day as indicated by an entry in the information card memory then the information card is disabled until the next day. Otherwise normal operations for the information card continue. The user can select the number of key presses per day and store the number in the information card memory during the initialization as shown in step 1442 of FIG. 33.

Figure 37A:
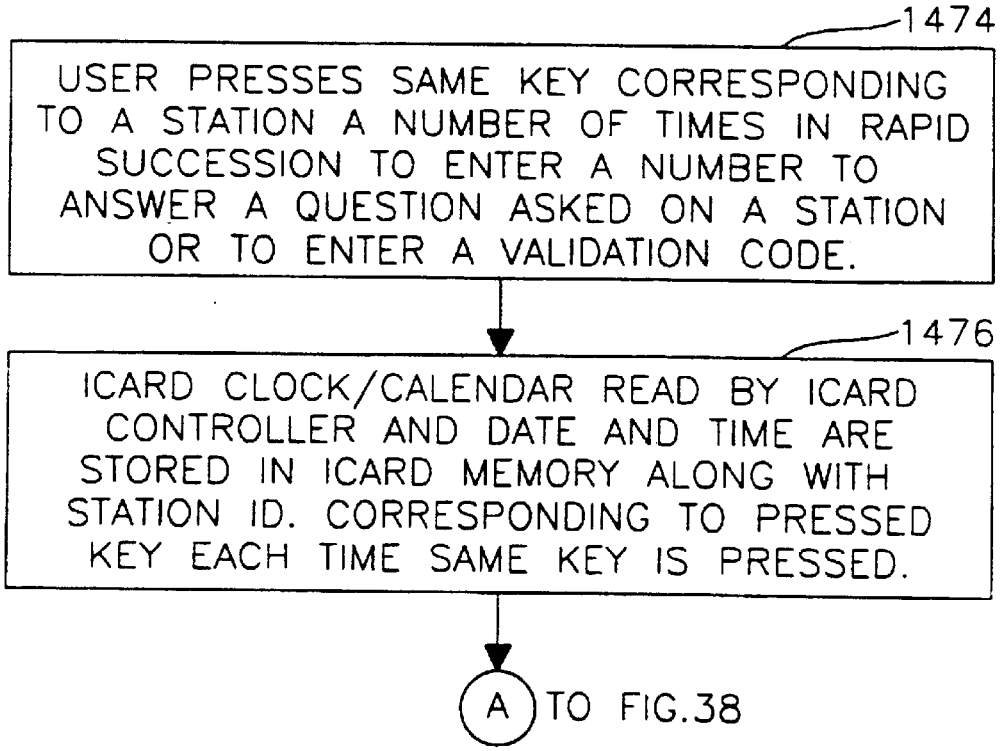
FIG. 37A is a flow diagram of a method for storing a number associated with a station identification in an information card according to the present invention.

FIG. 37A is a flow diagram of a method for entering a number into the information card. In step 1474 the user presses the same key corresponding to a station a number of times in rapid succession to enter a number to answer a question asked on a station or to enter a validation code. Then in step 1476 the information card clock/calendar is read by the information card controller and the date and time of each key press is stored along with the station identification corresponding to the pressed keys. A YES or NO question can also be answered in this manner. For example, 2 key presses equals YES, 3 keys presses equals NO.

Figure 37B:
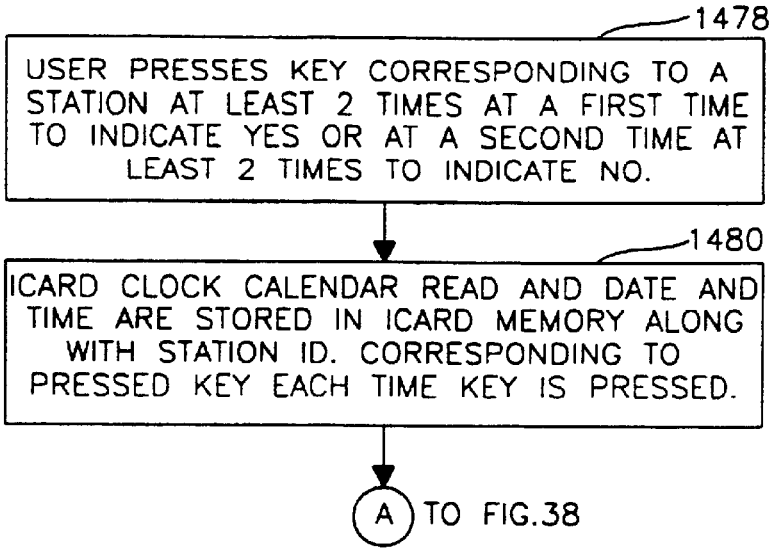
FIG. 37B is a flow diagram of a method for storing a YES or NO answer in a information card according to the present invention.

FIG. 37B is a flow diagram of another method for entering a YES or a NO answer to a question from a station. In step 1478 the user presses a key corresponding to a station at lest two times at a first time to indicative a YES answer or at a second time, at least two times to indicate NO. The purpose of pressing the key at least two times is to distinguish the YES or NO answers from the key presses to obtain auxiliary information as indicated by the method shown in FIG. 36. Then in step 1480 the information card clock/calendar is read and the date and time are stored in the information card memory along with the station ID (SDT) corresponding to the press key each time the key is pressed. The method shown in FIG. 38 is then performed.

Figure 39A:
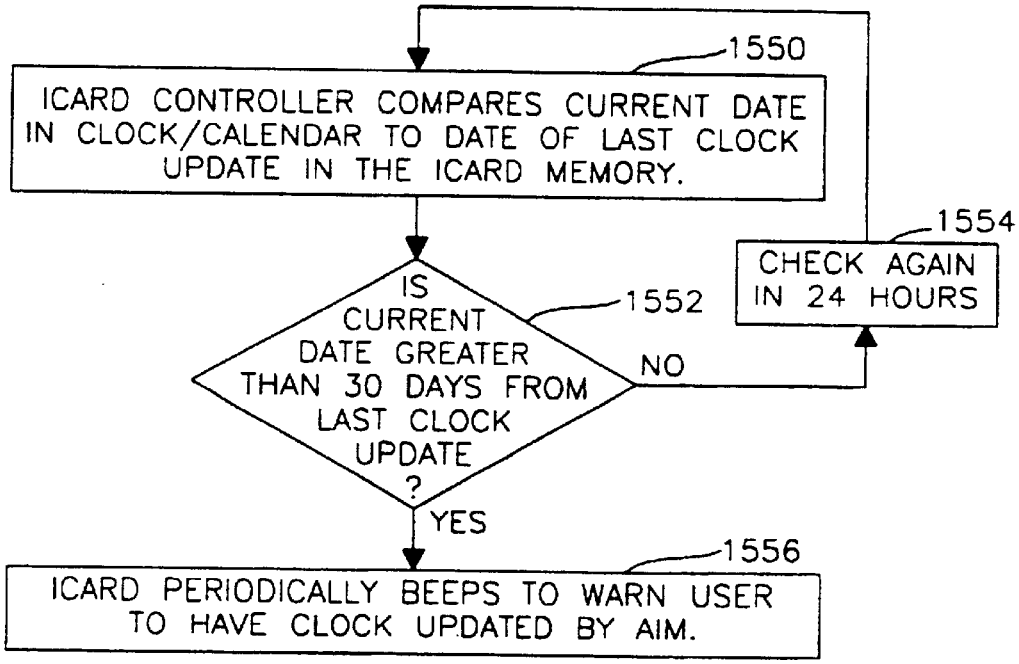
FIG. 39A is a flow diagram of a method for monitoring whether the clock/calendar in the information card has been updated according to the present invention.

FIG. 39A illustrates a method for periodically checking to see when the last time the clock has been updated by the AIM. The purpose of this method is to prevent the clock in the information card from drifting too far. In step 1550 the controller 1040 compares the current date in the clock/calendar to the date of last clock update date in the memory. In step 1552 it is determined whether the current date is greater than say thirty days from the last clock update. If it is, then in step 1556 the beeper 1034 periodically beeps to warn the user to have the clock updated by the AIM. If the current date is less than thirty days from the last clock update date then the number of days is again checked in twenty-four hours as indicated in step 1554.

Figure 39B:
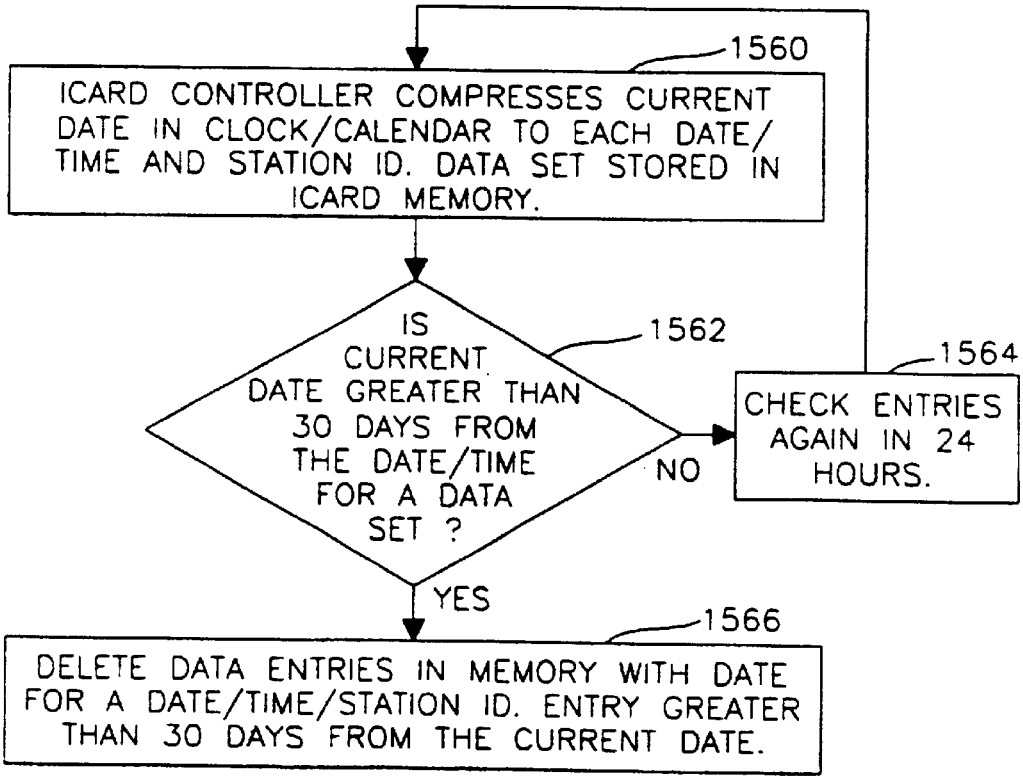
FIG. 39B is a flow diagram of a method for erasing date, time and station identification entries in the information card that are older than 30 days according to the present invention.

FIG. 39B is a method for discarding entries in the information card that are older than thirty days. In step 1560 the controller 1040 compares the current date in the clock/calendar to each time/date in the station ID data set stored in the information card memory. Then in step 1562 it is determined whether the current date is greater than say thirty days from the date and time for a data set stored in the information card memory. If the entries are more than thirty days apart, then in step 1566 the data entries in memory with a date and time greater than thirty different than the current date are erased. If the step 1562 finds no such entries, then as indicated in 1564 the step 1560 will be repeated in another twenty-four hours.

FIGS. 40A to 40E are flow diagrams of a method for using the AIM to access auxiliary information for the data sets of date time and station ID stored in the information card memory. In step 1490 the user inserts the information card into the AIM and the information card serial interface is connected to the AIM. Then in step 1492 the AIM updates the clock/calendar in the information card to the correct date and time. Then in step 1494 the current date is written into the last clock update date in the information card memory. In step 1496 the AIM can also check the information card battery to indicate to the user if it needs replacement. Then in step 1498 the AIM reads the data sets for date, time and station ID from the information card memory. Each time an information card data set is read from the information card memory the information card memory entry is erased. In step 1498 the AIM also reads the Cable ID. No. 1096 from the information card memory. Then, if the station ID is for a cable channel, which could be determined by inspecting whether a certain bit (not shown) in the second station ID 1103 has a certain value, then in step 1499, the Cable ID No. 1096 is used to access a cable channel map, which is used to map the station ID to the correct station ID so that the correct station log can be retrieved.

Then in step 1500 it is determined whether a series of entries in the information card memory are found with the same station code and with each date and time in the series having a date and time less than a predetermined interval of time say five seconds after the log time of another entry. If no such entry is found then the method proceeds to FIG. 40B. In step 1502 of FIG. 40B the AIM compares each date and time and station ID to the station log for the station corresponding to the station ID to obtain the program identifier and auxiliary information for the program broadcast at the same date and time on the station. The method then can proceed to FIG. 40E which is another method of preventing misuse of the information card. However, before describing FIG. 40E, the balance of FIG. 40B will be explained. Once the program identifiers have been determined in step 1502, then the AIM uses the program identifiers to access auxiliary information for the program identifiers to access auxiliary information for the programs as shown in step 1504 of FIG. 40B. Then in step 1506 auxiliary information for the program is displayed to the user and then if the user selects to print the information in step 1508, the auxiliary information is printed by the AIM in step 1510.

Figure 40A:
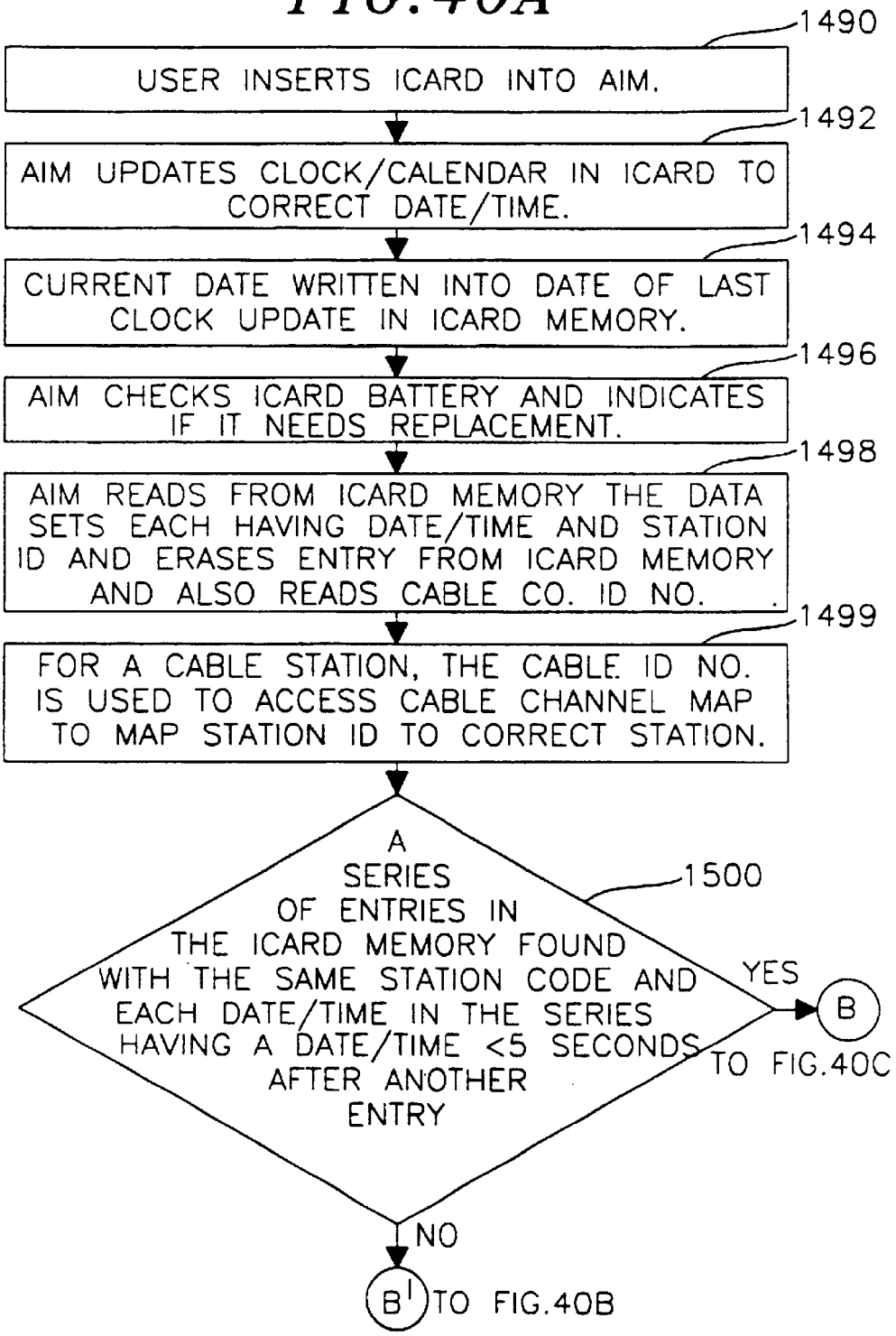
FIG. 40A is a flow diagram of a method for the automated information machine to read data from an information card according to the present invention.
Figure 40B:
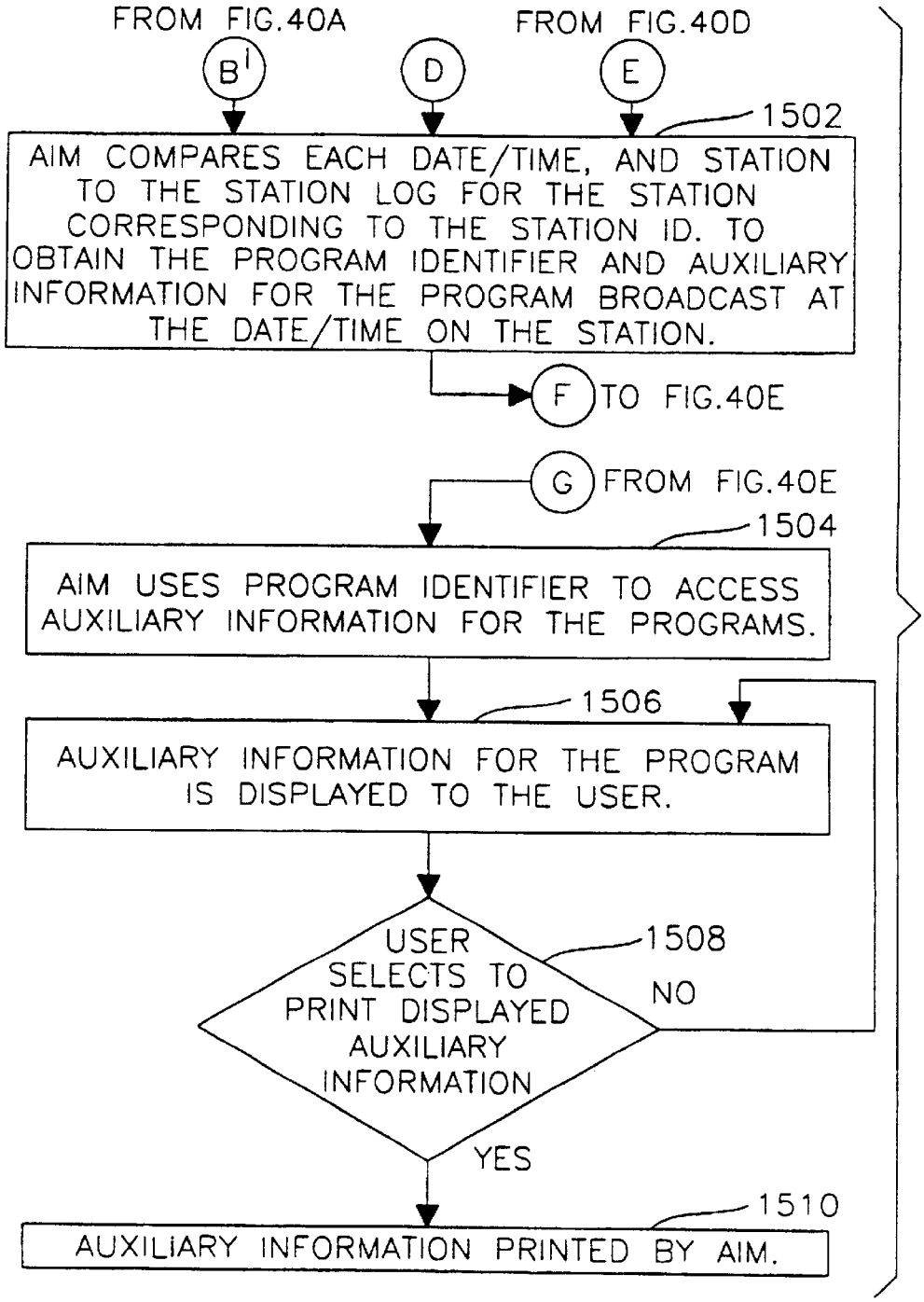
FIG. 40B is a flow diagram of a method for the automated information machine to compare the data read from the information card to station logs and accessing auxiliary data for programs according to the present invention.
Figure 40C:
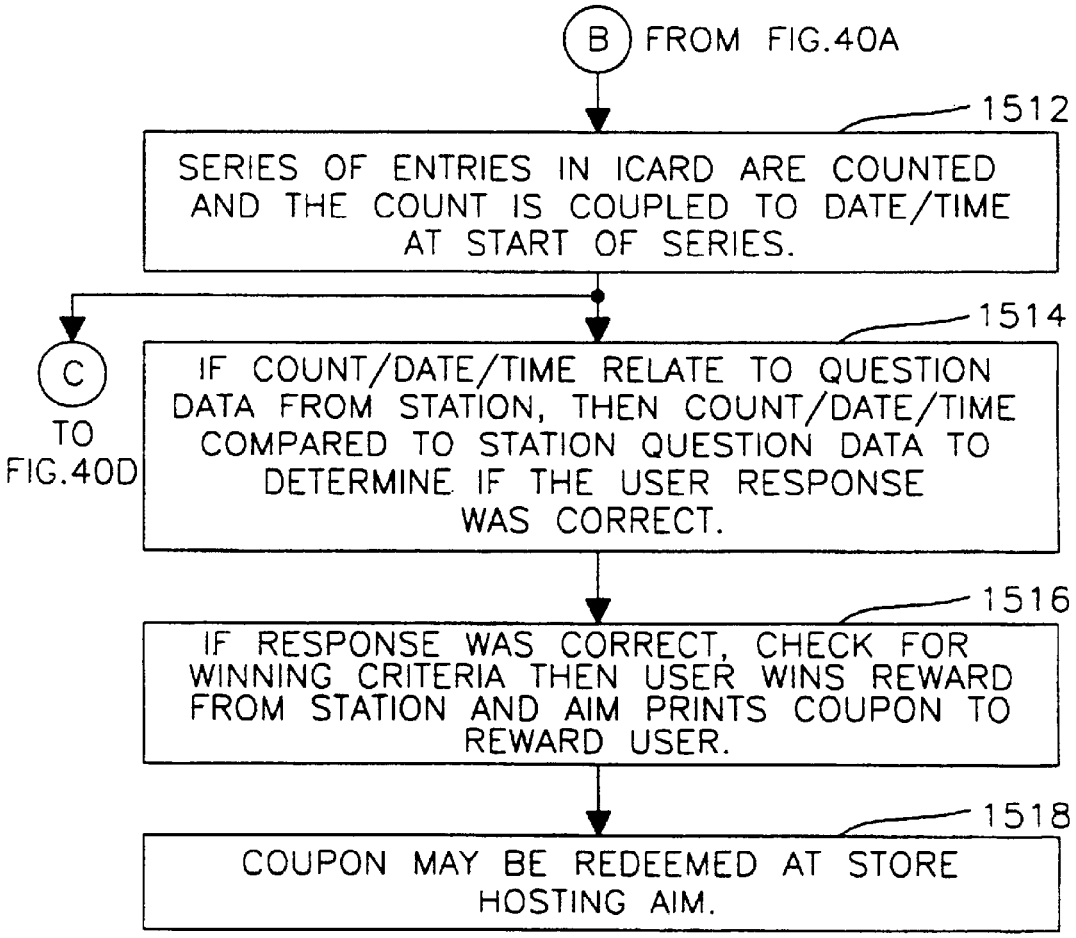
FIG. 40C is a flow diagram a method for determining that a series of entries in an information card represents a number according to the present invention.
Figure 40D:
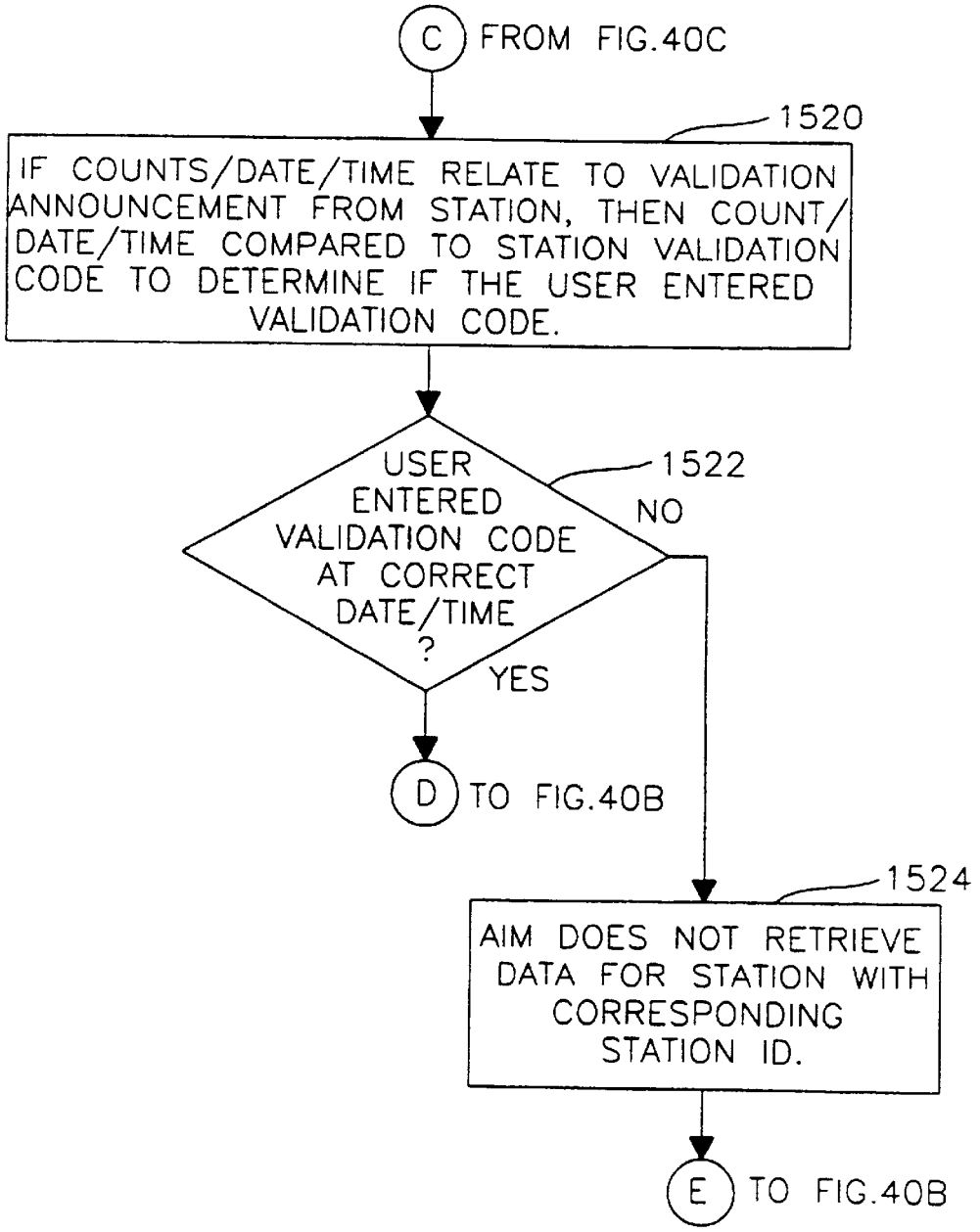
FIG. 40D is a flow diagram of a method for determining that a validation code has been entered by user in the information card in response to a validation announcement according to the present invention.

If in step 1500 of FIG. 40A it is determined that a series with similar dates and times have been found in the information card memory, then the method of FIG. 40C is executed. In step 1512 the series of entries in the information card are counted and the count is coupled to the date and time at the start of the series. Then if the count/date time relate to question data from the station, then the count/date time is compared to the station question data in the station log to determine if the user response was correct as shown in step 1514. Then in step 1516 the user wins a reward from the station and the AIM can print a coupon to reward the user. If there is additional criteria for winning, such as being the first user with a right answer at the AIM, that criteria is applied at this point. As shown in step 1518 the coupon can be redeemed at the store posting the AIM. The series can also relate to a validation announcement from the station, and if so, then in step 1520 shown in FIG. 40D, the count/date/time are compared to a station validation code in the station log to determine if the user entered the proper validation code. In step 1522 it is determined whether the user entered the validation code at the correct date and time. If the user has, then normal operation of the AIM will continue; however, if the user has not entered a validation code at the correct date and time, then as shown in step 1524 the AIM doe snot retrieve data for the station with a corresponding station ID. The AIM will continue to operate to retrieve auxiliary information for other stations.

Figure 40E:
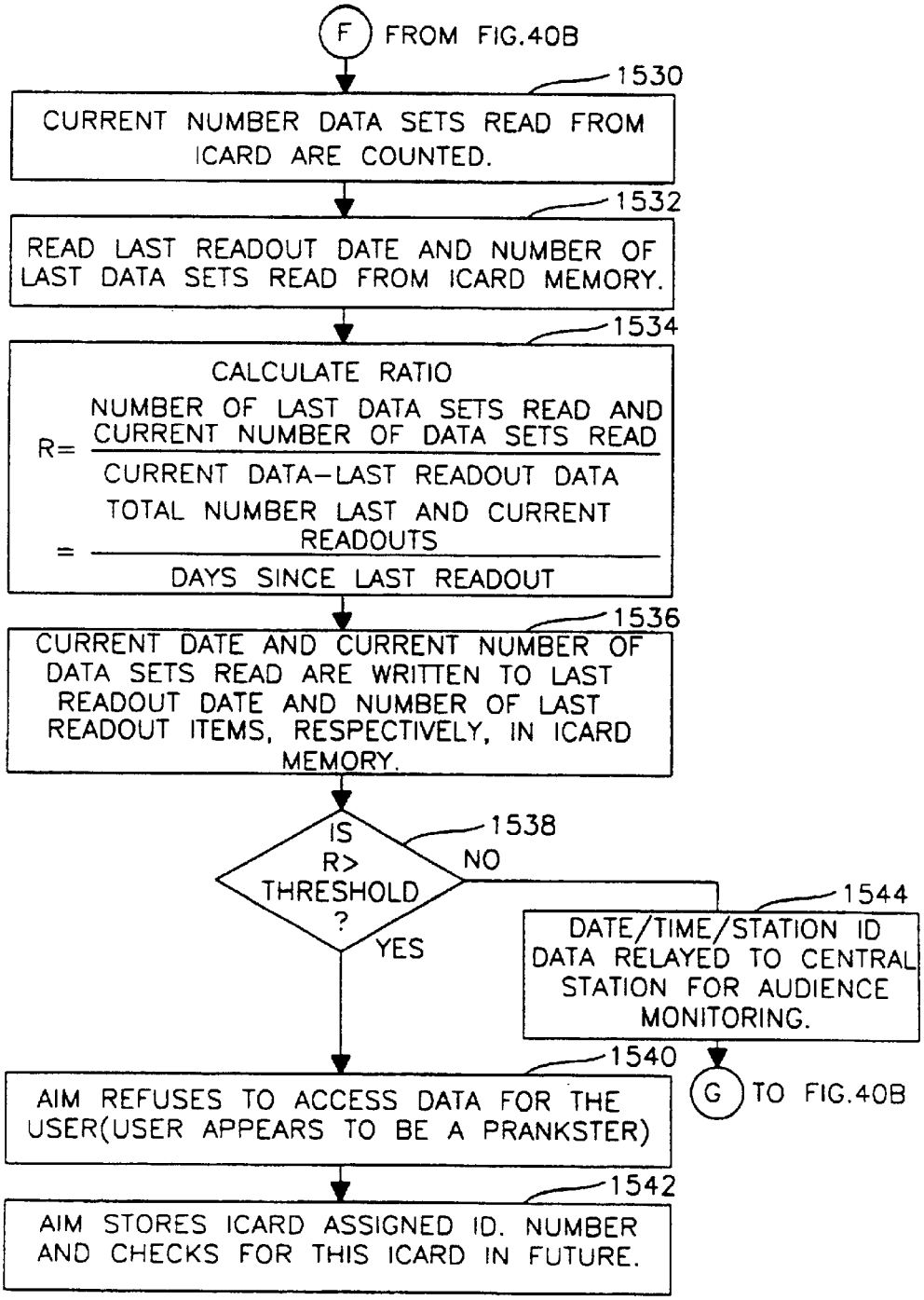
FIG. 40E is a flow diagram of a method for determining that the use of an information card is abnormally high according to the present invention.

FIG. 40E is a diagram of a method for preventing misuse of the information card. In step 1430 the current number of data sets read from the information card care counted. Then in step 1532 the last readout date and number of last data read entries in the information card memory are read from the information card memory by the AIM. Then in step 1532 a ratio is calculated of the last number of data sets read plus the current number of data sets read divided by the days since the last readout which is calculated by subtracting the last readout date form the current date. Then in step 1536 the current date and the current number of data sets read are written to the last readout date and number of last readout items, respectively, in the information card memory. In step 1538, if the ratio calculated in step 1534 is greater than a predetermined threshold, then in step 1540 the AIM refuses to access data for the user. The AIM in this case has determined that the user appears to be a prankster. In step 1542 the AIM will store the information card assigned ID number and check for this ID number if the future. If the ratio calculated in step 1534 is less than the threshold as indicated by the test in step 1538, then normal operation of the information card is resumed. In step 1544 the AIM transmits the date, time and station ID data read from the information card to a central station which uses this data for audience monitoring.

Figure 41:
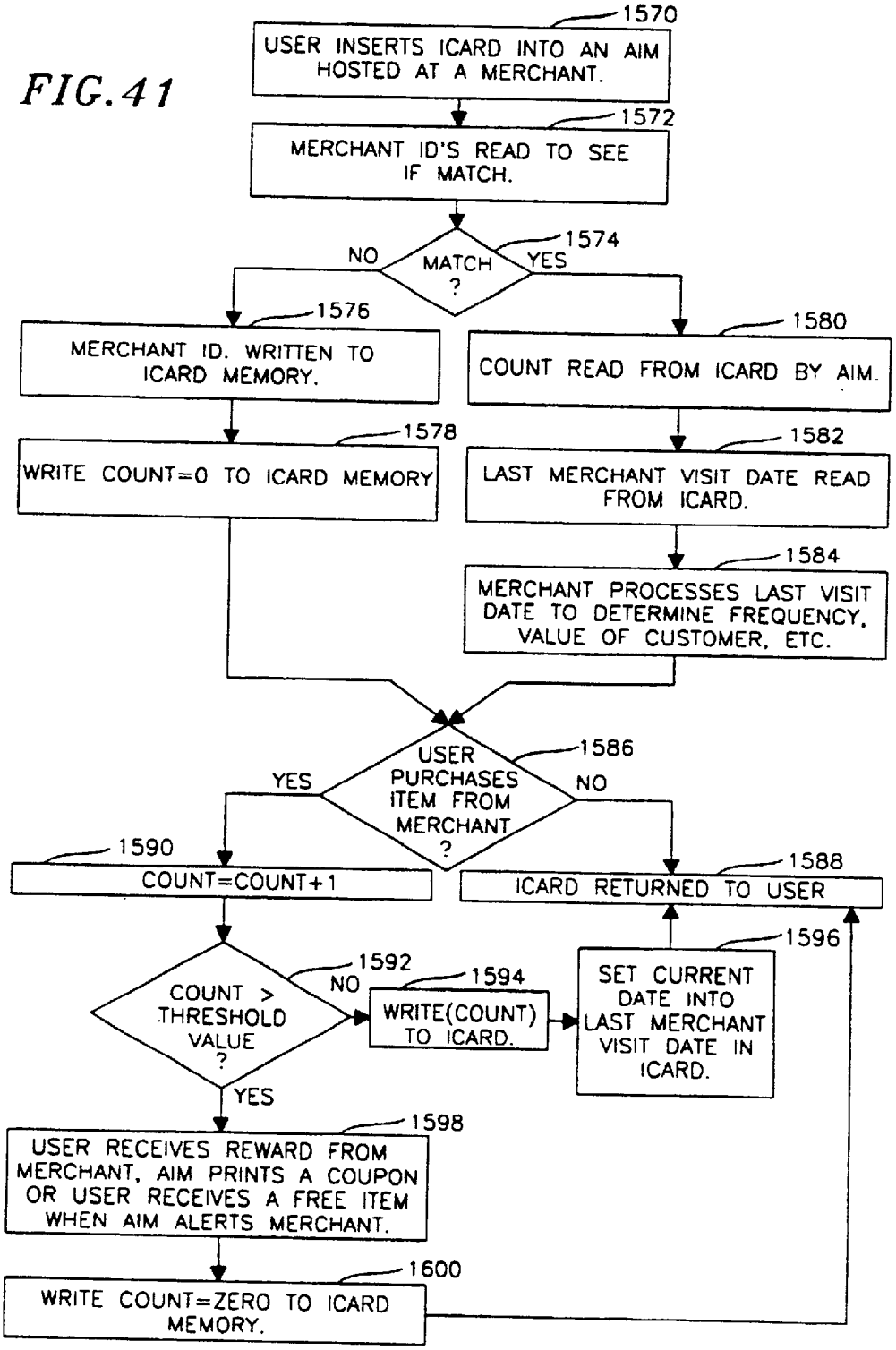
FIG. 41 is a flow diagram of a method for using the information card to record the number of transactions with a merchant according to the present invention.

FIG. 41 is a flow diagram of a method for using the information card at a merchant. In step 1570 the user inserts the information card into an AIM hosted at a merchant. The AIM hosted at the merchant can perform all of the operations discussed above. In addition, the AIM hosted at the merchant can read the merchant ID such as merchant ID 1084 shown in FIG. 15 to determine if a merchant ID stored in the memory matches the ID for the merchant hosting the AIM. If in step 1574 a match is found, then a count such as count 1086 shown in FIG. 15 is read from the information card by the AIM. Then the AIM reads the last merchant visit date such as last merchant visit date 1088 shown in FIG. 15 from the information card in step 1582. Then the merchant can process the last visit date to determine the frequency that the customer visits the merchant and therefore the value of the customer as shown in step 1584. If in step 1574 a match is not found, then the merchant ID is written into the information card memory by the AIM in step 1576. In step 1578 a count of zero is written to the information card memory. In step 1586 if the user purchases an item from the merchant or performs some other transaction with the merchant then in step 1590 the count is increased by 1 and compared to a threshold value.

If in step 1592 the count is greater than a predetermined threshold value, then in step 1598 the user receives a reward from the merchant and the AIM can print a coupon or the user can bet a free item when the AIM alerts the merchant. Then in step 1600 a count of zero is written to the information card memory. If in step 1586 the user does not purchase or conduct some other transaction with the merchant then in step 1588 the information card is returned to the user. Also if in step 1592 the count is not greater than some threshold value then the count calculated in step 1590 is written into the information card and then in step 1596 the current date is written into the last merchant visit date in the information card and then the information card is returned to the user in step 1588. This data can also be stored in the AIM for verification purposes.

Figure 42:
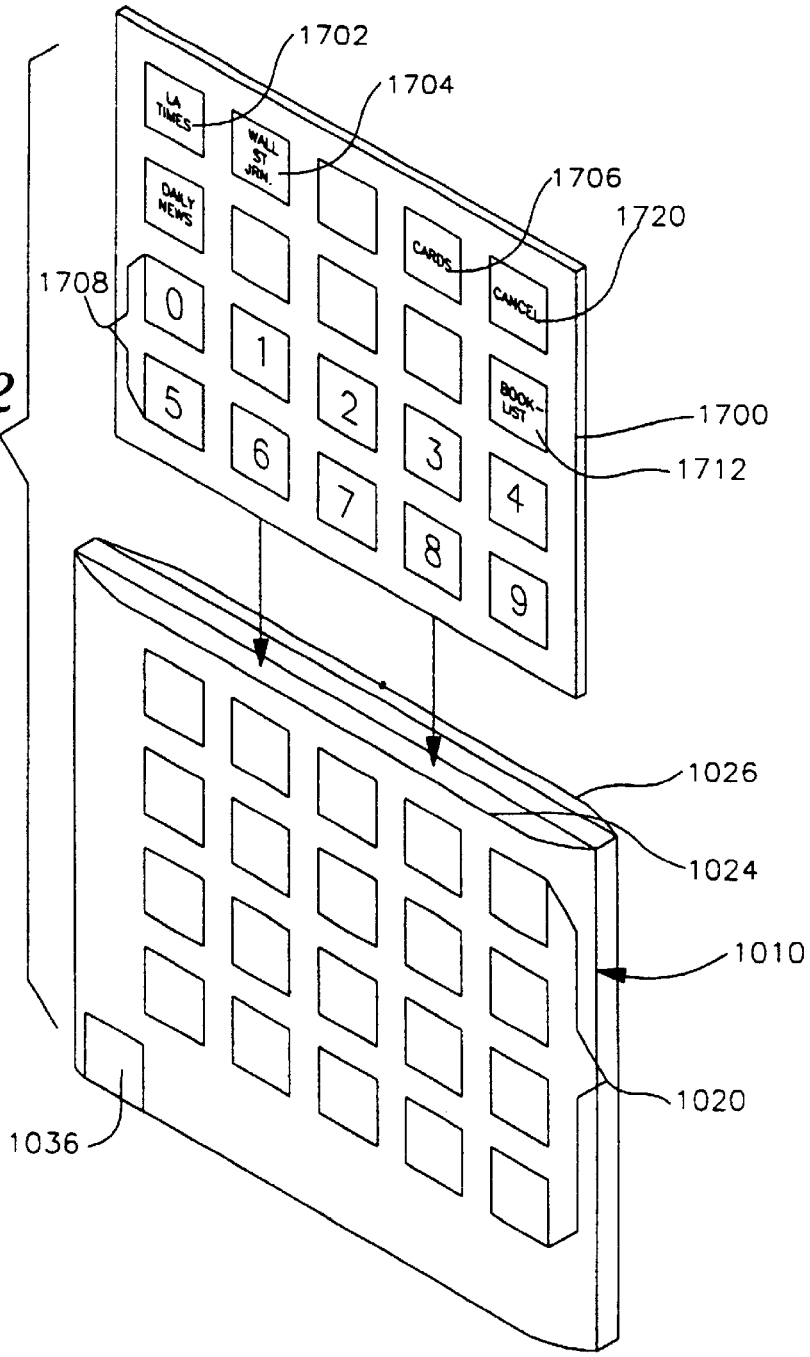
FIG. 42 shows an information card having an insert for publications, cards, book lists, and a numerical keyboard according to the present invention.
Figures 43, 44, 45:
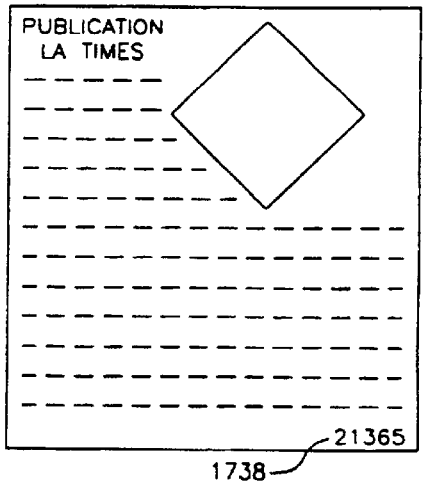
FIG. 43 shows a portion of memory in the information card containing a mapping of keys to publication, a card, cancel, book list and number functions according to the present invention.
FIG. 44 is an advertisement having an information number printed in the advertisement for obtaining auxiliary information associated with the advertisement according to the present invention.
FIG. 45 shows a portion of memory in the information card containing entries as a result of a user pressing keys on the information card according to the present invention.

FIG. 42 illustrates an information card that can be used to access information for items in publications, to store credit card and other card numbers and to store a book list. The information card 1010 is similar to the information card in FIGS. 13A and 13B. Insert 1700 is inserted into a plastic sheet overlay 1024 on the information card 1010. The sheet 1700 has publications names printed on locations that will overlay certain keys, such as LA Times 1702 and Wall Street Journal 1074. The information card also has keys labeled Cards 1706. Booklist 1712 and Cancel 720. The information card also has a numeric keypad 1708 which is formed by printing numbers on the insert which will overlay keys on the keyboard 1020 of the information card. When the AIM initializes the information card, a table such as that shown in FIG. 43 is loaded into the information card. The table indicates the publications that are assigned to which keys and the correspondence between the other entries printed on the insert and the underlying keys. For example, the number 9 is assigned to key F20. LA Times 1724 is assigned to key F1, which is shown as element 1722 in FIG. 43.

As shown in FIG. 44 a publication can have numbers printed in articles and ads in the publication which can be used to access additional information for the items to which the number relates in the publication. For example, an advertisement in the LA Times can have a number printed in the corner of the advertisement as shown in element 1738 of FIG. 44. To access information for the item referred to by the number printed in the publication, the user enters the number such as 21365 into the information card using the number pad 1708 on the information card and then presses the key corresponding to the LA Times. The information card controller then stores the publication name, date and the entered number into the information card memory. For example, the publication name 1726 (LA Times), the date 1728 (8/13/94) and the number 1732 (21365) would be entered. An alternate way to enter a number is to press the key corresponding to that publication N times such as shown by the series of entries for the Wall Street Journal indicated as element 1732 in FIG. 45. If the user makes a mistake when entering a number, then the user can cancel the entry by hitting the cancel key 1720.

Figure 46:
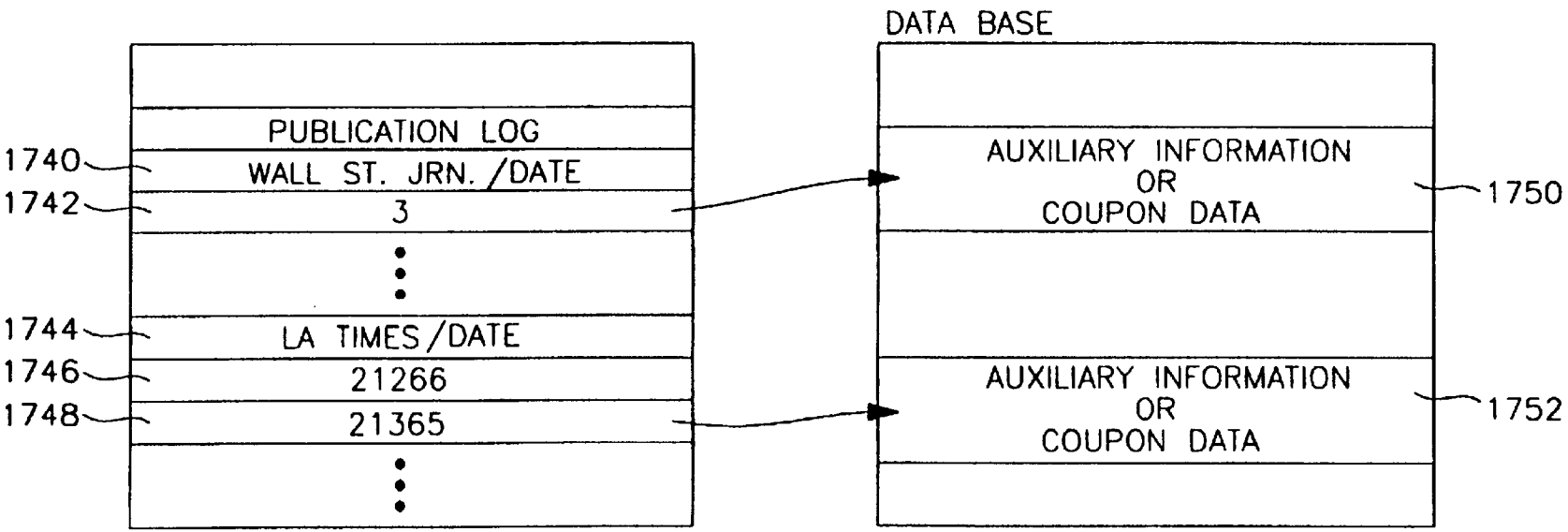
FIG. 46 shows a portion of memory in the auxiliary information memory according to the present invention.

A publisher such as the LA Times transmits a publication log such as that shown in FIG. 46 to the automated information machines. The publication log lists the publication name and the date as shown by element 1740 in FIG. 46 and list numbers such as element 1742 corresponding to entries in the publication having numbers that can be used to access auxiliary information. For example, the Wall Street Journal is shown with the number 3. The LA Times shown as element 1744 has two entries for a particular date, entry 1746 and 1748. Each number entry in the publication log can be used to refer to auxiliary information appended to the log by the publisher or a coupon associated with the item published in the publication, as shown in FIG. 46 as data bases 1750 and 1752.

Figure 47:
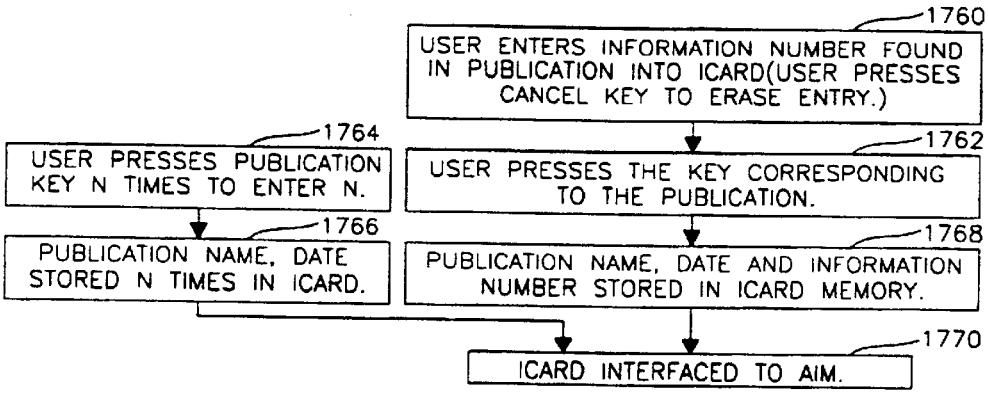
FIGS. 47 and 48 are flow diagrams of methods for using the information card to access auxiliary information related to a publication according to the present invention.

FIG. 47 is a flow diagram of a method for using an information card to access information related to a publication. In step 1760 a user enters an information number found in a publication into the information card. The user can press the cancel key to erase an incorrect entry. In step 1762 the user presses a key corresponding to the publication. Then in step 1768 the publication name, date and the entered information number are stored in the information card memory. Steps 1764 and 1766 are an alternate method for storing a number in which the publication key is pressed N times to store an information number into the information card. In step 1770 the user interfaces the information card to the AIM.

Figure 48:
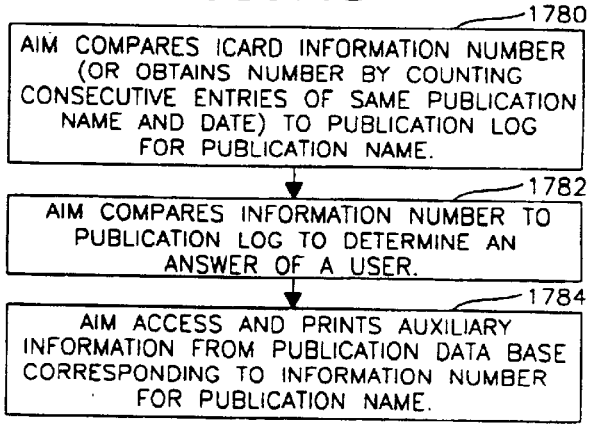

FIG. 48 is a flow diagram of a method for using information numbers read from the information card to access corresponding auxiliary information. In step 1780 the AIM compares the information card information number to the publication log for the publication associated with the read publication name. Alternately the information number can be obtained by counting the consecutive entries having the same publication name and date. It is possible to list in a publication two numbers, one corresponding to a YES answer and another number corresponding to a NO answer or can request a numerical answer as described previously. In step 1782 the AIM can compare the information numbers to the publication log to determine an answer of a user. The answer can be used to perform polling or for contests. In step 1784 the AIM access and prints auxiliary information from a publication database corresponding to the information number for the publication name. The auxiliary information could be a coupon, which the user can use to obtain a discount on the item which is advertised along with an information number.

It is also possible to use the information card to keep track of books that a user has read. Many people have trouble keeping track of books read in the past and end up buying the same book several times. The user can use the book list key 1712 and the number keys 1708 to enter an ISBN or UPC number for each of the books he owns. The user does this by entering the ISBN number and then pressing the book list key 1712 shown in FIG. 42. The ISBN numbers are stored as a list 1734, as shown in FIG. 45. When the user goes to a book store he can plug the information card into an AIM. When the cashier scans the ISBN number of the books being purchased, the numbers are compared to those already stored in the unit. If there is a match, the user does not buy the book. If there is no match, the scanned item is automatically stored in the information care by the AIM, which is connected to the scanner. Thus, the user does not have to manually enter an ISBN number for each new book purchased.

Figure 49:
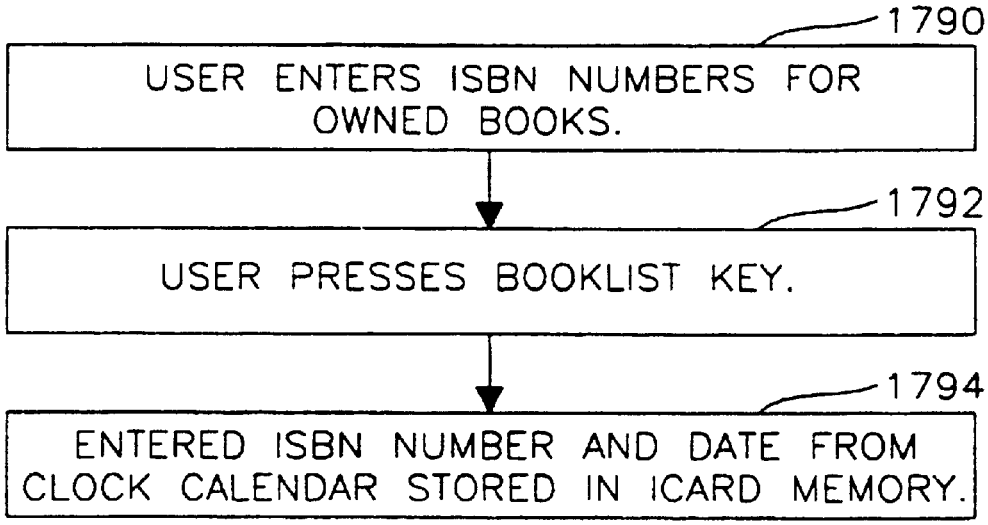
FIGS. 49 and 50 are flow diagrams of a method for using the information card for book lists according to the present invention.
Figure 50:
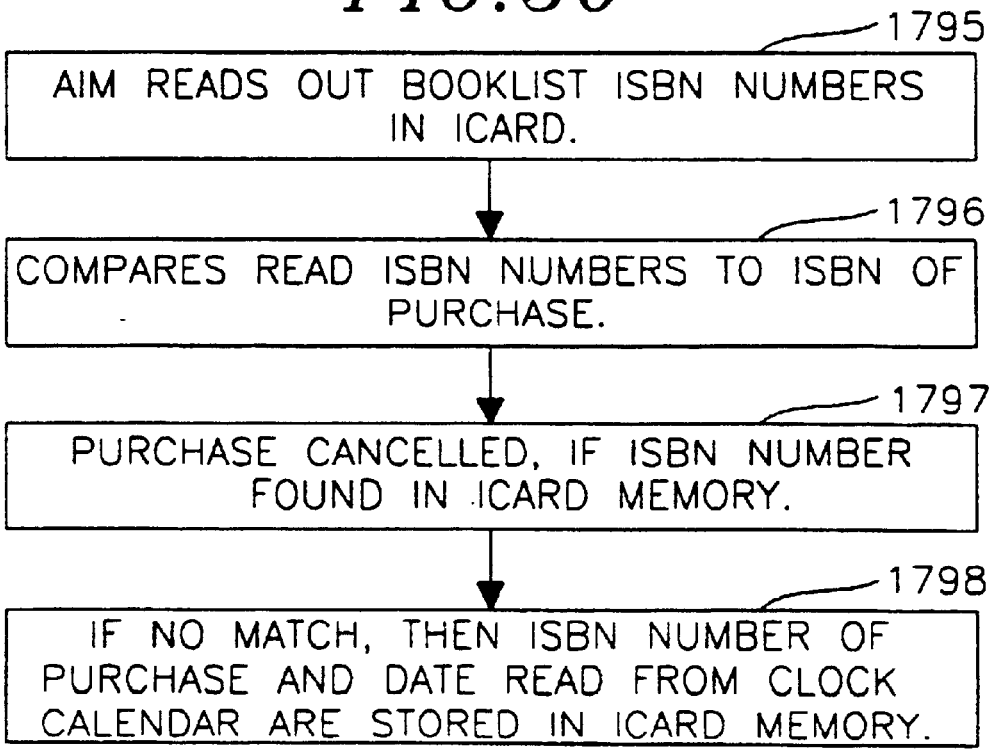

FIG. 49 is a flow diagram of a method for entering ISBN numbers. In step 1790 the user enters ISBN numbers for owned books. Then the user presses the book list key in step 1792. In step 1794 the entered ISBN number and date read from the clock/calendar are stored in the information card memory. FIG. 50 is a method for using the book list. In step 1795 the AIM reads out the book list ISBN numbers stored in the information card. In step 1796 the AIM compares the read ISBN numbers to the ISBN number of a purchase. Then in step 1797 the purchase is cancelled if the ISBN number of the purchase is found in the information card memory. In step 1798 if there is no match, then the ISBN number of the purchase and the date read from the card calendar are stored in the information card memory.

Another use for the information card is to automatically store all of the user's credit card numbers including frequent flyer, hotel discount, and rental car card number. These may be entered using the numeric keyboard and then pressing the card key 1706 on the information card 1700. The entered card numbers are stored in a list as shown in element 1735 in FIG. 45.

The card numbers can also be entered by putting the information card into an AIM and then swiping the credit cards or other card through a magnetic strip card reader such as magnetic strip card reader 1710 shown in FIG. 26A. Numbers stored into the information card can be retrieved in the future by putting the information card into an AIM.

Figure 51:
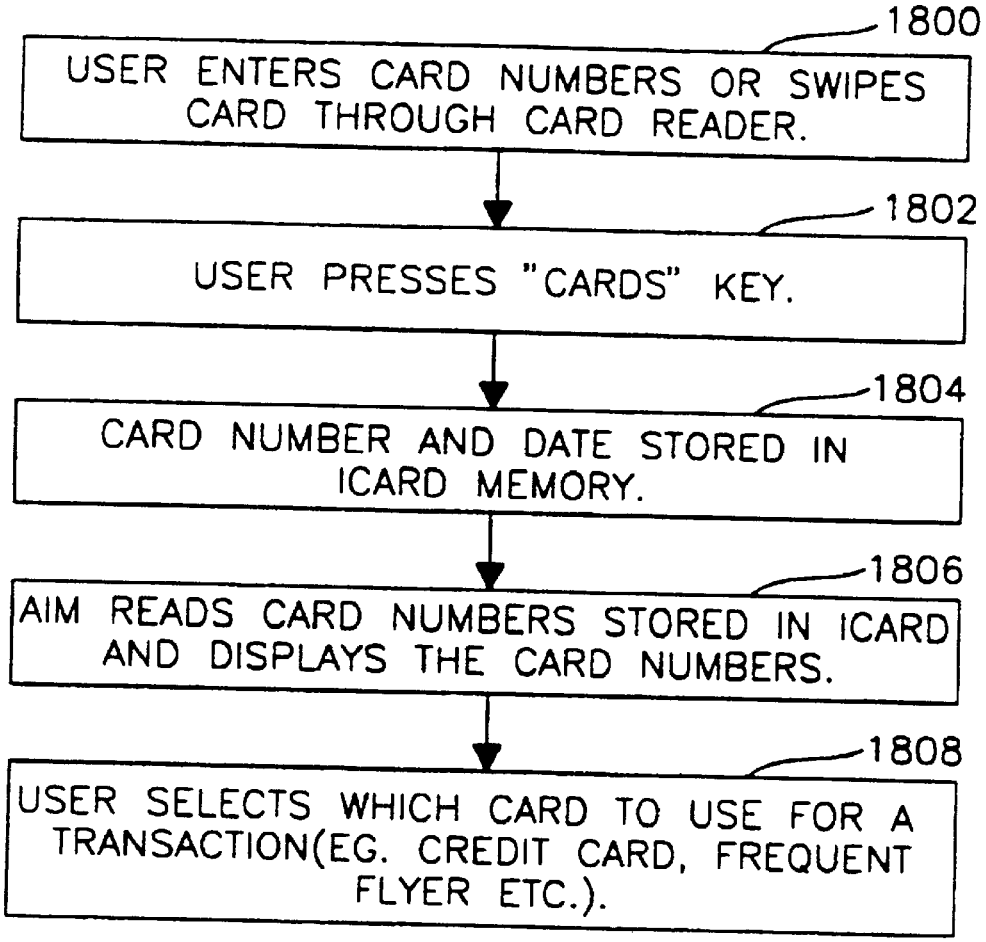
FIG. 51 is a flow diagram of a method for using the information card to store card numbers according to the present invention.

FIG. 51 is a flow diagram of a method for using an information card for storing card numbers. In step 1800 a user enters a card number using the keyboard or by swiping a card through a magnetic strip card reader. Then the user presses the cards key in step 1802. Then in step 1804 the card number and the date read from the clock/calendar are stored in information card memory. The user can later use an AIM to read the card numbers stored in the information card and display the card numbers as shown in step 1806. The user can select which card to use for a transaction such as which frequent flyer card to use as shown in step 1808.

The present embodiments contemplate a system that includes a broadcast station program log data distribution system where log data is collected at a server such as a regional data collection and storage facility, and then forwarded to docking stations at participating retailers.

In another embodiment, the existing bank ATM distribution system and/or the existing retail credit card Point-of Sale Terminal (POST) data distribution system are used instead of, for example, the server 1180 and AIMs 1160 of FIG. 17. The setup and use the information card with the ATM or POS is in many respects similar to that described for the AIMs and the concepts described for use with AIMs apply also to use with an ATM or POS.

Figure 52:
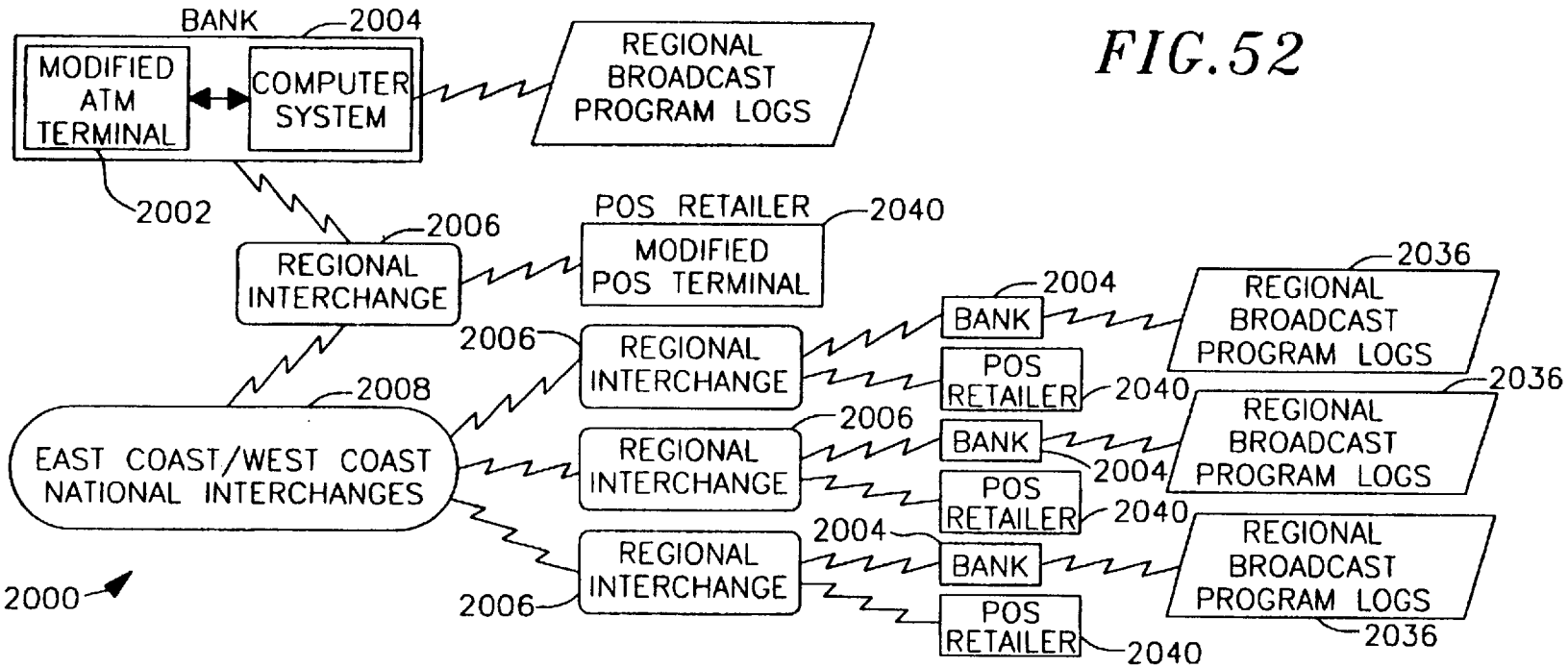
FIG. 52 is a diagram illustrating a system of ATM and point-of-sale (POS) terminals interconnected via interchanges. A modified ATM terminal and a modified POS terminal are included according to the present invention.

FIG. 52 is a block diagram of a typical automated teller machine (ATM) data distribution system 2000. ATMs 2002 at each bank 2004 are networked together over a land-line system to one or more interchanges which also communicate with the various member banks 2004, and which perform the necessary switching and routing of data to accomplish the tasks. The interchanges typically include an East coast and a West coast interchange 2008, and a large number of regional interchanges 2006.

Figure 53:
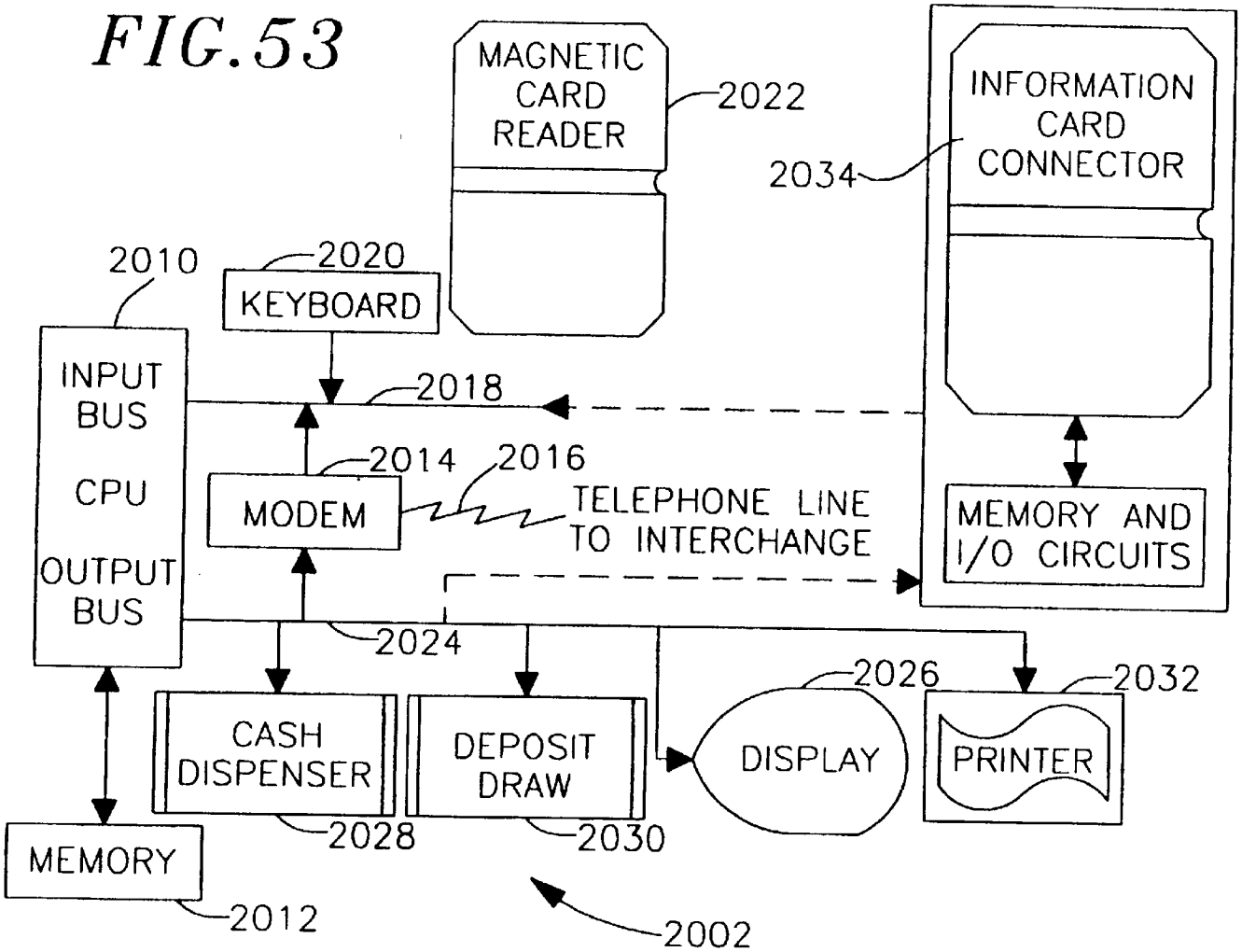
FIG. 53 is a block diagram of a modified ATM terminal according to the present invention.

FIG. 53 is a block diagram of a typical ATM bank terminal 2002. A CPU 2010 is connected to local memory 2012 (typically disk, tape and RAM), and, via a modem 2014, to the data interchange via telephone line 2016, which communicates with the participating banks. The CPU input bus 2018 connects a keyboard 2020 and an ATM card reader 2022. The CPU output bus 2024 connects to a display 2026, a cash dispenser 2028, a deposit draw 2030, and a printer 2032.

The capability for operation with an information card 1010, as shown in FIGS. 13A and 13B, for example, is added by providing a connector 2034 designed to hold the information card 1010 and to connect to the information card contacts 1036 and 1038. The connector is connected, via suitable I/O circuits, to both the input bus 2018 and output bus 2024 of the CPU 2010. The program log data 2036 from participating stations in the geographical area served by the interchange is provided on a real time basis to a bank in each regional interchange from stations is that regional interchange, and stored in the bank ATM memory 2012. In addition to the log data, text corresponding to each broadcast program selection (e.g., coupons, contest answers, song titles, etc.) is stored.

To setup the information card, the user inserts an ATM card and an information card in their respective sockets. The ATM requests the user's personal identification number (PIN) number and also detects the presence of the information card 1010 in the connector 2034. The ATM then asks (on the display 2026) whether the user wants to setup the information card, or print out stored information. The user follows instructions and presses the designated key on the keyboard 2020 for the setup mode. At this point, the ATM, which has read the ATM card ID from the magnetic strip by using magnetic card reader 2022, transfers the ID (which is typically the ATM card number) to the memory 1042 in the information card, thereby setting the information card ID.

The display 2026 then displays various menus to allow the user to choose his favorite AM, FM and TV stations from a list of local stations stored in the ATM memory or in the interchange memory accessed via the regional interchanges, in a manner identical to that described for the AIM embodiment. The user presses the designated keyboard 2020 keys to make his choices, which are then transferred to the information card memory to identify the information card keys. Note that each station in the country is assigned a unique station number (corresponding to its call letters). The ATM also prints out cover sheets which the user inserts under the clear overlays on each side of the information card to label the keys. The ATM also sets the clock in the information card to be correct time. The ATM clock (in the CPU) is itself maintained accurate from time data distributed throughout the data system. The setup selections chosen by the user are stored in the ATM memory and then downloaded to the interchange along with the consumer's ATM card number as consumer monitoring data to be used for targeted direct mailings. Other setup steps can be performed in a manner similar to that described above for the information card setup via an AIM, including FIGS. 15 and 34.

When the user wants to print out information corresponding to station, day and time (SDT) data stored in the information card, he inserts the information card in the connector 2034 in the ATM. The ATM detects the presence of the information card, reads the stored ID, and other information that is stored during the setup, such as the Cable ID NO. 1096, and requests the user's PIN (this is optional and verifies that the user is the owner of the information cared). The clock time and last clock update date and time 1074, as shown in FIG. 15, are read from the information card and errors are compensated using "time interpolation"

algorithms described below. Corrected SDT data is then read from the information card memory and sent to the interchange. The station portion of the SDT is also corrected as explained above according to the cable ID no., which identifies the cable company and allows proper channel mapping. The interchange finds the station log 2036 from the back in the user's regional interchange 2006 which stores the log data.

The retrieved text data is then printed out on the ATM printer 2032. The ATM then erases the SDT data from the information card memory and resets the information card clock 1040 to the correct time. The transaction is now complete. The SDT data is stored in the ATM memory 2012 during the transaction. At the end of the transaction, this data is sent to the interchange where it is routed to a designated site along with the information card ID for collection of consumer monitoring data. This data is also used for billing the advertiser whose commercial was being broadcast during the SDT interval.

Figure 54:
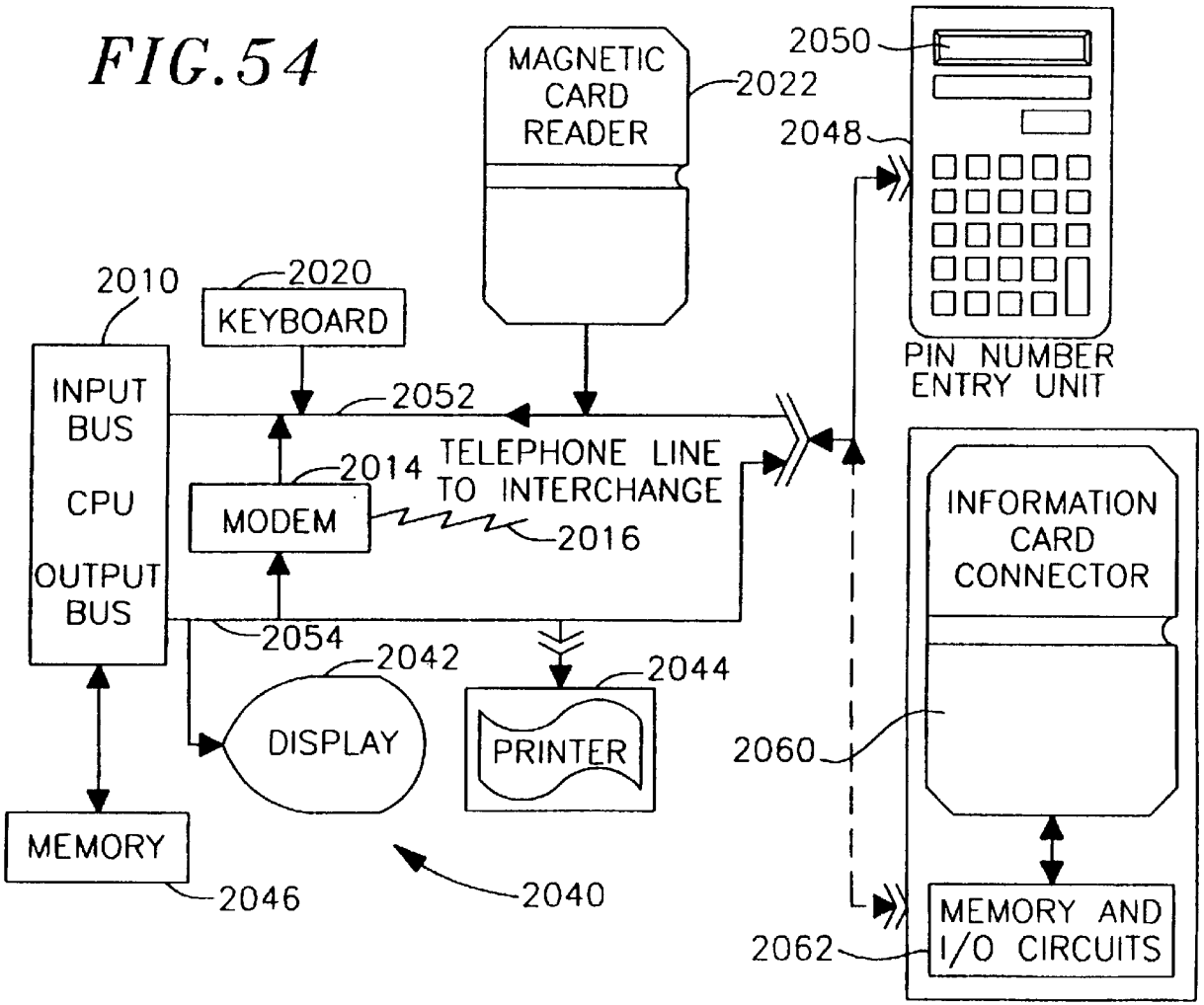
FIG. 54 is a block diagram of a modified POS terminal according to the present invention.

A POS terminal 2040 is located at most retailers and is used to complete a credit card transaction and print out a confirming receipt. A POS Terminal data system is similar in structure to the ATM system, except that the ATM 2002 is replaced with a POS Terminal 2040. Referring to FIG. 54, the POS Terminal 2040 is similar to the ATM 2002, except that the display 2026 is replaced with a one line display 2042 (LCD, LED, etc.), the memory 2046 is RAM, and the cash dispenser and deposit draw are not present. The terminal includes connectors for connection to a printer 2044 and for connection to a PIN number entry unit 2048. The PIN number entry unit is used if the retailer accepts ATM cards as well as credit cards. The PIN unit is used by the customer to enter his PIN in a discrete manner, and also includes a display 2050 to provide prompting messages. Note that the connector for the PIN unit 2048 provides access to the POS terminal input 2052 and output busses 2054.

The capability for operation with the information card 1010 is added to the system by providing a connector unit 2060, as in the previous embodiment, which is designed to hold the information card 1010 and to connect to the information card contacts 1036 and 1038. Using a cable, the connector is connected, via suitable circuits, to both the input bus 2052 and output bus 2054 of the POS Terminal CPU. Thus, the information card connector 2060 can be easily connected to an existing POS Terminal without any modifications. A typical POS terminal is a VeriFone brand terminal, sold by VeriFone Corporation, Redwood City, Calif. The information card connector 2060 includes suitable I/O circuits as well as memory 2062 to store the retrieve log data for printing. The program log data from participating stations is stored in a manner identical to that described above.

The user is provided with an information card with the keys unlabeled. The clock 1040 may already have been set to the correct time. The user is also provided with a paper sheet, designed to be slipped under the information card clear cover (see FIG. 55) showing the position of the keys on the information card, and is also provided with a "station selection worksheet" (see FIG. 56) which lists all of the participating broadcasters in the user's regional interchange along with an identifying number and station frequency for each station.

Figures 55, 56:
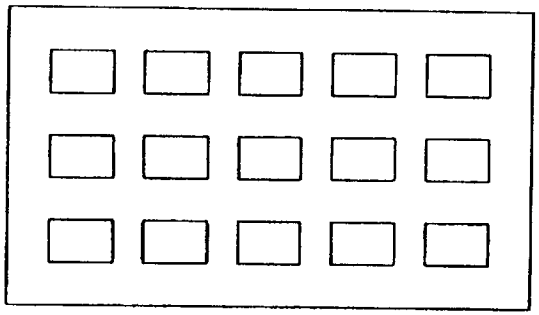
FIG. 55 is an unlabeled information card according to the present invention.
FIG. 56 is a station set-up worksheet according to the present invention.

The user checks off the stations of interest, writes the call letters and station frequency of each chosen station into one of the key boxes on the overlay sheet of FIG. 55, and inserts the overlay into the information card, thus labeling the keys.

Figure 57:
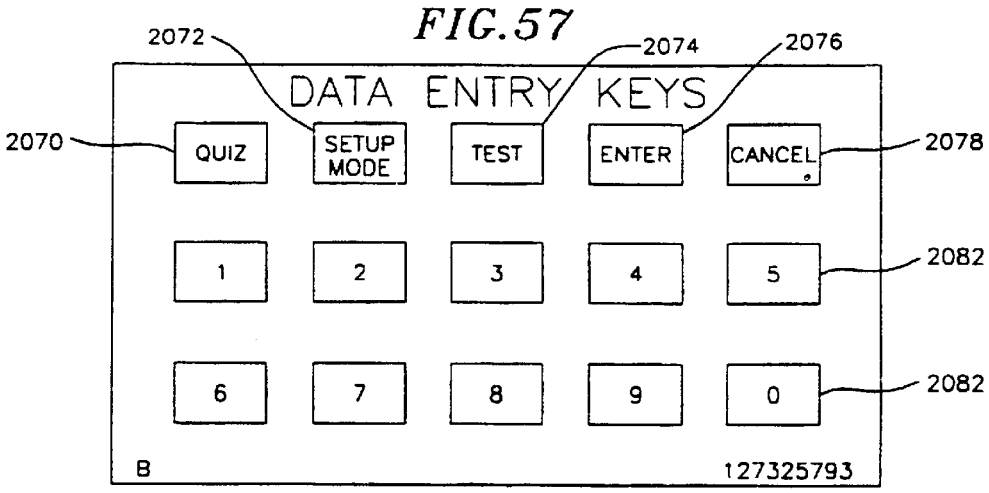
FIG. 57 is a rear view of an information card according to the present invention.
Figure 58:
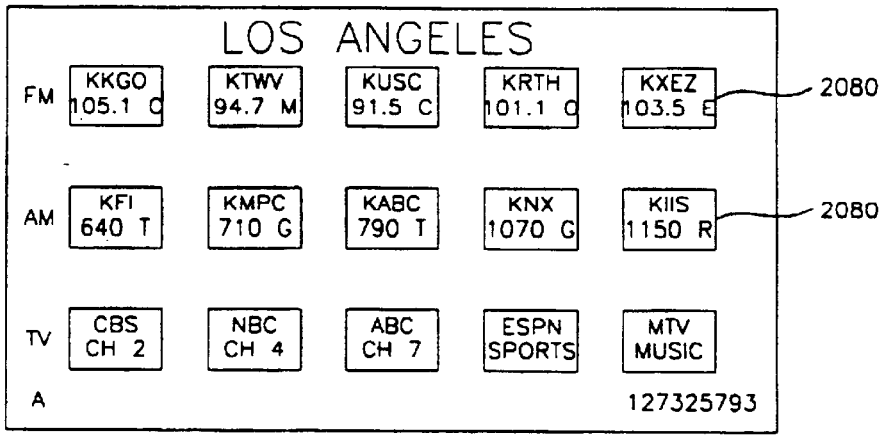
FIG. 58 is a front view of an information card according to the present invention.

The user now programs the memory 1042 in the information card to store the station information, as follows. On the rear surface of the information card (see FIG. 57) is a 10 key numeric keyboard and key labeled QUIZ 2070, SETUP MODE 2072, TEST 2074, ENTER 2076 and CANCEL 2078. The user presses the SETUP MODE 2072 key, and then one of the station keys 2080 on the front side of the information card. A beep from the internal beeper 1034 cues the user to enter from the worksheet the number corresponding to the station for that key. The number is entered using the numeric keys 2082, CANCEL 2078 is used to make corrections, and ENTER 2076 is used to store the station number. This process is repeated until all of the station keys have been identified. The user can verify his entries by hitting the TEST key 2074 followed by a station key 2080. The beeper will then emit tones corresponding to the stored station number for that key.

Before the consumer can use the information card, he must link it to one of his credit cards as an ID. This is accomplished by taking the information card to a participating retailer, and giving the clerk a credit card and the information card. The clerk swipes the credit card in the POS reader 2022, and inserts the information card 1010 in the connector 2060. The user presses suitable keys on the keyboard 2020 to indicate information card setup, and the credit card number is transferred to information card memory 1042 for ID, the information card clock 1040 is set to the correct time, the station numbers set by the user are copied into the memory 2046, and the list of the user chosen stations are printed by printer 2044 for verification. The consumer can also enter the Cable ID No. The consumer setup selections, which were stored in memory 2046 are then downloaded to the interchange via telephone line 2016 along with the consumer's credit card number and can be used for a number of purposes, including targeted direct mailings.

When the user wants to print out information corresponding to station, data, time (SDT) data stored in the information card, the user gives the information card to a retail clerk, along with the credit card used during setup. This credit card step is optional, and is done to ensure the validity of the information card holder, and hence the consumer monitoring data. The clerk inserts the information card in connector 2060 in the POS terminal 2040, and optionally swipes the credit card in the card reader 2022. The POS terminal 2040 detects the presence of the information card, reads the stored ID, and compares it to the credit card number read from the magnetic strip information on the credit card. The clock time and last clock update data and time 1074, as shown in FIG. 15, are read from the information card, and errors are compensated using the "time interpolation" algorithms described below. Corrected SDT data is then read from the information card memory and sent to the interchange. The interchange finds the station log 2036 from the bank in the user's regional interchange, which stores the log data.

The retrieved test data is then printed out on the POS Terminal printer 2044. The POS Terminal 2040 then erases or cancels from the information card memory 2046 the SDT data, and resets the information card clock 1040 to the correct time. The transaction is now complete. The SDT data is stored in the information card connector memory 2062 during the transaction. At the end of the transaction, this data is sent to the interchange along with the information card ID, where it is routed to a designated site for collection of consumer monitoring data. This data is also used for billing the advertiser whose commercial was being broadcast during the SDT interval.

There are several important features of the information card. The method of connection to a POS terminal eliminates the need to modify the terminal in any way. During information card setup, the user's ATM card or credit card is also read, and data is transferred from that card to the memory of the information card for a customer ID, which eliminates the need to manually enter any ID. During information readout, the user is requested to enter a PIN to verify ownership of the information card. This prevents children from using their parent's information cards and adds accuracy to Neilsen type customer monitoring data.

In existing ATM and card systems, the magnetic strip is only used in a "read only" mode. In the case of the information card, data (correct time, setup information, delete signals, etc.) are read from and written to the information card. In the case of a contest, if a consumer has won as indicated by the data stored in the information card, by reading the consumer's ATM or credit card in the same transaction, a direct payment can be made into the consumer's bank account (via ATM card) or a credit posted to his/her credit card account.

The log data stored in the interchanges can be updated in real time by the broadcasters. Further, a national (or worldwide) contest can be held (such as during a Super Bowl) and answers compared to other players on a semi-real time basis (small delays caused by signal handling & processing). Hence the "tenth" user on a national level to get the right answer can be awarded a prize.

In the POS terminal embodiments described above, the user obtains the information corresponding to the SDT data stored in the information card by plugging the information card into a POS terminal, where the information is printed out.

In another embodiment, the information card is still plugged into a POS terminal 2040, but no information is printed. Instead, the information is linked to the user's charge card number, and is printed out as part of the user's charge card statement every month.

In some of the embodiments of the information card, the information card includes a clock calendar 1040 as well as memory 1042 and keyboards 1020 and 1030. In the present embodiment, which is linked to the charge card, the clock calendar, battery, and keyboards are eliminated, leaving only nonvolatile memory (preferably flash RAM). This configuration is identical to the smart cards presently being designed and tested by card companies.

During setup of the information card, the user identifies the information card using his charge card number, which is stored in RAM in the information card. The information card is then used in the usual manner. When the user plugs the information card into a POS terminal to obtain the information, the system detects that the information card is identified by a charge card number. Instead of printing out the information on the POS printer 2044, the system instead links the information with the charge card number and transfers the information along with the charge card number to the bank corresponding to the charge card number, where the linked information is stored in a portion of the bank's memory dedicated to storage of such linked information for all of the bank's charge card customers who are also information card users.

When the user's charge card monthly statement is being prepared by the bank, the linked information is scanned. If a coupon was retrieved, the bank software looks to see if a corresponding purchase was made for the coupon item using the charge card. If so, the coupon value is automatically credited to the user's account. In like manner, if the user won a contest, the winning amount is also automatically posted to his account. All other information is printed as part of the statement. FIG. 59 shows a sample statement. A feature of this embodiment is that the information need not be printed at a retailer POS terminal 2040. When the information card is used with the ATM 2002, then the information can also be printed on the statement. Of course, the user does not receive the information until his statement arrives.

As described above, the system uses Station, Date, Time (SDT) to locate information about broadcast selections. This approach requires an accurate measure of the current time, since many of the selections are very short. A feature of the system is that the clock 1040 in the information card is reset to the correct time very time the information card is inserted in a AIM, ATM, or POS terminal or any other terminal that has a clock or access to time, for example, via telephone. However, to keep the cost of the information card low, it is desirable to employ a cheap time standard such as a ceramic resonator instead of a crystal. If the user does not use a docking station such as an AIM, ATM or POS terminal relatively frequently, this type of clock circuit could conceivably accumulate enough error between dockings so that the stored time/date in the SDT is not able to be correlated with the correct broadcast selection.

Referring to the flow chart of FIG. 60, when the user plugs the information card into the dockings station in step 2310 for the first time as detected in step 2320 by the lack of data in memory in the information card, the information card clock is set in step 2325 to the correct time, and the current data and time (DTI) is stored in the information card memory 1042.

Upon subsequent dockings to retrieve information from stored SDTs, the docking station in step 2330 reads from information card memory the stored date and time (DTI) of the last docking, which is also the date and time that the card clock was last reset to the correct time. The station also reads in step 2340 the current time (Tc) from the card clock. Presumably, Tc is in error compared to the correct time as reflected by the station clock.

The station calculates in step 2350 the difference T1, (in seconds) between Tc and the station clock, and also calculates in step 2360 the time difference T2, (in hours) between DT1 and the correct current time as reflected by the station clock T2 represents the time interval since the last docking.

The station then computes in step 2370 the information card clock error rate (e) as T1/T2. For example, if the information card clock h as drifted 10 seconds since the last docking, which was, for example, 240 hours ago, then the information card clock error rate (e) is 10/240, or 1 second every 24 hours.

The station then proceeds to read in step 2380 the stored SDTs from the information card memory. For each SDT, the station computes in step 2390 the number of hours (H) between the SDT and DT1. In essence, H represents the number of hours that elapsed from the last docking until that particular SDT was stored. For every hour, it is assumed that the clock in the information card is in error by (e times H) seconds.

The value of "T" in that SDT is then corrected in step 2394 by adding to it the correction factor (e times H), which may be a positive or negative number depending on whether the information card clock is running slow or fast. The corrected value of "T" is then used with S and D to locate the desired broadcast program selection from the stored log data in the station computer. This correction procedure is repeated for each of the stored SDT data.

When all of the SDT data has been provided as determined in step 2396, then the clock in the information card is again reset in step 2325 to the correct time read from the docking station clock, and the current data and time are stored in the information card memory. For the ATM 2002 and POS 2040 the docking station time can be obtained via telephone line 2016, which provides a convenient way to keep the docking station time very accurate. The ATM 2002 and POS 2040 can also contain a clock (not shown).

The above-method provides a way of compensating for clock drift which takes place between dockings. It is based on the assumption that clock drift (e) is a constant. More exotic second-order correction schemes can also be implemented. For example, the value of (e) could also be stored in the information card memory, so that it can be compared to subsequent calculations of (e) in subsequent dockings. Thus, multiple values of (e) can then be used to calculate a nonlinear correction factor.

In some embodiments, for example, as shown, for example, in FIG. 8, a slot and an information key 609 are provided in a remote controller. TV, radio, VCR, etc. to accommodate the information card. The advantage is that these products already contain the information as to which station the user is tuned to. Thus, the user need only press the information key at the desired time. The tuned station data stored in the product is transferred to the information card or plug in nonvolatile memory through the slot connector. There is no need to press a station key on the information card.

In another embodiment, the product (remote control, TV, etc.) is not only equipped with a slot and an information button, but is also equipped with a clock/calendar chip. The information card for use in this embodiment does not have a keyboard, battery, or clock/calendar, but only contains a RAM memory chip. This type of card configuration is identical to that of a "smart card."

The smart card is currently under development and test by the banking industry. Typically a flash memory chip is embedded in the card, and contact is made through plated metal terminals or possibly through a magnetic strip. The banking industry idea is to store in memory the current balance in the card account, and a large amount of cardholder identification information (address, ss number, etc.).

In the present embodiment, when the user inserts the smart card into the card slot on the product (radio, television, remote controller) and presses the information key/button on the product, the SDT information is transferred from the product (station is known from the tuning commands, and date/time is known from the clock/calendar chip in the product) into the memory in the smart card. The user removes the smart card from the slot and takes it to an ATM or POS terminal equipped to read data from smart cards. The rest of the system behaves in the normal manner.

Figure 61:
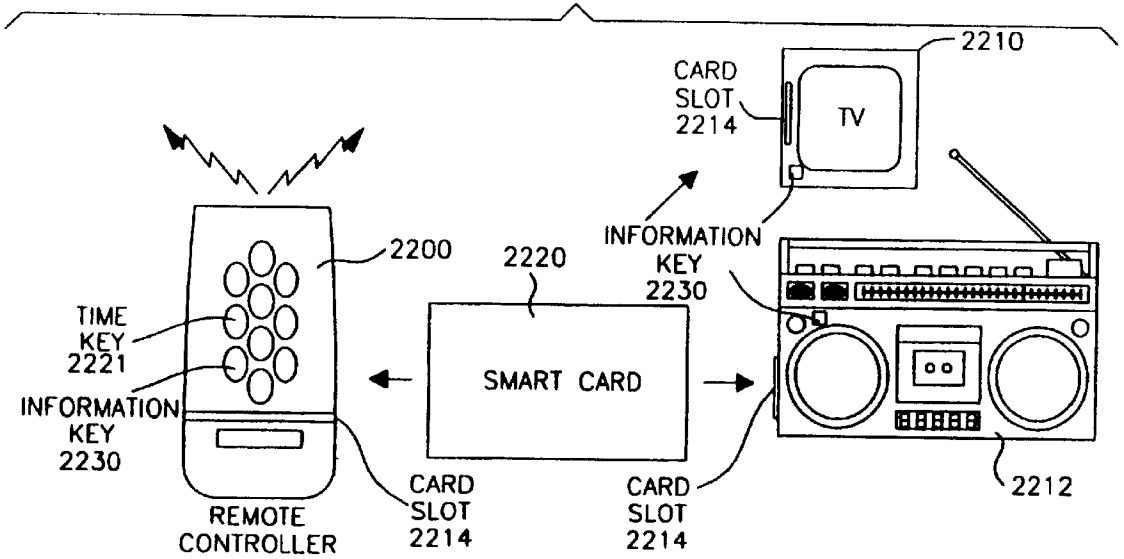
FIG. 61 is a diagram illustrating the use of a smart card with a remote controller, television, or radio according to the present invention.
Figure 62:
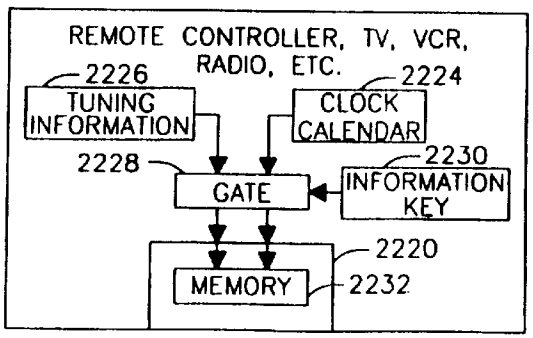
FIG. 62 is a block diagram of a remote controller, television, VCR, or radio or other similar apparatus for use with a smart card in accordance with the present invention.

FIG. 61 shows a remote controller 2200, a TV 2210, and a radio 2212, each having a card slot 2214 for accepting a smart card 2220, and an information button 2230. FIG. 62 is a block diagram of a remote controller, TV, VCR, radio, etc., each having a clock calendar 2224, timing information 2226 (such as from a tuner), and a gate 2228 which is activated by information key 2230. When the information key 2230 is pushed, the date/time and tuning information are loaded into memory 2232 on smart card 2220.

A problem to be addressed is how to keep the clock in the product accurate. Because there is no clock in the smart card, the time data retrieved from the POS system cannot be used as a clock reset.

The solution for a TV is to encode the correct time in the vertical blanking interval (VBI). For radios for the correct time can be encoded in the FM SCA subcarrier. Suitable decoders in the TVs and radios decode this data and use it to reset the internal clock. Currently time data is being broadcast in the VBI of all of the public broadcasting stations (PBS).

For the case where the product is a remote controller that contains a clock calendar, the clock in the remote controller keeps track of the data at which it was last reset. At a predetermined interval, for example, of one month, the remote controller beeps (or flashes) the user to indicate that the clock needs to be reset. The user is instructed that participating broadcasters will be periodically broadcasting an on-the-hour time tone. This is presently done on Japanese radio every hour. When the user hears such tone, he is instructed to immediately press a time key 2221, as shown in FIG. 61, on the remote controller. When this button is pressed, the clock in the remote is reset to the nearest extract hour. It is envisioned that this will be sufficiently accurate to accomplish the information card functions.

As described above, the information card is used to store SDT as a means of identifying broadcast information, as well as storing a user response to that information. The response can be in the form of a YES or NO, or can be a numeric response. The numeric keys 2082 are used to enter a wide variety of numeric responses such as lottery numbers and answers to quiz questions. The user simply presses the desired numeric keys 2082, after pressing the appropriate station ID key. The combination of SDT and a numeric response (#) to form SDT# leads to very powerful applications.

It is anticipated that broadcast information which can be responded to using the information card may be transmitted at very close intervals. Thus, a typical series of ads may be spaced apart at thirty second intervals. If one of the ads includes a numerical response, such as a quiz or contest answer, the user may want a little time to think of the answer. If the user's answer # is entered after the contest ad is completed and the next ad is being broadcast, it is important that the answer be paired with the correct SDT of the contest ad. For example, say the contest ad was aired from 10:00:00 am to 10:00:30 am, followed by a second ad aired from 10:00:30 to 10:01:00. The user pushes the station key at 10:00:20 to respond to the contest, and then enters his/her guess at 10:00:40, which is during the airing of the second ad. The system resolves this conflict in several ways.

First, stored in the information card is a number representing a timeout interval, which is typically set at 30 seconds (the value of this interval may be changed by the system when data (such as the correct time) is uploaded to the information card. After a user presses a station ID key (representing SDT), a timer is started which stops 30 seconds later. This timer establishes a window during which any numerical key entries (#) are stored with the prior stored SDT. When the timeout point is reached, the window is closed and further numerical entries are ignored until another station key is pressed. Thus, in the above example, the user has until 10:00:50 to enter the contest answer, which will be stored along with the SDT entered at 10:00:20. Suitable tones from the beeper in the information card can be used to alert the user that the window is closing or has closed. The timer window is also closed if a station key is pressed during the timer window.

By processing user responses to broadcast information using intelligent information agent algorithms, it is possible to build a profile of the wants, needs and habits of users of the information card. This profile can then be used to provide back to the user additional information which should prove useful, based on the user's history of broadcast information selections and responses thereto. Intelligent information agents are widely used to assist users of large information databases, such as are found in libraries and on the Internet, to find particular, information of interest. The agents are generally based on algorithms derived from research in the field of artificial intelligence. Basically, the agents "learn" the desires of the user based on the user's history of requests for information. The historical information is used to adjust the algorithms to more accurately determine types of information which would be of interest to the user. The Media Lab at MIT has published extensive research in this area.

The following example illustrates how the information card can be used in conjunction with an agent to provide the user with information of interest. Assume the user is driving to work in the morning, listening to the car radio on one her favorite music stations, KTWV 94.7FM. Upon hearing a music selection she likes, she press the KTWV/94.7 station ID key on her information card. Upon hearing a song she does not like, she again presses the station ID key, followed by the number 0 from the numeric keys. When the information stored in the card is compared to the KTWV station log, both the station log information, the SDT, and the user responses are routed to agent software, which processes the data. The agent has been preprogrammed with a basic instruction that if the user does not store any # with the SDT, the user is responding positively to the broadcast information, and is requesting more information about the information. The agent has also been preprogrammed with the basic instruction that if a zero is stored with the SDT, the user is responding negatively to the broadcast information. This is valuable data for the agent to learn about the user's likes and dislikes in music. From these simple keystrokes, the agent also learned that the user listens to the radio in the morning during a weekday at about 7am, and likes new wave music (the KTWV format). In particular, the user likes a particular Kenny G selection, and does not like a particular Dave Grusin selection.

As the information card continues to be used, the agent becomes smarter. Soon, it will know that the user drives to work between 7–8am, and return from work between 6–7pm, she does not listen to the radio at home, but watches a lot of TV. How will it know when the user drives? Perhaps one of the radio announcers will ask her: if you're in a car, press 1; at home, press 2; at work, press 3; in the subway (with a Walkman), press 4, etc. Another way for the agent to learn that she drives to work is because she regularly corresponds with the agent from a gas station POST.

Let us assume that the agent software not only receives the broadcast log, SDT, and # response, but also communicates with information providers who are typically providers of goods and services and are the companies who, through radio and television commercials, broadcast to the user information about these products and services. Using the information it has deduced about the user, the agent scours the masses of data from the information providers to find items that fit the user profile. Using the above example, the agent might find a coupon for half off on a breakfast at a popular restaurant if the user eats it before 8pm, provides the user with the name of the Kenny G selection, the name of the album, and a $3 discount coupon for the album at Tower records. It also lists for the user all of the other Kenny G albums, where the best prices are, the Kenny G tour schedule, deals on his concert tickets, and when his TV special will be on, if it is on after 7 pm, when the user is home.

The agent further finds a coupon for a discount car wash if it is used on weekdays between 6–7 pm, informs station KTWV that the user is a regular listener, and conveys to the station her music likes and dislikes. The user's agent further informs her that because she is a loyal listener, KTWV has entered her into its on the air contest, where she can participate before 7am next Wednesday, using her information card to guess the right answers. The prize is a free trip to Hawaii. If the user had indicated to her agent that she rides the subway to work, the agent might find her a discount coupon for AA batteries for her Walkman. The information found by the agent is returned to the user using the methods described above, such as the POST printer and credit card statements.

As described above, it is necessary that each agent be able, at a minimum, to communicate with its user, and to have access to broadcaster log data. To fully exploit the power of the system, each agent should also have access to the masses of information furnished by information providers. All of these connections can be provided using the ATM/POS system previously described, where the agent software and the data from information providers are connected via suitable servers and routers to the ATM data distribution system, in a manner similar to the broadcaster logs.

Yet another way to interconnect the information card, broadcaster logs, information providers and the user is by using the Internet. The following is a description of how the Internet is used in an alternate embodiment of the present invention. In the discussions that follow, the systems being described will be referred to as the PassKey systems. FIG. 63 is an example showing a response to a contest question posed during a televised football game on channel 4: "Guess how many yards will be gained in the next down". To respond the user presses. PassKey Card station ID key for channel 4, and then enters his guess using the keys 2082. If the guess was "27",the user would press the "2" and "7" keys.

Figure 64:
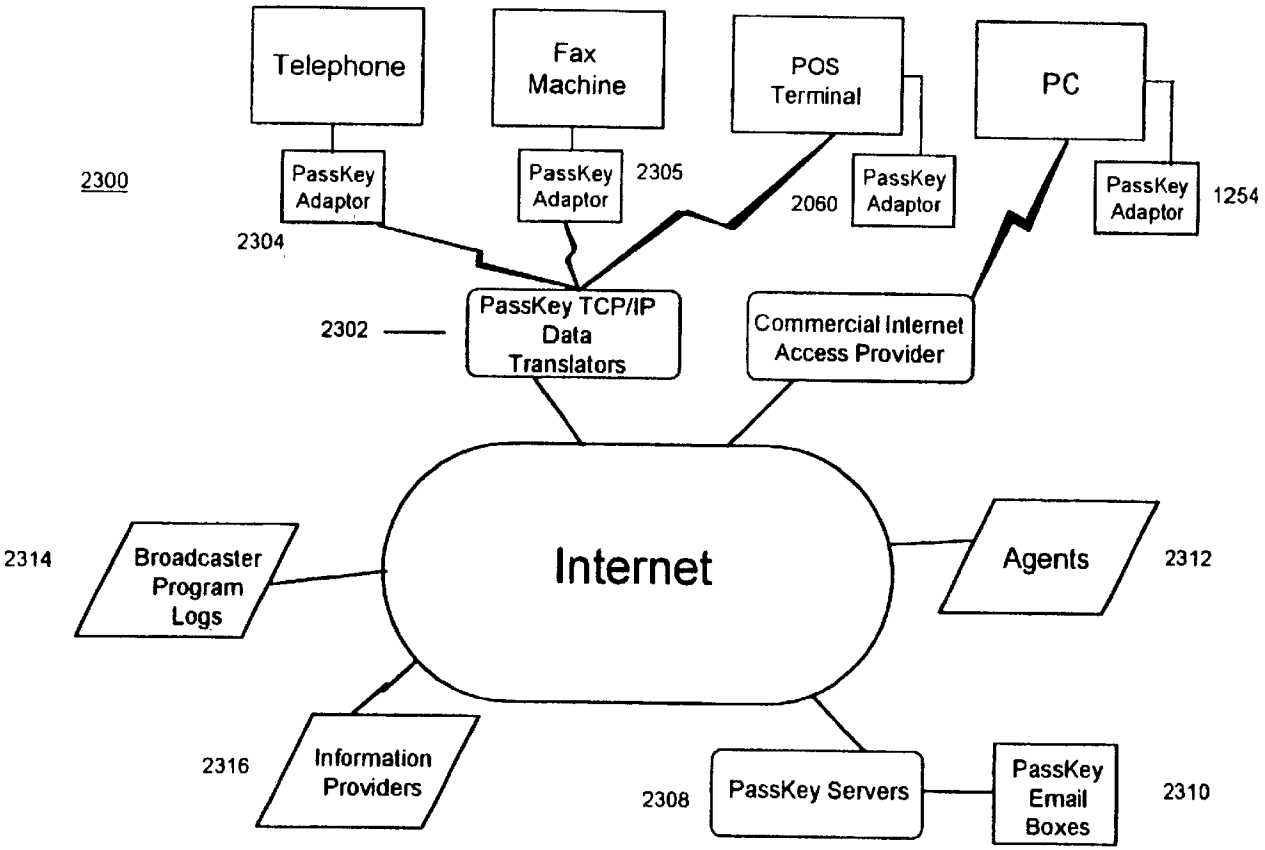
FIG. 64 is a block diagram showing the use of the Internet to interconnect the various components of the invention.

FIG. 64 shows how the agents, the broadcast logs and the information providers are connected together using the Internet 2300. The user can communicate with the PassKey system using a standard telephone, a fax.machine, a POST or a PC. The POST and PC connections are substantially identical to those previously describe for connection to an ATM/POS data system. PassKey acts as a standalone access provider on the Internet by having its own dial-up host servers connected thereto. By programming the POS terminals to dial the server telephone number whenever a PassKey card is inserted in the card reader adapter previously described, the reader is connected to the Internet system in the same manner as it would connect to the ATM/POS system. In like manner, a useer with a PC and Internet access can dial the PassKey server and use the information card adaptor to transfer SDT# information.

Figure 65:
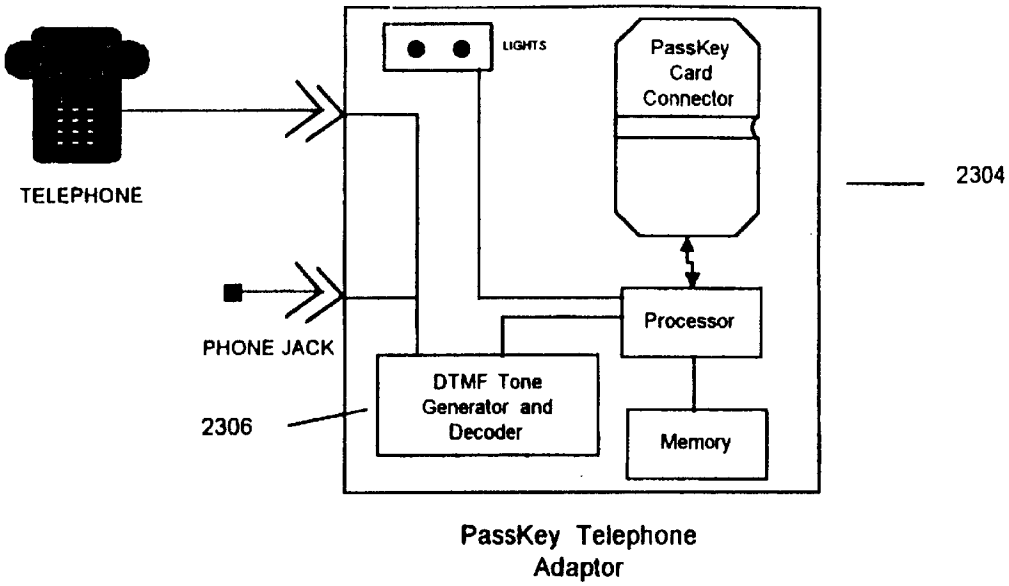
FIG. 65 is a block diagram of an adaptor for connecting the information card to a standard telephone.
Figure 66:
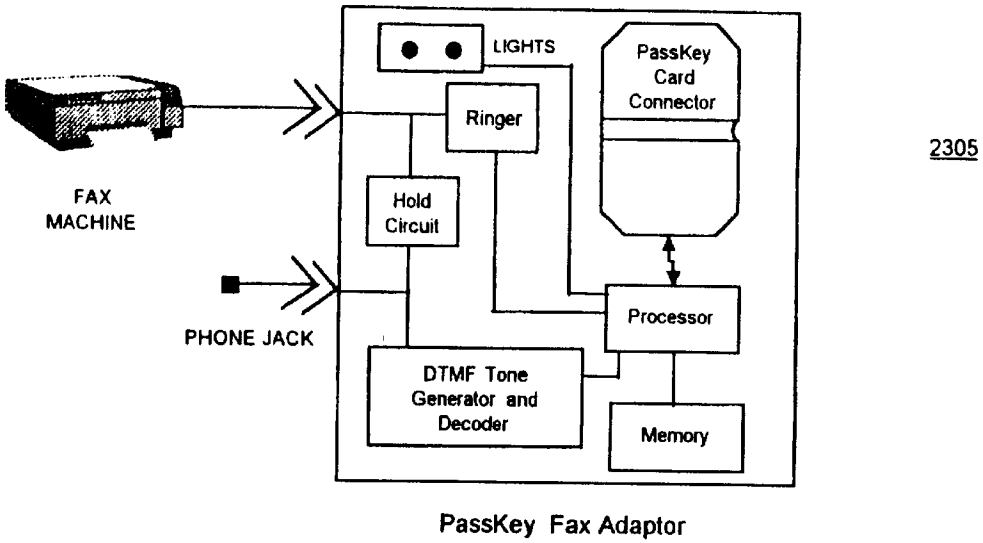
FIG. 66 is a block diagram of an adaptor for connecting the information card to a standard fax machine.

For users wishing to use telephone access to their agents, they are provided with a low cost telephone/fax adaptor which connects between the phone line and a conventional telephone, FIG. 65 or fax machine FIG. 66. This adaptor cost is kept low in part because the PassKey telephone connection technology does not require a modem.

As you can see, users have a multitude of choices for communicating with their agents. If they want to do so at retail establishments, they simply ask the retailer to process their information card in the same way as a payment card, or they can do it themselves at consumer operated POS terminals (gas stations, supermarkets, etc.) If they want to communicate with their agent at home, at the office, or on the road, they can do so using any convenient telephone.

Figure 67:
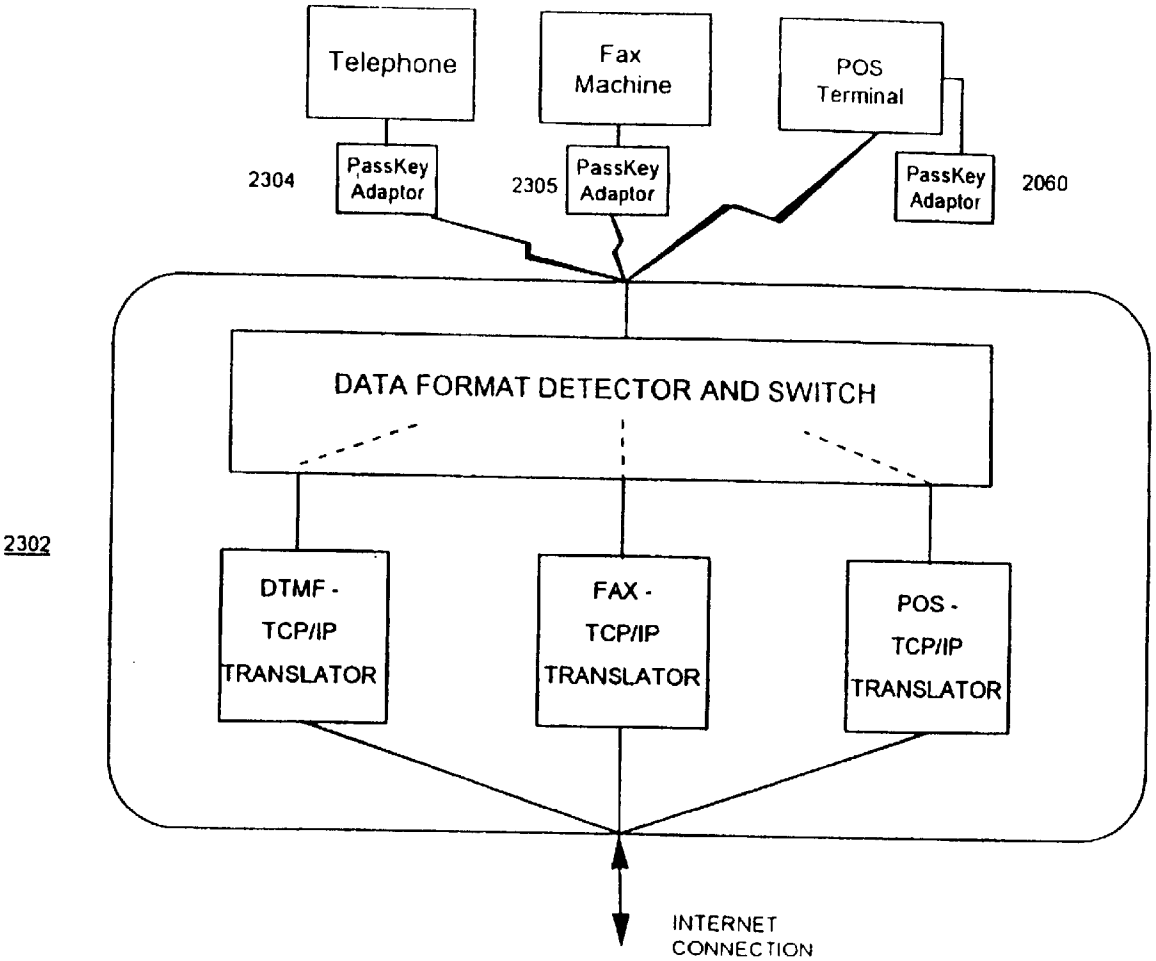
FIG. 67 is a block diagram of a data format detector and switch used to connect the Internet to telephones, fax machines and POS terminals.

The details of how PassKey interfaces with Internet are as follows, referring to FIG. 64. The various I/O devices to enable the user to communicate with the system (POS terminal, telephone set, fax machine) are all connected via a dial-up phone line to a local PassKey Data Translator 2302, shown in detail in FIG. 67. The purpose of the translator is to first determine what type of I/O device is dialing in, and once this determination is made, to translate the dial-in device signal format to the Internet signal format, commonly known as TCP/IP (Transmission Control Protocol/Internet Protocol), and to translate the TCP/IP signals from Internet to the dial-in device signal format, so that two-way communication is established. The data translator is not needed when the user dials-in from a PC, because the PC software and/or the commercial Internet access provider already includes a TCP/IP translator.

The determination of the signal format of the other dial-in devices can be accomplished in several ways. One way is to have the adaptor used with each device insert a signal on the phone line which uniquely identifies the device (POS terminal, telephone set, fax machine). Another way is for the translator to analyze the type of signal being received from the device. This is possible because the POS terminal uses it own signal format to communicate, the fax machine uses the standard fax signal protocol, and the telephone set uses the well known DTMF touch tone format. Each of these is distinct from the other, and hence easily distinguishable. One the signal format is determined, the proper translator is connected between the device and the net to establish communications.

With respect to the POS terminal, the adaptor, described in detail above, is connected to either the pin pad connector or the RS-232 connector, and thus establishes a link between the terminal and the circuits in the information card plugged into the adaptor. The terminal has the ability to dial up a variety of prestored phone numbers, depending on the type of card being used. This is usually accomplished by reading the payment card number, which identifies the type of payment card (Visa, MasterCard, AmEx, ATM, etc). Once this is known, the proper dial-up number is chosen. In the case of PassKey, stored in the information card is a unique number which identifies the Card as a information card. The terminal is pre-programmed by the retailer to dial the PassKey dial-in phone number upon detection of the information card.

The purpose of the telephone/fax adaptors is to convert the data stored in the information card to standard DTMF signals, and also to provide an automatic dial-up of the PassKey phone number when the information card is inserted. The operation of the fax adaptor is described in detail in my published PCT application US94/08748, incorporated herein by reference. The operation of the telephone adaptor 2304 is as follows, referring to FIG. 65. To setup the adaptor, which is connected between the phone and the line, the phone dialpad is used. The user picks up the handset, enters a code number (such as #123#), followed by the phone number to dial into PassKey, followed by the code number. The adaptor recognized the code number as meaning the unit is in the setup mode. The follow-on phone number is then stored in the adaptor memory for use in auto dialing PassKey. Other information such as ID numbers, may also be stored in the adaptor in the same manner.

After setup is complete, the adaptor is used as follows. The user takes the phone off hook, and plugs the information card into the adaptor. The information card presence is detected (voltage or resistance sensor), and the adaptor dials the stored PassKey phone number using its internal DTMS tone generator 2306. Once the link is established to the Data Translator (which sends back a confirm DTMF tone), the adaptor can identify itself as a telephone adaptor by sending a unique code (which may also be programmed during setup). This unique code tells the Translator that it should route further signals to the DTMF-TCT/IP translator. One this is done, the data stored in the information card memory (ID, SDT#) is sent via the net to a PassKey Server, where it is stored for further processing. The server sends back signals which erase the SDT# data from information card memory, and which reset the clock in the information card. The transaction is now complete, and a green light or other suitable indicator alerts the user to hang up the phone and remove the information card.

PassKey uses the Internet E-mail system to determine which PassKey server 2308 the information card data is to be routed to, and where it is to be stored in the server memory. Each server has a unique IP address, which is written as four decimal numbers separated by periods (eg. 192.100.81.100). This address can also be expressed as a name such as netcom.com. Internet uses a Domain Name System to look up the IP address number which corresponds to the name. The memory in each server is divided into E-mail boxes, where each box is identified by an E-mail name which is unique to the user of the box. Typically, the box name is the name of the user. A complete E-mail address consists of the mailbox name followed by an @ symbol, followed by the IP address of the server at which the box is located. Thus an E-mail box for Bob at Netcom might be Bob@netcom.com.

PassKey uses the information card ID number (such as a social security number in the U.S.) as the E-mail name for each user. Stored in the information card is also the IP address for the PassKey server assigned to that user. Typically, the server address is already stored in information card memory before it is distributed. Server addresses are chosen on the basis of the location where the information card is to be distributed (eg. New York, Los Angeles). In this way , the information card data traffic can be distributed among many servers, avoiding a data traffic jam. When the data stored in the information card is transmitted to the Translator, the ID number and server address are also sent. The Translaotor combines these to form an E-mail address which is used to route the information card data to the user's E-mail box, and to recover the PassKey information stored in that E-mail box for transmission back to the user. By way of example, if the user's social security number is 127-34-8391, and the server address stored in the information card is 126.49.7591.8053, the E-mail address is 127348391 @ 126.49.7591.8053.

Data received by a PassKey server from a information card is stored in the user's E-mail box 2310 for archive purposes and then routed, along with previously archived data to a suitable agent 2312. The agent processes the new data in conjunction with the archived data, communicates with the information providers, and makes decision as to what information is to be returned to the user. This information is then sent back to the applicable PassKey server, where it is stored in the user's PassKey E-mail box for later retrieval using the techniques described below.

Once the agent receives the SDT# data, it uses it in conjunction with the applicable broadcast log data 2314 connected to the net to update its surrogate model of its user. It then polls the mass of PassKey information provider data

2316 provided to the net at its disposal, selects and filters this data, and storess the resultant information in the user's E-mail box for retrieval on demand. It may also take action based on the distilled data (place orders with third parties, communicate portions of the data to others for mailings, etc.). All of this activity is reported back to the user.

The user may obtain the agent processed information using the same methods for sending the SDT# data to the agent, as well as additional methods. For example, if the user transmits the data to the agent using a POS terminal, the agent's output information, stored in his/her E-mail box, can be sent back to the user in this same transaction (or a later one), by printing it using the same printer used by the POS terminal to print payment card receipts. Examples of such printouts are shown in FIG. 72.

If the user employs a telephone to transmit the SDT# data to the agent, the agent output data can be sent to the user by conventional mail. This is particularly convenient if the user added to his/her information card ID a payment card number. The agent output is then linked with the payment card account and is sent to the user along with his monthly card statement as previously described.

If the user connects his PassKey adaptor between his home or office fax machine and the telephone line, the agent output can be sent back in the same or a later transaction, and printed out on the fax machine.

If the user employs his PC to transmit SDT# data to the agent, in this same or a later transaction, the agent output information is stored in the user's Email box for later retrieval and storage on disk or printout on the printer.

While the above discussion showed the use of Internet for connecting the various components of the PassKey system, the ATM/POS communications system can be used as well. The following is a description of such a system, using smart cards.

Figure 68:
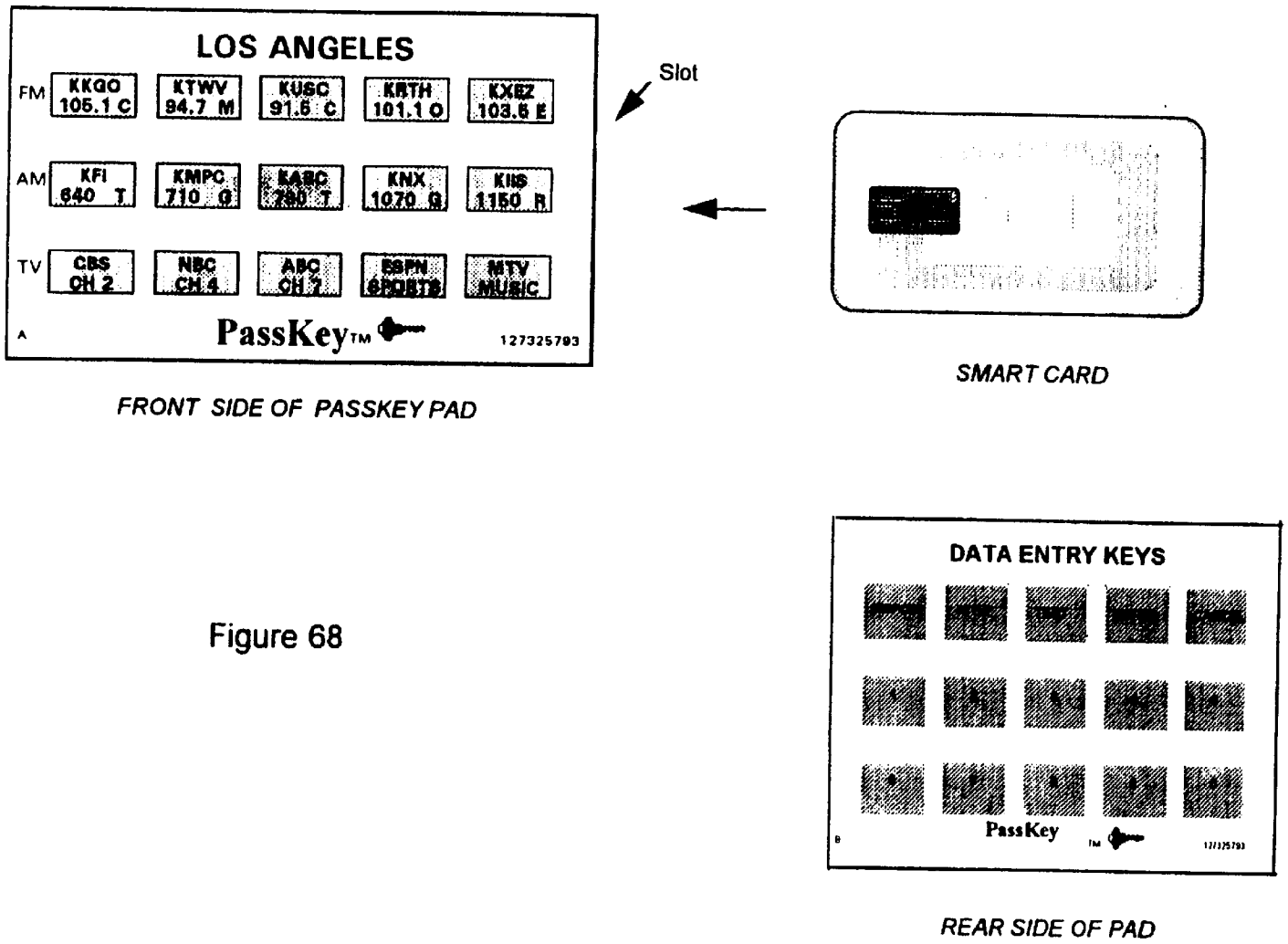
FIG. 68 is an example of the information card adapted for use with a smart card.
Figure 69:
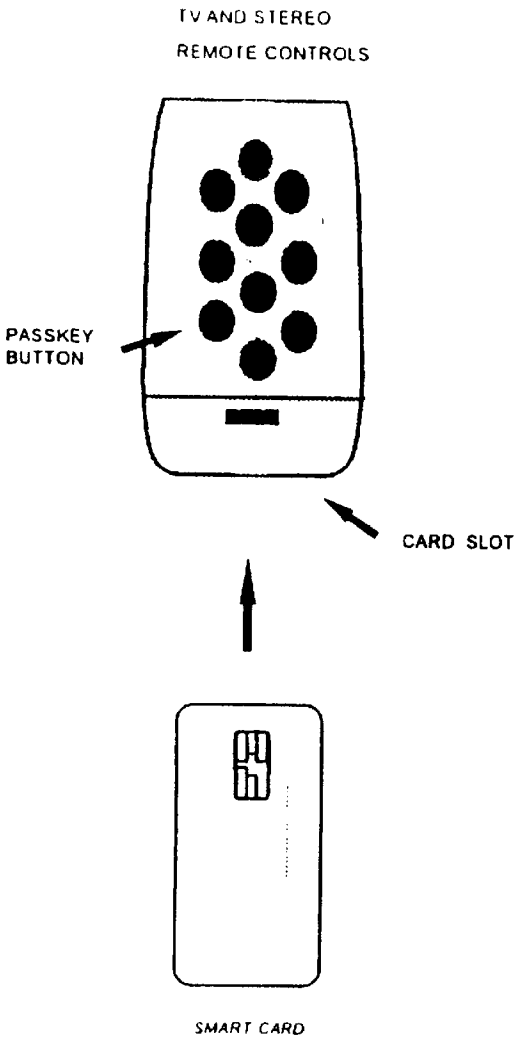
FIG. 69 is an example of a remote control adapted for use with the present invention and a smart card.

As shown in FIG. 68, the PassKey card, which will now be referred to as a "pad", is modified so that a conventional smart card can be inserted via a suitable slot and connector, whereby the smart card substitutes (or supplements) for the RAM normally resident in the information card. In a similar fashion, as shown in FIG. 69, a slot can be provided in a remote control to accept a smart card, where the remote control includes the clock/calendar and other circuits of the information card. It is possible to print the station names on smart cards, whereby the insertion of the smart card into the Pad under the clear overlay acts as the keypad label. The data identifying each station may also be prestored in the smart card memory. These cards might be issued by broadcast networks, program producers, advertisers, and retailers.

FIG. 70 shows how a smart card equipped remote control is used to respond to contest questions. Comparing to FIG. 63, since the remote control is used to set the channel number and contains the clock/calendar, it is only necessary to press a single "PassKey" to download SDT to the smart card memory. The numerical response to the question is then entered using the numerical channel select keys on the remote control. The channel changing function of these keys is temporarily suspended during the timing window interval that occurs after pressing the PassKey key.

Because the remote can be used to change channels via direct numeric entry or via up/down keys, several provisions are made in order to ensure that the remote control has stored the correct channel number that the TV is receiving. Whenever the power button is pressed on the remote, a numerical channel command (say channel 2) is sent to establish the starting point for tuning. Because may tv receivers include a shannel skip function where up/down keys do not tune every channel in sequence, the user must setup the remote to teach it the actual up/dn channel sequence. This may be easily accomplished by placing the remote in a learn mode, where after each up/dn key press, the actual numerical channel number is entered and stored in a table for later use.

Figure 71:
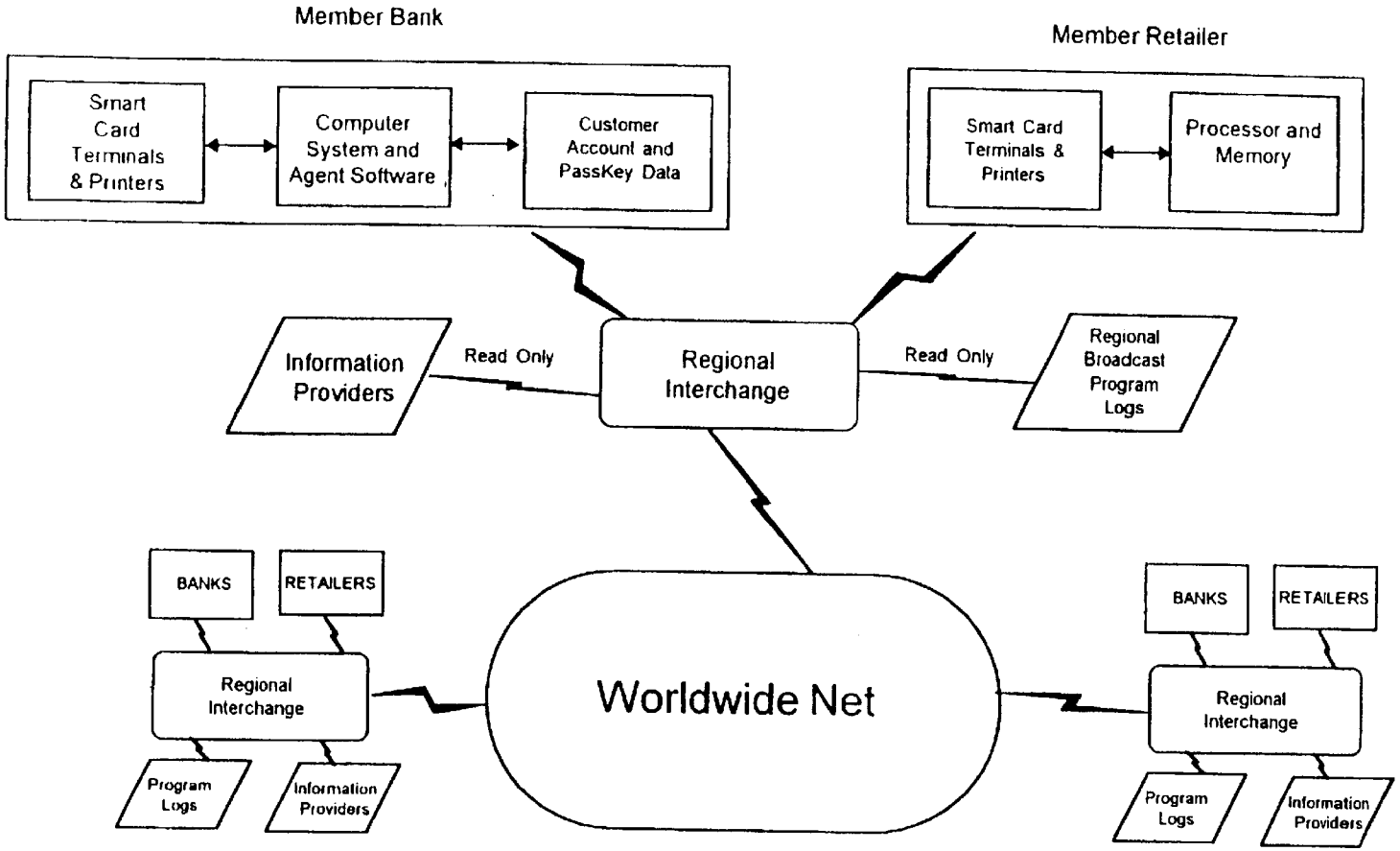
FIG. 71 is a block diagram of an ATM/POS data communications system adapted for use with the present invention and smart cards.

FIG. 71 shows the ATM/POS data communications system for using this embodiment. Issuing banks include agent software into their data processing systems, which connect to regional interchanges. For each payment card customer, in addition to conventional card account data storage, the banks also allocate data storage for PassKey information. Broadcasters connect their computerized logs to the regional interchanges. The logs act as lookup tables whereby for each SDT event, the table provides a locator number which identifies the sponsor of that event (advertiser), as well as identifies the event itself (a coke coupon, a quiz, a promotion). The locator number is used to route the user's response to the correct information provider.

The user's broadcast information responses are processed as follows. The smart card that was inserted into the Pad or Remote Control is removed and used in the normal manner for conventional payment/stored value card transactions. During such a transaction, the SDT# information stored in the card, along with the card number, is automatically read from the card and stored in memory at the card reader location for later transmission to the issuing bank (along with the conventional payment transaction). The SDT# data is then erased from card memory. Local storage and delayed transmission are employed so that transaction time is not increased as a result of real time processing of the PassKey data. The SDT# data is then transmitted to the issuer bank and stored in the user's account.

The S portion of the data identifies which broadcaster log pertains to that event. The SDT information is sent to that log, which returns the identity of the event and the information provider for that event. The event identity and # are then routed to the appropriate information provider. The provider in turn processes the response (#), and returns the information (song title, winner notification, coupon) to the bank where it is processed by the agent software (which uses it to update the profile of user needs, desires and habits) and stored for later retrieval by the user. While the above discussion assumed the issuing bank processed the user responses, there are many other possibilities. For example, dedicated PassKey servers can be hooked to the data network for this task. Alternately, the responses can be routed to the Internet for further processing.

The user obtains the agent processed information using the same methods for sending the SDT# data to the agent, as well as additional methods. For example, when the user next uses his/her smart card for a payment transaction, the information stored in the user's account at the issuing bank is sent back to the user's location, where it is printed on the POS receipt printer. Additionally, if the user has won money, the amount can be automatically posted by the issuing bank as a credit to the card account, or it can be transferred to the card memory to increase the stored value. Alternatively, the PassKey information can be sent to the user as part of his/her monthly card statement.

Other options include retrieving the information using a home computer, where it is printed, or on a fax machine equipped with a smart card adaptor in the manner described above.

The described embodiments of the invention are only considered to be preferred and illustrative of the inventive concept, the scope of the invention is not to be restricted to such embodiments. Various and numerous other arrangements may be devised by one skilled in the art without departing from the spirit and scope of this -invention.

It is therefore intended by the appended claims to cover any and all such applications, modifications and embodiments within the scope of the present invention.

What is claimed is:

1. A method for providing information to a user from an information depository with memory cards, each card having a clock and a plurality of keys on its surface, each key corresponding to a station, the method comprising the steps of:

placing over the keys a transparent overlay within an insert receiving pocket;

identifying the stations corresponding to the keys;

reproducing in the vicinity of each of a plurality of users, programs from one of a plurality of broadcast stations;

recording the value of the clock and the key pressed by a user when a user wants to record an identification of a station and a time of a program on the station for which supplemental information is desired by the user;

entering the recorded station identification and time into one of a plurality of information exchange terminals;

coupling the information exchange terminal to the information depository to transmit information therebetween; and identifying a correspondence between the entered station identification and time and a program in a station log to obtain the desired supplemental information.

2. The method of claim 1, additionally comprising the steps of compiling a station log of stations, program times, and program identifiers for programs on the stations and mapping the program identifiers in the log to supplemental information relating to specific programs.

3. The method of claim 2 wherein the step of identifying a correspondence between the entered station identification and time to a program in a station log to obtain the desired supplemental information comprises the step of searching the station log for a station, program time, and program identifier of a program that corresponds to the entered station identification and time.

4. The method of claim 3, additionally comprising the step of outputting the obtained supplemental information.

5. The method of claim 4, in which the outputting step comprises printing out the information.

6. The method of claim 4, in which the outputting step comprises presenting the information on a display device.

7. The method of claim 3, in which the station log and the supplementary information are resident in the information depository, the method comprising the additional steps of:

transmitting the entered station identification and time from the information exchange terminal to the information depository;

obtaining from the information depository the supplementary information;

transmitting the supplementary information from the information depository to the information exchange terminal; and outputting the supplementary information at the information exchange terminal.

8. The method of claim 3, in which the station log and the supplementary information are resident in the information depository, the method comprising the additional steps of:

transmitting the entered station identification and time from the information exchange terminal to the information depository; and merging the supplementary information into a charge card accounting statement.

9. The method of claim 4, in which the station log is compiled at the information exchange terminals and the supplemental information is stored at the information depository, the program identifiers are transmitted from the information exchange terminals to the information depository, and the supplemental information is transmitted from the information depository to the terminals.

10. The method of claim 4, in which the station log is compiled at the information exchange terminals and the supplemental information is stored at the information exchange terminals.

11. The method of claim 2, additionally comprising the step of transmitting program times and program identifiers from each station to the place of compiling the station log.

12. The method of claim 11 wherein the step of transmitting program times and program identifiers from each station to the place of compiling the station log comprises the step of transmitting the program times and program identifiers from each station in a SCA FM band.

13. The method of claim 11 wherein the step of transmitting program times and program identifiers from each station to the place of compiling the station log comprises the step of transmitting the program times and program identifiers from each station in a television vertical blanking interval.

14. The method of claim 1 additionally comprising the steps of:

coupling the card to an information exchange terminal;

transmitting the stored station identification and time from the information exchange terminal to the information depository;

obtaining from the information depository the supplementary information;

transmitting the supplementary information from the information depository to the information exchange terminal; and outputting the supplementary information at the information exchange terminal.

15. The method of claim 14, in which the step of coupling the card to an information exchange terminal comprises the steps of:

reading from the card a data and time (DT1) representing the last time the card was coupled to an information exchange terminal;

reading from the card the current time on the clock;

calculating the difference in time (T1) between the card clock time and time read from a clock in the information exchange terminal;

calculating the difference in time (T2) between DT1 and the information exchange terminal clock current time;

calculating the card clock error rate T1/T2;

applying the error rate to correct the stored time of the combination of station identification and time;

setting the clock in the card to the correct time; and storing the current data and time (DT1) into the card memory.

16. The method of claim 14, in which the outputting step comprises printing out the information or presenting the information on a display device.

17. The method of claim 14 wherein the information exchange terminal comprises an automated teller machine.

18. The method of claim 14 wherein the information exchange terminal comprises a point of sale terminal.

19. The method of claim 1 additionally comprising the steps of:

coupling the card to an information exchange terminal;

transmitting the stored station identification and time from the information exchange terminal to the information depository; and merging the supplementary information into a charge card accounting statement.

20. The method of claim 19 wherein the information exchange terminal comprises an automated teller machine.

21. The method of claim 19 wherein the information exchange terminal comprises a point of sale terminal.

22. The method of claim 1, in which the step of recording upon command by a user, an identification of a station and a time of a program on the station for which supplemental information is desired by the user is performed by:

coupling a card having a memory to an apparatus for receiving stations, the apparatus having a clock, a station selection controller, and a command key for commanding the step of recording; and storing into the memory of the card the station identification for selected station and the time read from the clock whenever the command key is activated.

23. The method of claim 22 wherein the apparatus comprises a radio.

24. The method of claim 22 wherein the apparatus comprises a television.

25. The method of claim 22 wherein the apparatus comprises a remote controller.

26. The method of claim 22 additionally comprising the steps of:

coupling the card to an information exchange terminal;

transmitting the stored station identification and time from the information exchange terminal to the information depository; and merging the supplementary information into a charge card accounting statement.

27. The method of claim 26 wherein the information exchange terminal comprises an automated teller machine and further comprises the steps of:

assigning a unique identification symbol to each user;

printing the desired supplemental information on a statement that is unique to the user; and printing the user identification symbol on the statement.

28. The method of claim 26 wherein the information exchange terminal comprises a point of sale terminal and further comprises the steps of:. assigning a unique identification symbol to each user;

printing the desired supplemental information on a statement that is unique to the user; and printing the user identification symbol on the statement.

29. The method of claim 1 wherein the step of identifying a correspondence between the entered station identification and time and a program in a station log additionally comprises the step of recording the number of times a first program in the station log is identified as corresponding to entered station identifications and times.

30. The method of claim 1 wherein the information depository comprises a distributed and networked depository.

31. The method of claim 1 wherein the step of identifying a correspondence between the entered station identification and time and a program in a station log to obtain the desired supplemental information comprises the steps of:

mapping an entered station identification for a cable channel to a second station identification by using a stored cable channel map.

32. A method for transferring information between a plurality of users and an information depository, the method comprising the steps of:

recording on portable memory cards user responses and the time of each response;

carrying the memory cards to information exchange terminals that have card receiving slots;

connecting the information exchange terminals to the information depository to transmit information therebetween; and inserting the memory cards in the slots to transmit the combinations of times and user responses recorded on the cards to the information exchange terminals.

33. The method of claim 32, in which a plurality of responses and the time of the responses are recorded on the cards before the cards are inserted in the slots.

34. The method of claim 32, additionally comprising the step of transmitting to the information depository the responses and time of each response transmitted to a terminal.

35. The method of claim 34, additionally comprising the step of recording at the information depository the number of like responses.

36. The method of claim 34 additionally comprising the step of transmitting from the information depository to the information exchange terminals information relevant to the responses and the time of each response transmitted to such terminals from the cards.

37. The method of claim 36, additionally comprising the step of outputting at the information exchange terminals information transmitted from the information depository.

38. The method of claim 37, in which the outputting step comprises printing out the information.

39. The method of claim 37, in which the outputting step comprises presenting the information on a display device.

40. The method of claim 32, additionally comprising the step of reproducing in the vicinity of the card a broadcast from a radio or a television station, the responses being radio or television stations.

41. The method of claim 40, additionally comprising the step of compiling a log of stations, program times, and program identifiers of programs broadcast from the stations, mapping the program identifiers in the log to supplemental information relating to the specific programs, and transmitting to a terminal supplemental information relating to the program for the station and time recorded on a memory card inserted in the slot of the terminal.

42. The method of claim 41, in which the station log is compiled at the information depository and the supplemental information is stored at the information depository.

43. The method of claim 41, in which the program log is compiled at the information exchange terminals and the supplemental information is stored at the information depository, the program identifiers are transmitted from the terminals to the information depository, and the supplemental information is transmitted from the information depository to the terminals.

44. The method of claim 41, additionally comprising the step of transmitting program times and identifiers for each station from each such station to the place of compilation of the program log.

45. The method of claim 32, in which the card has a plurality of keys on its surface to record the responses, the method additionally comprising the step of placing over the keys a transparent overlay with an insert receiving pocket and placing in the pocket an insert that identifies the responses corresponding to the keys.

46. A system for ordering supplemental information about programs currently playing at a broadcast receiver having a controllable station tuner, the apparatus comprising:

means for controlling the station to which the tuner is set;

a clock for designating current data and current time;

manual input means for issuing a store command;

a memory; and means responsive to the controlling means, the clock, and the manual input means for storing in the memory data (SDT data) representative of the station to which the tuner is set, the current date, and the current time when a store command is issued.

47. The system of claim 46 wherein the means for controlling the station to which the tuner is set, the clock for designating current data and current time, and the manual input means for issuing a store command are integral to the broadcast receiver or a remote controller for the broadcast receiver, and the memory is integral to a card that is removably coupled to the broadcast receiver.

48. The system of claim 47 further comprising:

an information depository for storing the supplemental information;

means for communicating between the information depository and the memory; and means for mapping the SDT data read from the memory into the information depository to obtain the specific supplementary information about the respective programs represented by the SDT data.

49. The system of claim 48 wherein the means for communicating between the information depository and the memory comprises an automated teller machine (ATM).

50. The system of claim 49 further comprising means for outputting the supplementary data at the ATM.

51. The system of claim 49 further comprising means for merging the supplementary data onto an ATM accounting statement.

52. The system of claim 48 wherein the means for communicating between the information depository and the memory comprises a point of sale (POS) terminal.

53. The system of claim 52 further comprising means for outputting the supplemental data at the POS.

54. A system for ordering supplemental information about programs currently playing at a broadcast receiver, the apparatus comprising:

a clock for designating current data and current time;

manual means for issuing a store command designating a station on which the current program is playing on the broadcast receiver;

a memory; and means responsive to the clock and the means for issuing a store command designating the station for storing in the memory data (SDT data) representative of the station to which the tuner is set, the current date, and the current time when the store command is issued.

55. The system of claim 54, in which the clock, the means for issuing a store command, and the memory are integral to a card having a plurality of keys on its surface, each for issuing a store command designating a particular station, the card further comprising a transparent overlay for placing over the keys and an insert receiving pocket for receiving the transparent overlay for identifying the stations corresponding to the keys.

56. The system of claim 54 further comprising:

an information depository for storing the supplemental information;

means for communicating between the information depository and the memory; and means for mapping the SDT data read from the memory into the information depository to obtain the specific supplementary information about the respective programs represented by the SDT data.

57. The system of claim 56 further comprising means for outputting the supplementary data.

58. The method of claim 54, in which the second conveying step conveys the retrieved auxiliary information electronically, the method additionally comprising the step of reproducing the retrieved auxiliary information at the receiver.

59. A method for supplying to a user of a broadcast receiver auxiliary information about broadcast programs comprising the steps of:

playing programs from a schedule of broadcast programs at a broadcast receiver;

mapping SDT data representative of the station, day and time of the respective programs of the schedule to auxiliary information about the respective programs in a memory at a central location remote from the receiver;

storing at the receiver SDT data for a particular program selected by the user from among the programs being played at the receiver;

conveying the stored SDT data to the central location;

retrieving at the central location the auxiliary information corresponding to the conveyed mapped SDT data;

conveying the retrieved auxiliary information to the user.

60. The method of claim 59, in which the mapping step stores logs that provide for each item of SDT data a locator number that identifies an information provider and the retrieving step comprises deriving the locator number for an item of conveyed SDT data from the logs and using the locator number to establish a connection to the information provider identified by the locator number.

61. The method of claim 60, in which the step of conveying the retrieved auxiliary information to the user transmits the auxiliary information from the information provider.

62. The method of claim 61, in which the central location comprises information providers on the Internet.

63. The method of claim 62, in which the central location additionally comprises an agent at which one or more of the logs are stored.

64. The method of claim 59, in which the second conveying step conveys the retrieved auxiliary information in print form.

65. The method of claim 59, in which both conveying steps comprise establishing a telephone connection between the receiver and the central location and transmitting the SDT data and the retrieved auxiliary information over the telephone connection.

66. The method of claim 65, in which the SDT data and the retrieved auxiliary information are transmitted in a modem protocol.

67. The method of claim 59, in which the storing step stores the SDT data in a nonvolatile memory and the SDT data conveying step comprises physically carrying the memory to the central location.

68. The method of claim 59, in which the user is located at the receiver and the second conveying step comprises conveying the retrieved auxiliary information to the receiver.

* * * * *